(12) United States Patent
Mizumoto et al.

(10) Patent No.: US 6,173,125 B1
(45) Date of Patent: *Jan. 9, 2001

(54) APPARATUS FOR READING MAGNETIC INFORMATION

(75) Inventors: Kenji Mizumoto, Osaka; Toshihito Kido, Matsuhara; Satoshi Hamada, Sakai, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/590,329

(22) Filed: Jan. 23, 1996

(30) Foreign Application Priority Data

Jan. 24, 1995 (JP) .................................... 7-009114
Feb. 24, 1995 (JP) .................................... 7-037292

(51) Int. Cl.⁷ .................................................. G03B 17/24
(52) U.S. Cl. ................................................... 396/319
(58) Field of Search .................... 351/105, 106, 351/21, 289.12, 207; 396/310, 311, 319, 515, 207, 210

(56) References Cited

U.S. PATENT DOCUMENTS

| | | | |
|---|---|---|---|
| 5,220,367 | * 6/1993 | Matsuyama | 354/105 |
| 5,283,604 | * 2/1994 | Aoshima | 354/21 |
| 5,321,455 | * 6/1994 | Cocca | 351/207 |
| 5,416,546 | * 5/1995 | Izukawa | 354/106 |
| 5,432,570 | * 7/1995 | Ueda et al. | 354/105 |
| 5,479,226 | * 12/1995 | Kazami et al. | 354/21 |
| 5,614,969 | * 3/1997 | Izukawa | 396/319 |
| 5,887,206 | * 3/1999 | Saksaki et al. | 396/319 |
| 5,995,769 | * 11/1999 | Kumakura | 396/210 |
| 6,064,828 | * 5/2000 | Ueda et al. | 396/207 |

FOREIGN PATENT DOCUMENTS 5-88248  4/1993  (JP) .

* cited by examiner

*Primary Examiner*—Russell Adams
*Assistant Examiner*—Christopher E. Mahoney
(74) *Attorney, Agent, or Firm*—Sidley & Austin

(57) ABSTRACT

A camera has a function of determining whether a frame is exposed or unexposed by reproducing signals recorded on a magnetic-recording region of a film. When a film cartridge is loaded into the camera, the film is fed out therefrom. If it is determined that a noise having a level higher than a reference level is included in a reproduced signal read by a magnetic head, for reading the signals recorded on the magnetic-recording region, before the magnetic head reaches the magnetic-recording region, film feeding is stopped and a warning is issued.

28 Claims, 46 Drawing Sheets

*Fig.33*

250 WHETHER FILM CAN BE USED IS DETERMINED

252 LED OF PR1 IS ON, AND LED OF PR2 AND PR3 ARE OFF TO CHECK OUTPUT SIGNAL OF PR1   A

254 LED OF PR3 IS ON, AND LED OF PR1 AND PR2 ARE OFF TO CHECK OUTPUT SIGNAL OF PR3   B

256 LED OF PR3 IS ON, AND LED OF PR1 AND PR2 ARE OFF TO CHECK OUTPUT SIGNAL OF PR1   C

258 RESULT OF A,B, AND C INDICATE BLACK?  — YES → #262 DETERMINED AS "EXPOSED" OR "DEVELOPED"

NO → #260 DETERMINED AS "UNEXPOSED" OR "PARTIALLY EXPOSED"

RETURN

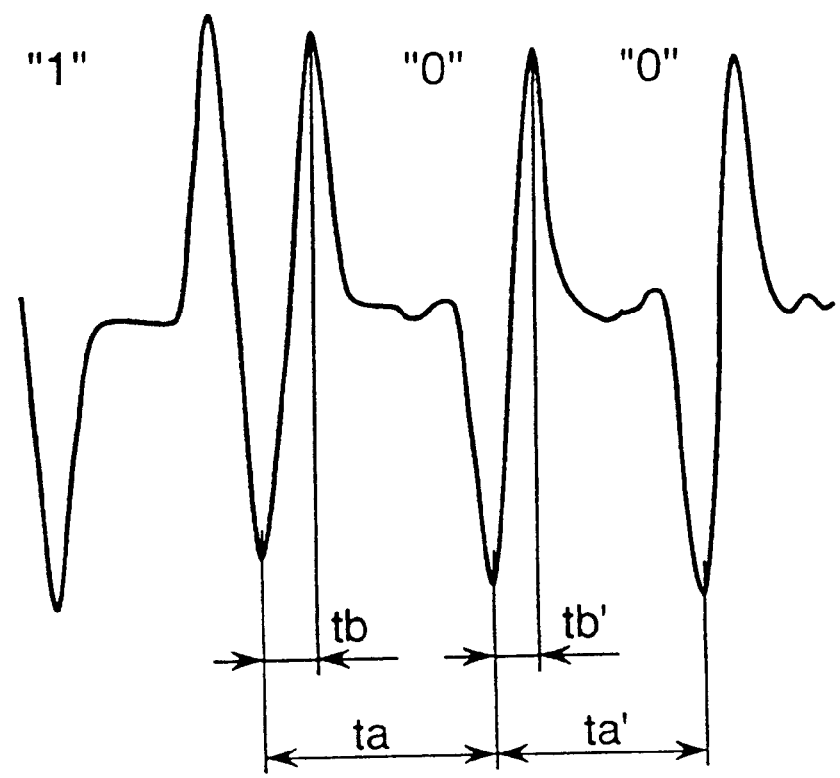

APPARATUS FOR READING MAGNETIC INFORMATION

BACKGROUND OF THE INVENTION

1. Field of the Invention

The present invention relates to an apparatus, for example, a camera, an image-reading apparatus, and the like capable of operating in cooperation with a film cartridge accommodating a film having a magnetic-recording region formed thereon to read an information on the region.

2. Description of the Related Art

In recent years, film cartridges accommodating a film having a magnetic-recording region formed thereon have been proposed. As apparatuses which use this kind of film, a camera, an image-reading apparatus, and the like having a magnetic head for reading and writing magnetic information have been proposed. In these apparatuses, no information is recorded on the magnetic-recording region of the film before frames of the film are exposed, but when a photographing operation is executed, information corresponding to the image of an object photographed on each frame is recorded on the magnetic-recording region. The information includes data of a photographed date, photographic conditions (aperture value and shutter speed), the number of sheets on which images are printed, comments, and the like. Film cartridges having a function of displaying the state of a roll of film, for example, "unexposed", "partially exposed", and "exposed" have been also proposed.

In the image-reading apparatus, the data of a necessary number of sheets on which images are printed and images and photographed dates are displayed thereon, based on the information read in reproducing images. In the camera, photographic conditions or the like are recorded when a photographic operation is performed, and it is determined whether a frame has been exposed or is unexposed when a film cartridge accommodating a partially exposed roll of film is loaded into the camera and then, the film is wound so that exposure can be started with the first unexposed frame. Whether the frame has been exposed or is unexposed is determined according to whether magnetic information has been recorded on a magnetic-recording region of each frame, namely, according to whether the level of a signal reproduced from the magnetic-recording region is higher than a predetermined reference level.

But there is a possibility that the magnetic information cannot be read correctly if a data signal, corresponding to the magnetic signal, reproduced by the magnetic head includes noise generated due to the influence of a magnetic field or an electric field present outside the camera. For example, in determining whether a frame has been exposed or is unexposed, there is a possibility that the level of the noise is higher than the predetermined reference level. In this case, it is erroneously determined that the frame has been exposed although magnetic information has not been recorded on the magnetic-recording region for that frame. On the contrary, if the reference level is set to a higher level, on the assumption that a noise having a high level is generated outside the camera, there is a possibility that an exposed frame is erroneously identified as an unexposed frame and that the exposed frame is exposed again.

SUMMARY OF THE INVENTION

It is accordingly an object of the present invention to provide an improved apparatus having a function of determining whether magnetic information can be correctly read before reading information recorded on a magnetic-recording region.

It is another object of the present invention to provide an improved apparatus for reading magnetic information in which is avoidable an erroneous processing that may be excuted due to an error contained in a data signal reproduced from the magnetic-recording region.

It is still another object of the present invention to provide an improved camera capable of using a film having a magnetic-recording region formed thereon and having a function of preventing an erroneous operation from being performed by checking whether magnetic information can be correctly read before reading the magnetic information.

In order to achieve the aforementioned objects, according to the present invention, there is provided a camera which uses a film having a magnetic-recording region formed thereon, comprising an information-reading device for reading information recorded on the magnetic-recording region of the film; a determiner for determining whether the information-reading device can read the information correctly before the information-reading device reads a data signal reproduced from the magnetic-recording region; and a controller for controlling an operation of the camera according to a determination made by the determiner.

Further, according to the present invention, there is provided an apparatus capable of reading magnetic information recorded on a magnetic-recording medium, comprising an information-reading device for reading information recorded on the magnetic-recording medium; a processor for executing a predetermined operation, based on information read by the information-reading device; a detector for detecting a noise contained in an output of the information-reading device; and a controller for comparing a level of the detected noise with a predetermined reference level, thus controlling an operation of the apparatus according to a result obtained by the comparison.

Still further, there is provided an apparatus capable of reading magnetic information recorded on a magnetic-recording medium, comprising an information-reading device for reading information recorded on the magnetic-recording medium; a processor for executing a predetermined operation, based on information read by the information-reading device; a determiner for determining whether or not the information-reading device can read magnetic information correctly, before the information-reading operation is executed to allow the processor to execute the predetermined operation; and a controller for controlling an operation of the apparatus according to a determination of the determiner.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 33 is a flowchart showing in detail a modification of the operation to be executed at step #110 of FIG. 30;

FIG. 51 is a waveform chart showing a wave of the data signal outputted from the read-out coil and describing "dislocation";

DETAILED DESCRIPTION OF THE PREFERRED EMBODIMENTS

A photographing camera according to embodiments of the present invention is described below with reference to FIGS. 1 through 41.

Figure 1:
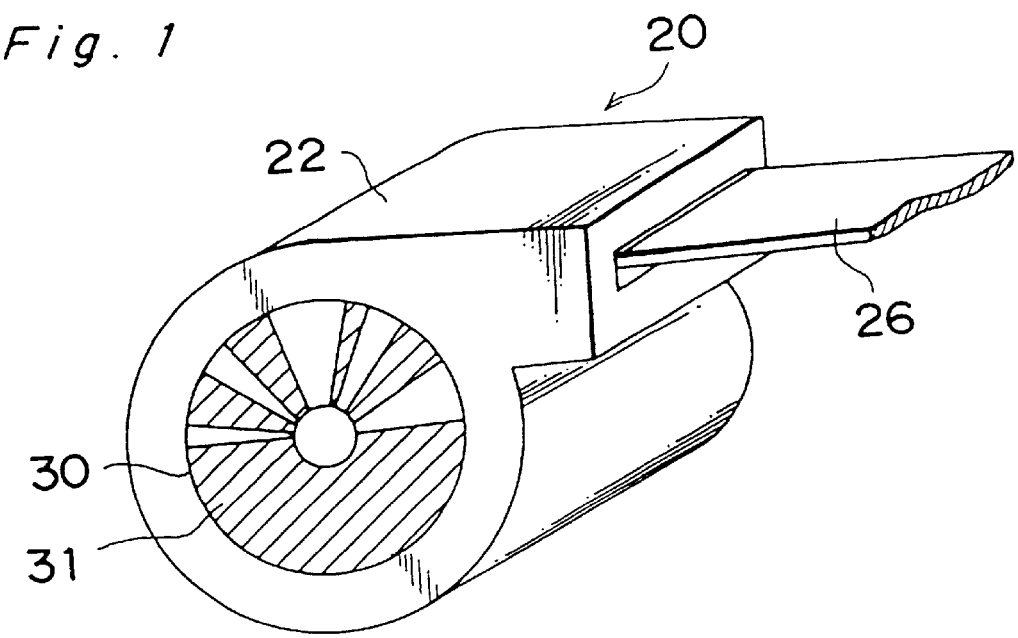
FIG. 1 is a perspective view showing a cartridge film to be used in a camera according to an embodiment of the present invention.
Figure 2:
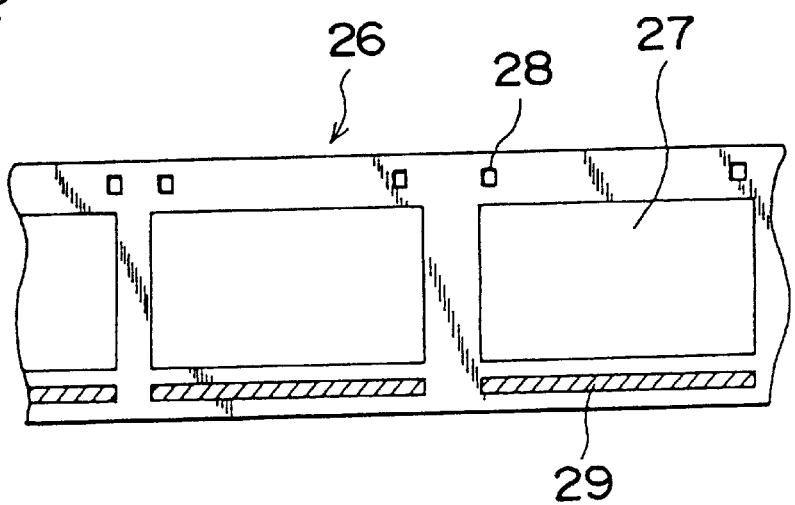
FIG. 2 is a plan view showing a film of the cartridge film shown in FIG. 1.
Figure 3A:
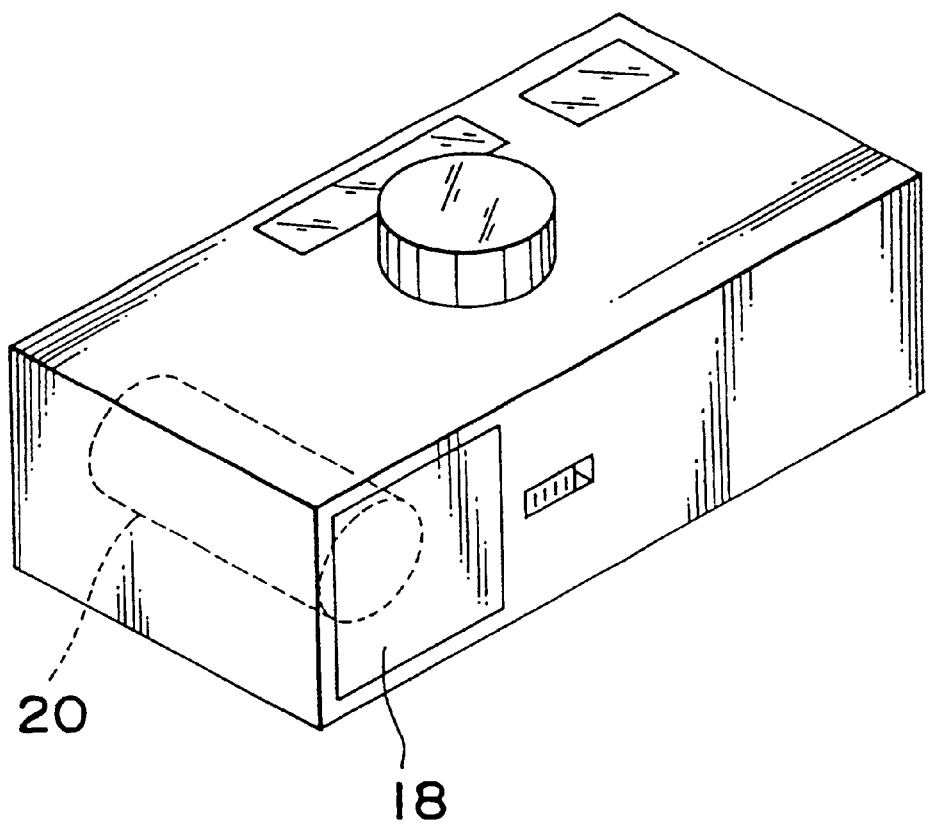
FIG. 3(a) is a perspective view showing the appearance of a camera according to an embodiment of the present invention.
Figure 3B:
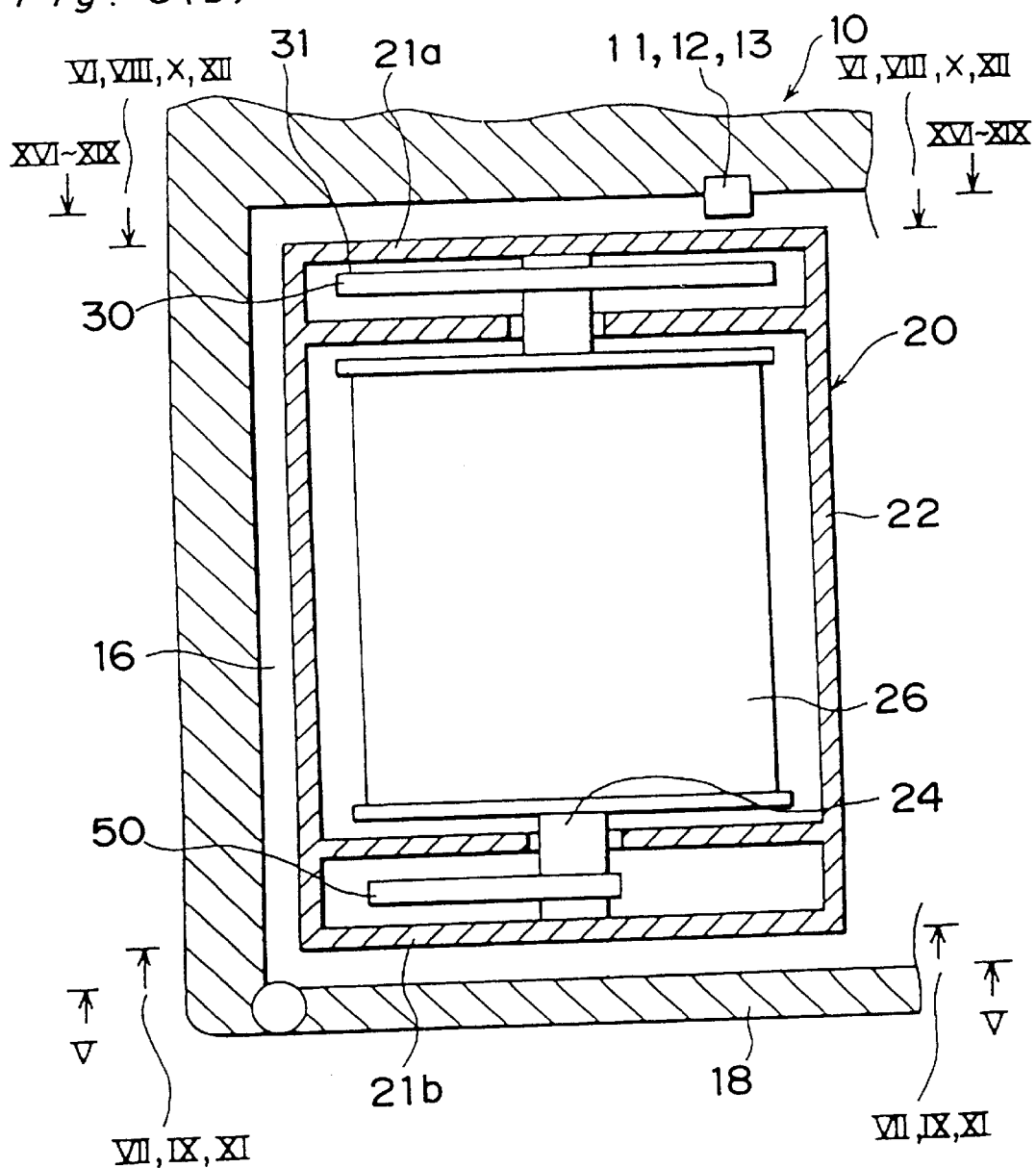
FIG. 3(b) is a sectional view showing principal portions of the camera shown in FIG. 3(a)
Figure 12:
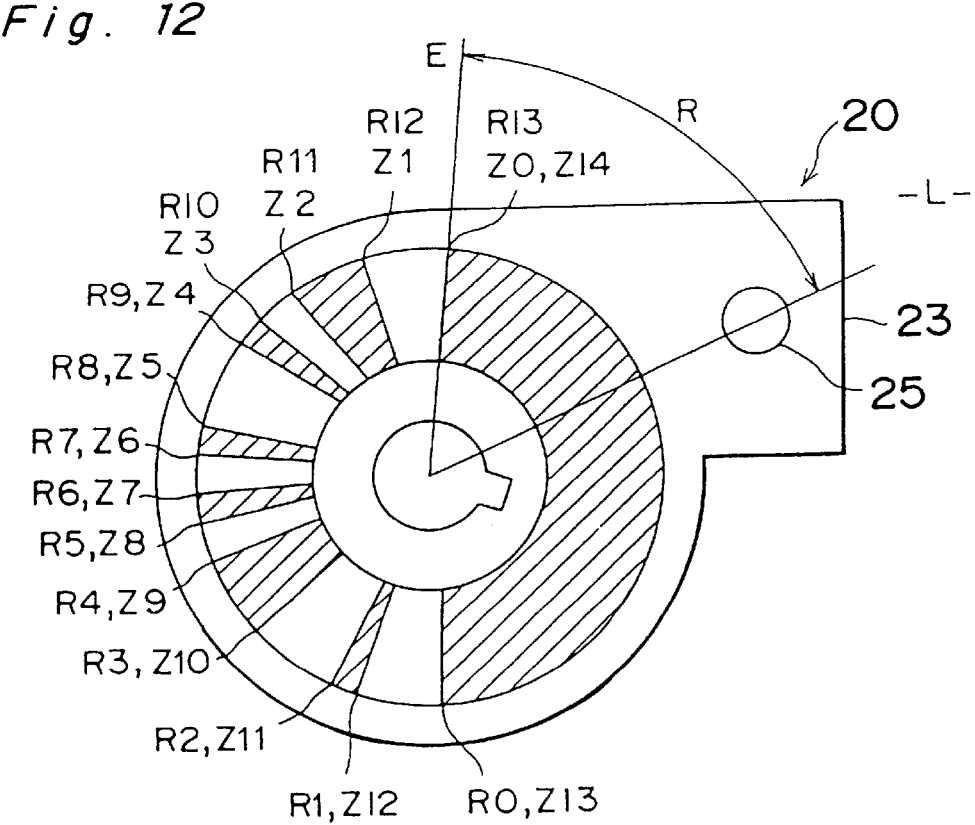
FIG. 12 is a sectional view, similar to FIG. 6, showing the cartridge film at the time when the film has been developed.
Figure 13:
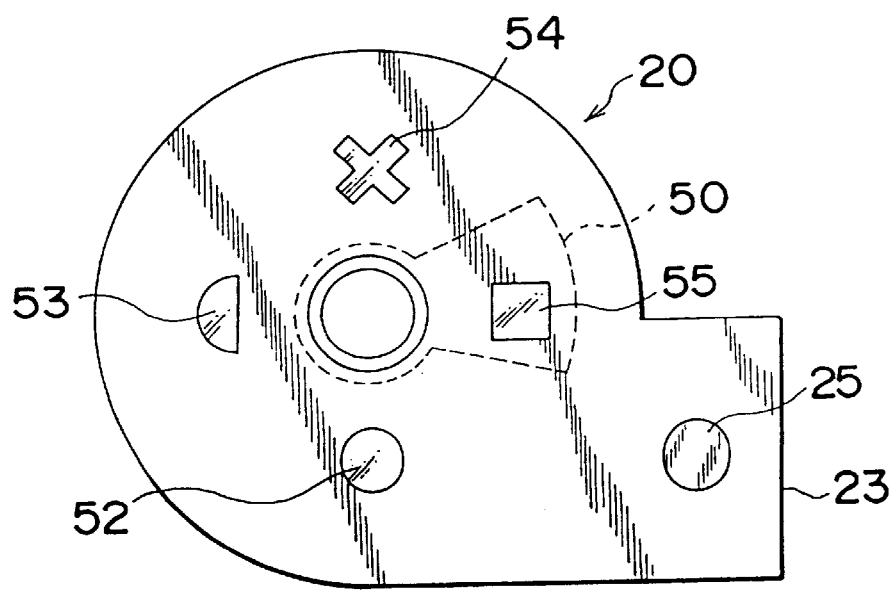
FIG. 13 is a sectional view, similar to FIG. 7, showing the cartridge film at the time when the film has been developed.
Figure 14:
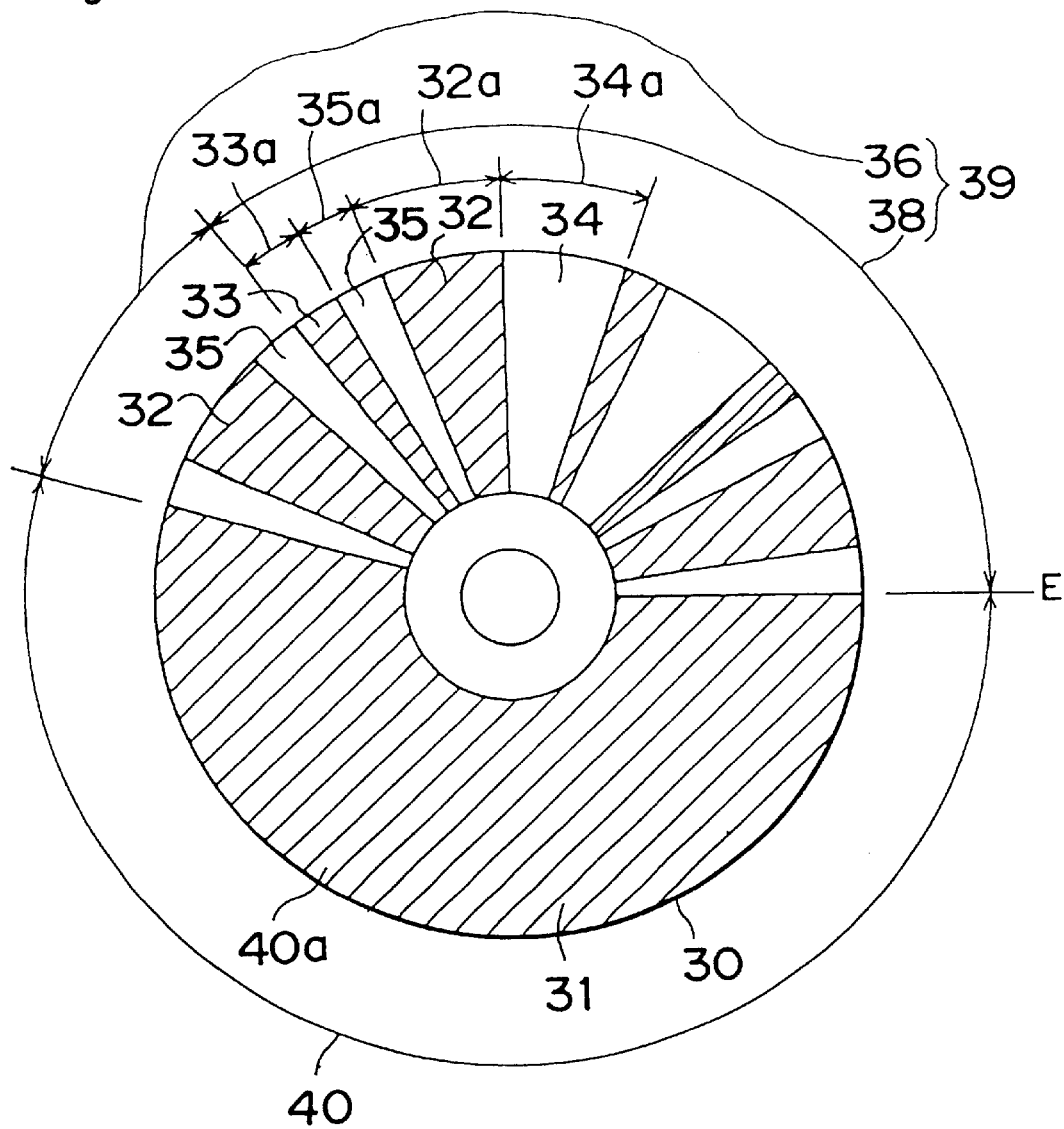
FIG. 14 is a plan view showing a bar code disk.

With reference to FIGS. 1 through 14, the construction of a film cartridge to be used in a camera and that of the camera are described below. FIG. 1 is a perspective view showing a cartridge film to be used in the camera. FIG. 2 is a plan view showing a film of the cartridge film shown in FIG. 1. FIG. 3(a) is a perspective view showing the outlook of a camera which uses the cartridge film shown in FIG. 1. FIG. 3(b) is a sectional view showing principal portions of the camera shown in FIG. 3(a). FIGS. 4 through 13 are sectional views showing the cartridge film. FIG. 14 is a plan view showing a bar code disk.

As shown in FIGS. 3(a), (b), a cover 18 formed on the bottom of the camera 10 is opened to insert a film cartridge 20 into a cartridge chamber 16.

As shown in FIGS. 1 and 3(b), a film 26 wound around a spool shaft 24 is accommodated inside a cartridge case 22. An engaging groove (not shown) formed on one end of the spool shaft 24 engages a claw (not shown) of a drive spool shaft provided in the camera 10 when the film cartridge 20 is loaded into the cartridge chamber 16. The drive spool shaft is driven by a motor (not shown).

Figure 4:
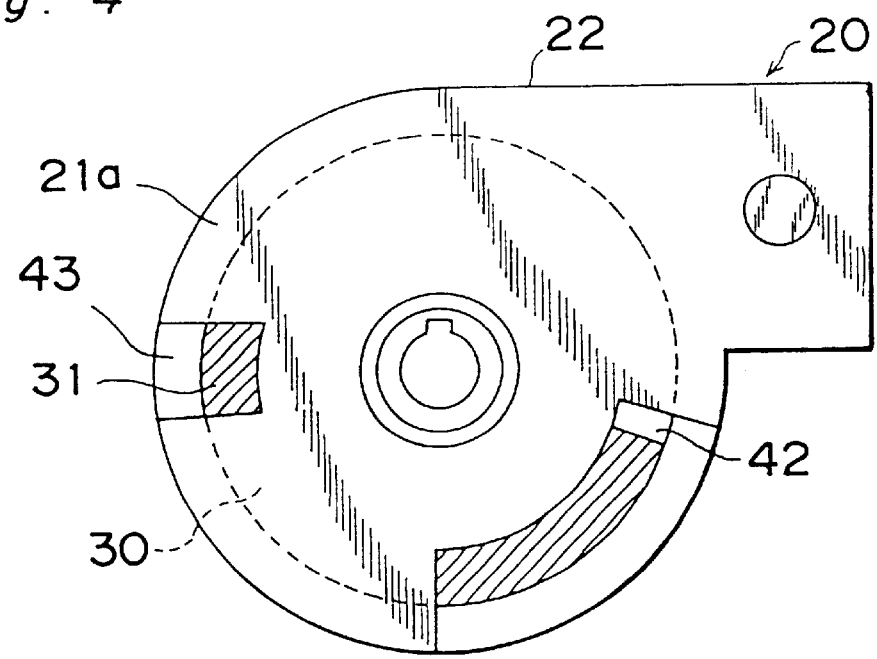
FIG. 4 is a sectional view, showing the cartridge film, taken along a line IV—IV of FIG. 3(b)

As shown in FIGS. 1, and 3(b) and 4, a bar code disk 30 having a bar code radially formed on its upper surface 31 is fixed to the upper end of the spool shaft 24. A fan-shaped film state display plate 50 which is a reflection plate is fixed to the lower end of the spool shaft 24. The bar code disk 30 and the film state display plate 50 rotate together with the spool shaft 24 inside the case 22. The bar code disk 30 and the film state display plate 50 can be partially seen from outside.

As shown in FIG. 2, perforations 28 are formed on the upper side of the film 26, and a magnetic-recording region 29 are formed on the lower side thereof. Utilizing the perforations 28, the frame 27 is placed in position in feeding the film 26. The magnetic-recording region 29 has a magnetic material applied thereto so as to record data thereon and reproduce it therefrom.

In correspondence to the position of an exposing frame (not shown), there are provided, in the camera 10, a photo-reflector PR4 (not shown) for detecting the perforations 28 of the film 26 and a magnetic head (see FIGS. 42 through 56) for recording data on the magnetic-recording region 29 of the film 26 and reproducing it therefrom.

Figure 5:
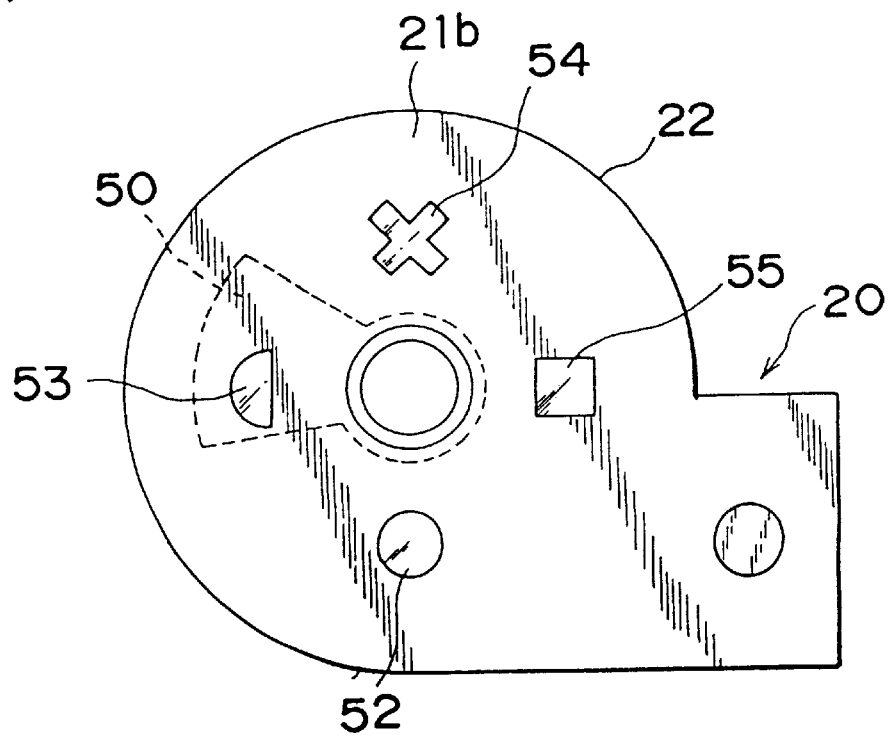
FIG. 5 is a sectional view, showing the cartridge film, taken along a line V—V of FIG. 3(b)

As shown in FIG. 5, four display windows (transparent holes) 52 through 55 are formed on a bottom wall 21b of the film cartridge 20. A white surface indicating the state (exposed, unexposed, and the like) of the film 26 of the film state display plate 50 is seen through the display windows 52 through 55.

That is, the circular nonexposure display window 52 displays that the film 26 has not been used and can be exposed; the semicircular partial exposure display window 53 displays that a part of the frames 27 of the film 26 has been exposed; the X-shaped exposure display window 54 displays that all the frames 27 of the film 26 have been exposed; and the square development-completion display window 54 displays that the film 26 has been developed. The display windows 52 through 55 are concentrically positioned at an interval of 90°. Each of them displays "white" when the film state display plate 50 is positioned over it and "black" when it is not positioned over it.

This construction allows an operator to view the state of the film 26 according to the position of the film state display plate 50 which rotates together with the spool shaft 24. The display windows 52 through 55 for displaying the state of the film as described above are called VEI marks.

The rotation of the drive spool shaft is controlled to stop the spool shaft 24 of the film cartridge 20 at predetermined positions (angles) so that when the film cartridge 20 is taken out from the cartridge chamber 16, the film cartridge 20 displays respective states of the film 26.

As shown in FIG. 4, display windows 42 and 43 are formed on the upper wall 21a of the film cartridge 20. Through the display windows 42 and 43, a part of the upper surface 31 of the bar code disk 30 or the entirety thereof can be seen, depending on the type of the film cartridge 20. Both types of the film cartridges 20 can be used in the camera 10. Because the bar code disk 30 is fixed to the spool shaft 24 and thus rotates together therewith, the state of the film 26 can be detected by the display of the bar code.

As shown in FIG. 14, the bar code formed on the upper surface 31 of the bar code disk 30 comprises a frame number display region 36 for displaying the number of the exposed frames 27; a sensitivity/type display region 38 for displaying the sensitivity and type (for example, negative/positive, color/monochrome) of the film 26; and a non-display region 40. Each of the frame number display region 36 and the sensitivity/type display region 38 comprises two kinds of white spaces 34 and 35 and two kinds of black bars 32 and 33 shown with oblique lines, thus constituting a bar code display region 39. The bars 32 and 33 and the spaces 34 and 35 constitute the wide bits 32 and 34 corresponding to the area of the bar 32 and the space 34, the angle widths 32a and 34a of which are 20° and narrow bits 33 and 35 corresponding to the area of the bar 33 and the space 35, the angle widths 33a and 35a of which are 8°.

The frame number display region 36 has three bits comprising one wide bit 32 or 34 and two narrow bits 33 or 35 (first combination); and two wide bits 32 or 34 and one narrow bit 33 or 35 (second combination). The angle of the frame number display region 36 is 36° (20°×1+8°×2) in the first combination, and 48° (20°×2+8°×1) in the second combination. FIGS. 1 and 14 show the first combination, and FIGS. 6, 8, 10, and 12 show the second combination.

The sensitivity/type display region 38 has two wide bars 32, two wide spaces 34, three narrow bars 33, and three narrow spaces 35. The angle of the sensitivity/type display region 38 is constantly 128° ((20°×2+8°×3)×2).

The non-display region 40 has a single bar 40a shown with oblique lines in FIG. 14. The angle of the non-display region 40 is 196° (360°–36°–128°) when the angle of the frame number display region 36 is 36°, while the angle of the non-display region 40 is 184° (360°–48°–128°) when the angle of the frame number display region 36 is 48°. The angle of the non-display region 40 is greater than those of the bars 32 and 33 of the bar code display region 39.

The bar code disk 30 and the film state display plate 50 are fixed to the spool shaft 24. Therefore, the states of the film can be detected according to the positions, namely, the rotation angles of the bar code disk 30.

With reference to FIGS. 6 through 13, supposing that a line connecting the axis of a door opening/closing shaft 25 for opening and closing an unshown door provided at a film exit 23 of the film cartridge 20 and the axis of the spool shaft 24 to each other is denoted as a reference line -L-; a boundary line between the sensitivity/type display region 38 formed on the upper surface 31 of the bar code disk 30 and the non-display region 40 is denoted as E; and the angle formed between the reference line -L- and the boundary line E is counterclockwise R, the relationship between the angle R and the displays of the respective film states are described below.

Figure 6:
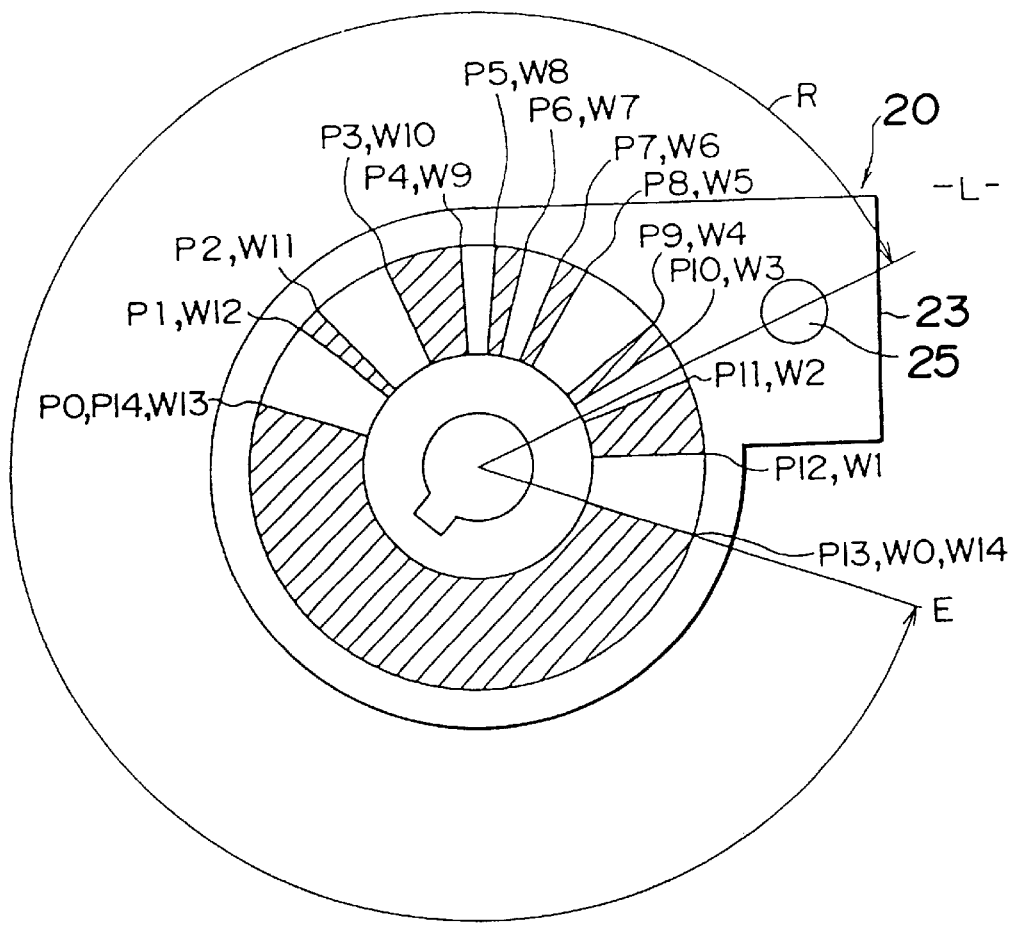
FIG. 6 is a sectional view, showing the cartridge film, taken along a line VI—VI of FIG. 3(b)
Figure 7:
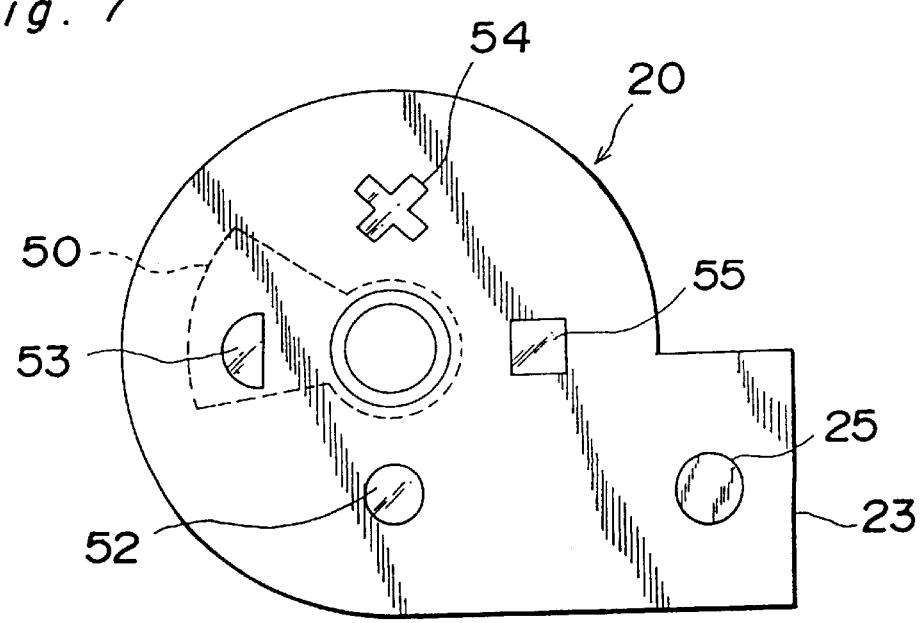
FIG. 7 is a sectional view, showing the cartridge film, taken along a line VII—VII of FIG. 3(b)
Figure 8:
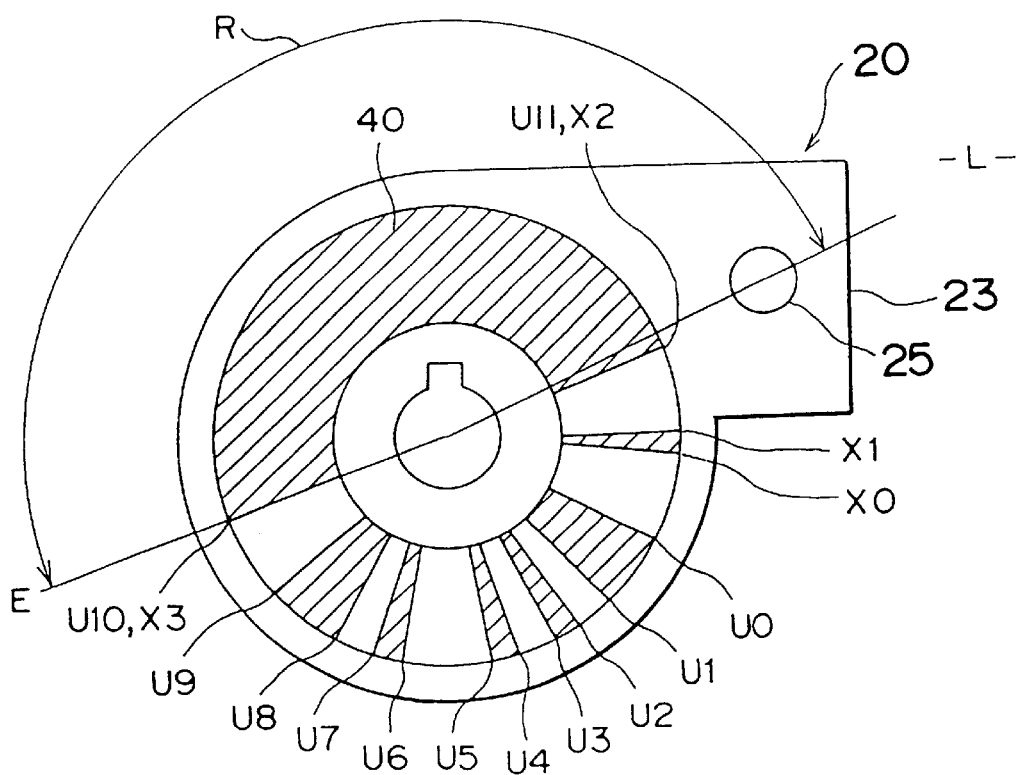
FIG. 8 is a sectional view, similar to FIG. 6, showing the cartridge film at the time when the film has not been exposed to light.
Figure 9:
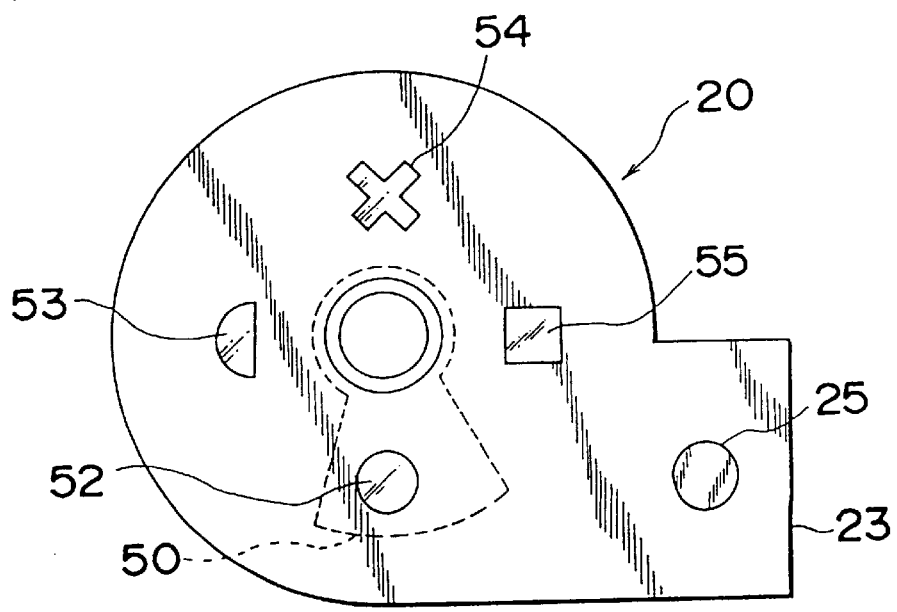
FIG. 9 is a sectional view, similar to FIG. 7, showing the cartridge film at the time when the film has not been exposed to light.
Figure 10:
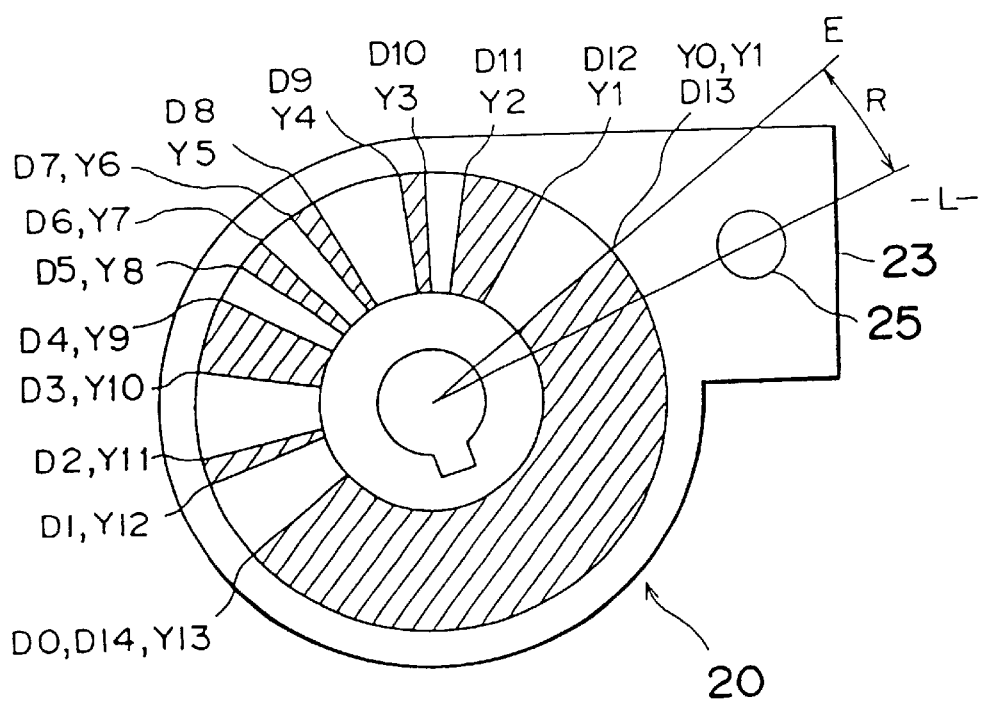
FIG. 10 is a sectional view, similar to FIG. 6, showing the cartridge film at the time when the film has been exposed to light.
Figure 11:
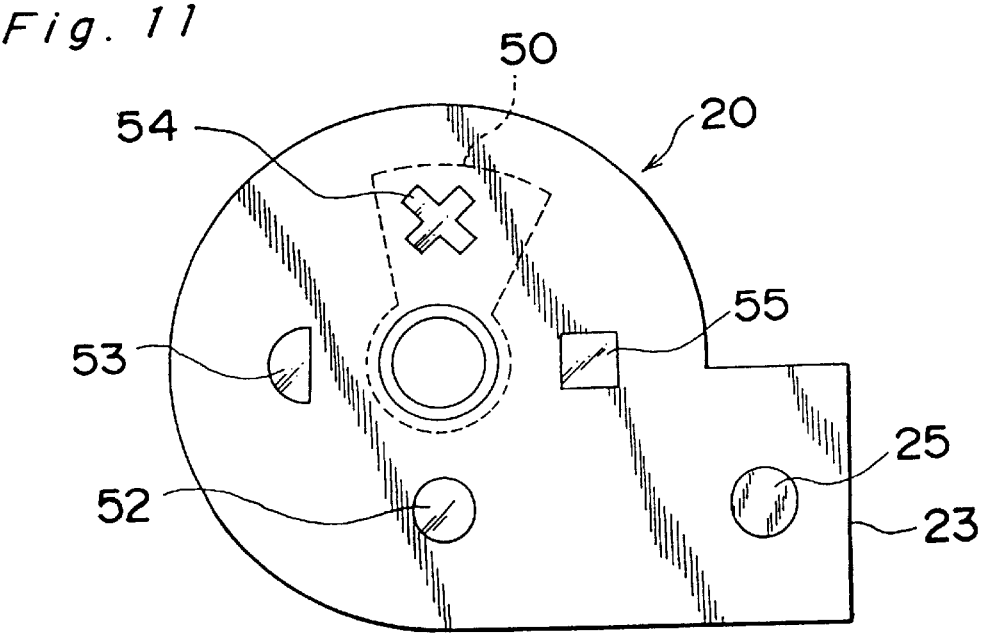
FIG. 11 is a sectional view, similar to FIG. 7, showing the cartridge film at the time when the film has been exposed to light.

That is, when the film state display plate 50 is positioned over the nonexposure display window 52 of the film cartridge 20, and thus when "unexposed" is indicated as shown in FIGS. 8 and 9, the angle R is 175.5±10°. When "partially exposed" is displayed as shown in FIGS. 6 and 7, i.e., when the spool shaft 24 rotates by 139.5° from the position at which "unexposed" is displayed, the angle R becomes 315.0±10°. When "exposed" is displayed as shown in FIGS. 10 and 11, i.e., when the spool shaft 24 rotates by 63° from the position at which "partially exposed" is displayed, the angle R becomes 18.0±10°. When "developed" is displayed as shown in FIGS. 12 and 13, i.e., when the spool shaft 24 rotates by 63° from the position at which "exposed" is displayed, the angle R becomes 81.0±10°.

Inside the camera 10, detection means, namely, photoreflectors PR1 (11), PR2 (12), PR3 (13) for detecting the display of the bar code disk 30 are formed above the cartridge chamber 16 such that they are positioned in confrontation with the upper surface 21a of the bar code disk 30. Each of the photoreflectors 11, 12, and 13 comprises a light emitting element and a light receiving element. The photoreflectors 11, 12, and 13 are spaced at regular intervals and provided at predetermined positions with respect to the film cartridge 20 as will be described later.

Figure 20:
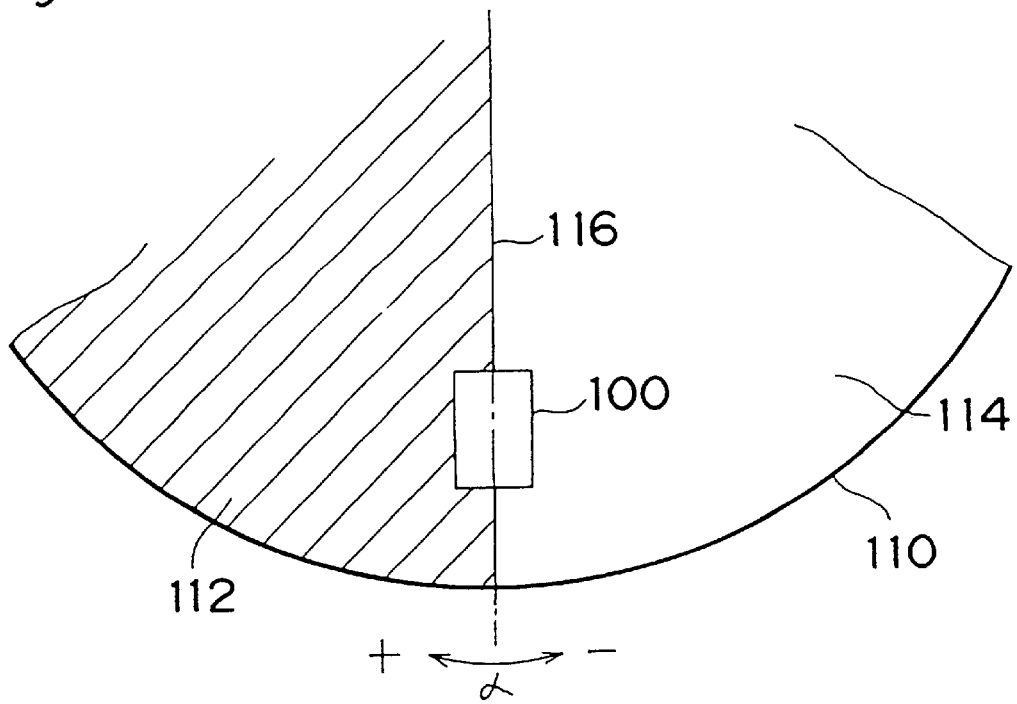
FIG. 20 is a plan view showing the relationship between a photoreflector and a bar code disk.
Figure 21:
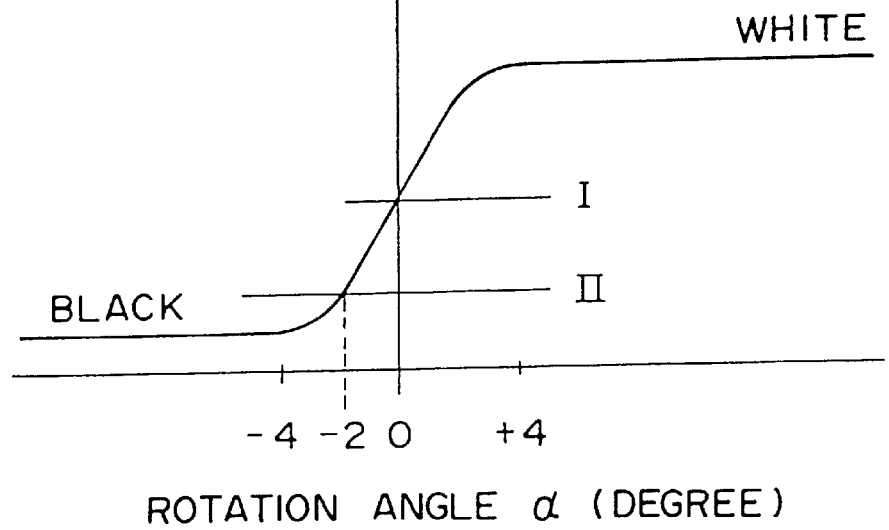
FIG. 21 is a graph showing a change in an output electric current of a photoreflector which occurs according to the position of the photoreflector relative to the position of the bar code disk.
Figure 22:
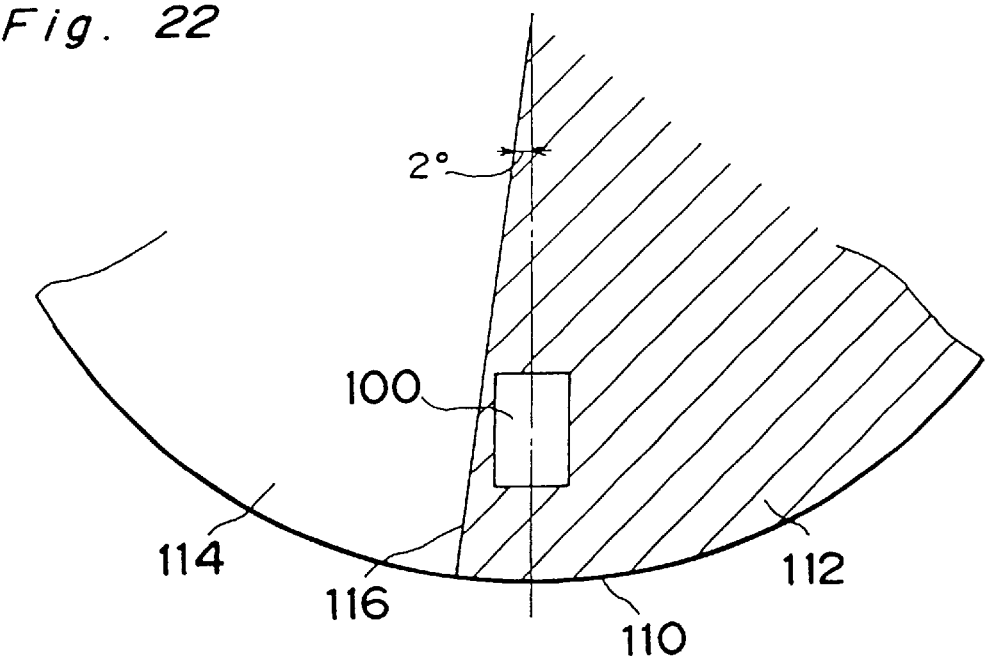
FIG. 22 is a plan view showing a boundary to be used to discriminate white and black from each other.
Figure 23:
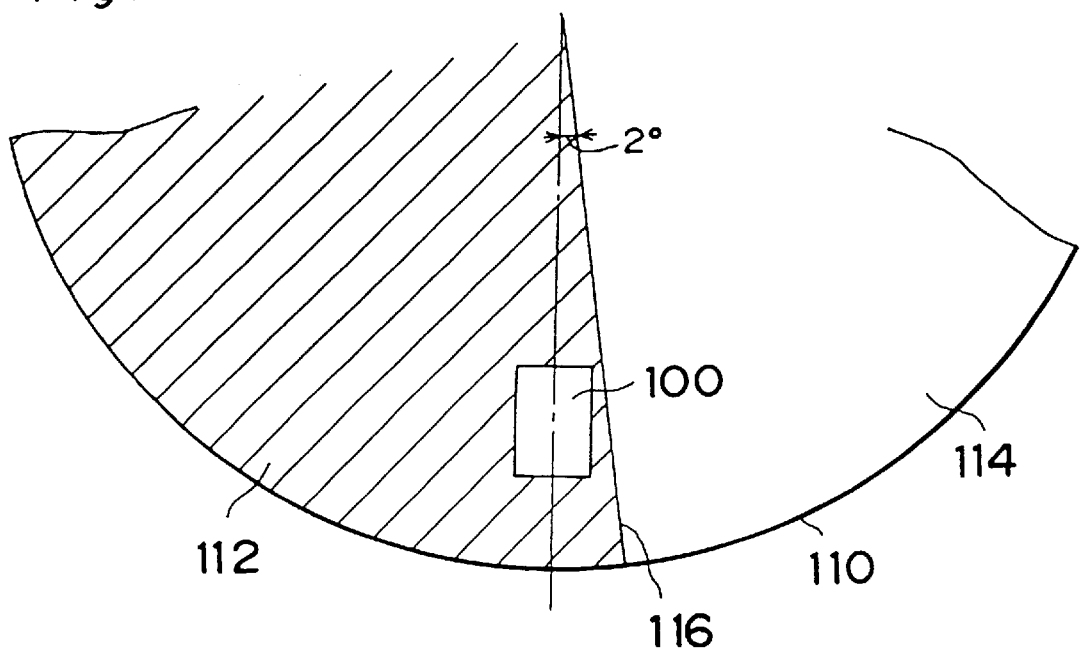
FIG. 23 is a plan view showing another boundary to be used to discriminate white and black from each other.
Figure 24:
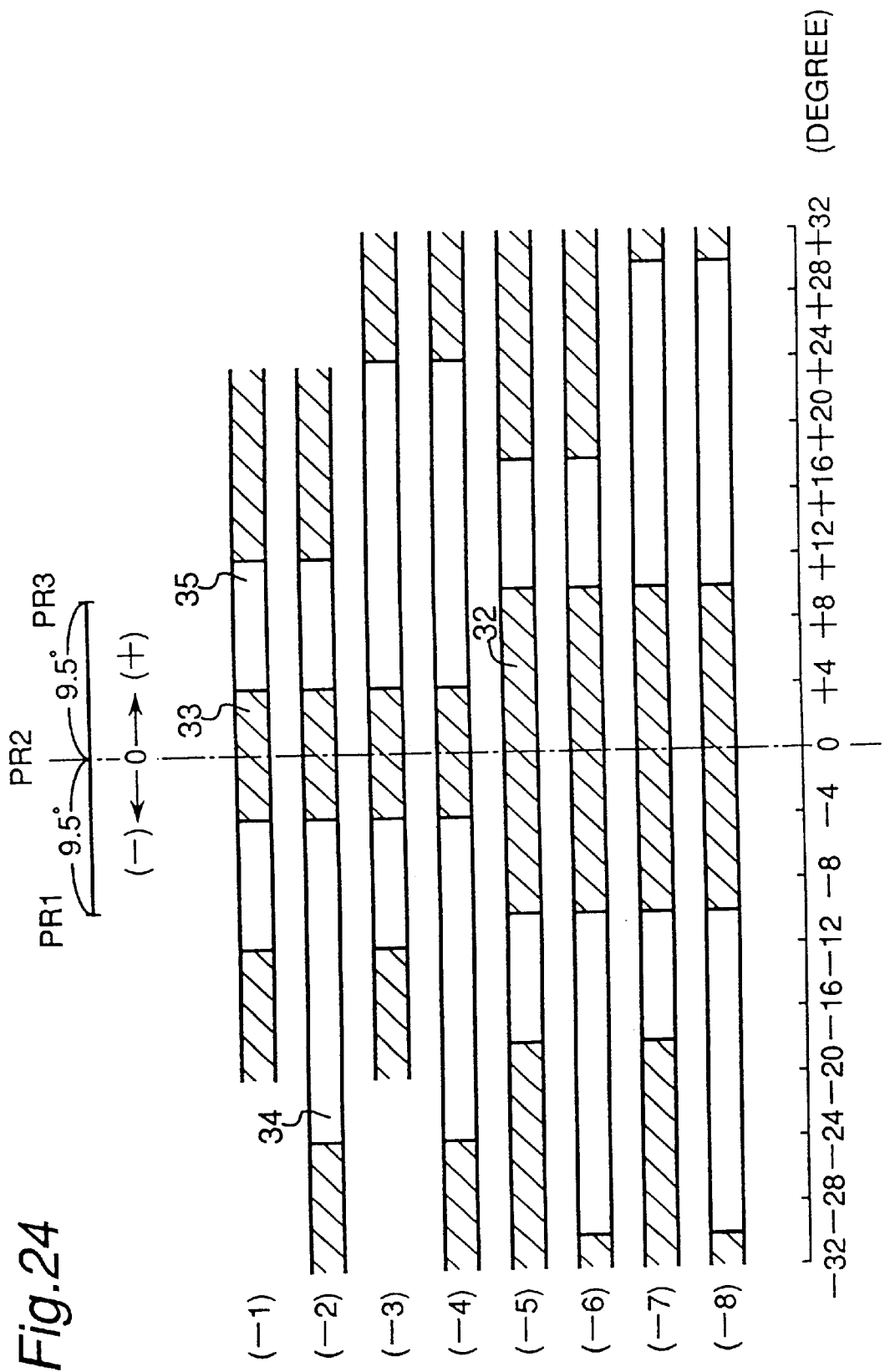
FIG. 24 is a schematic diagram showing the position relationship between the photoreflector and the bar code disk in a bar code display region.
Figure 25:
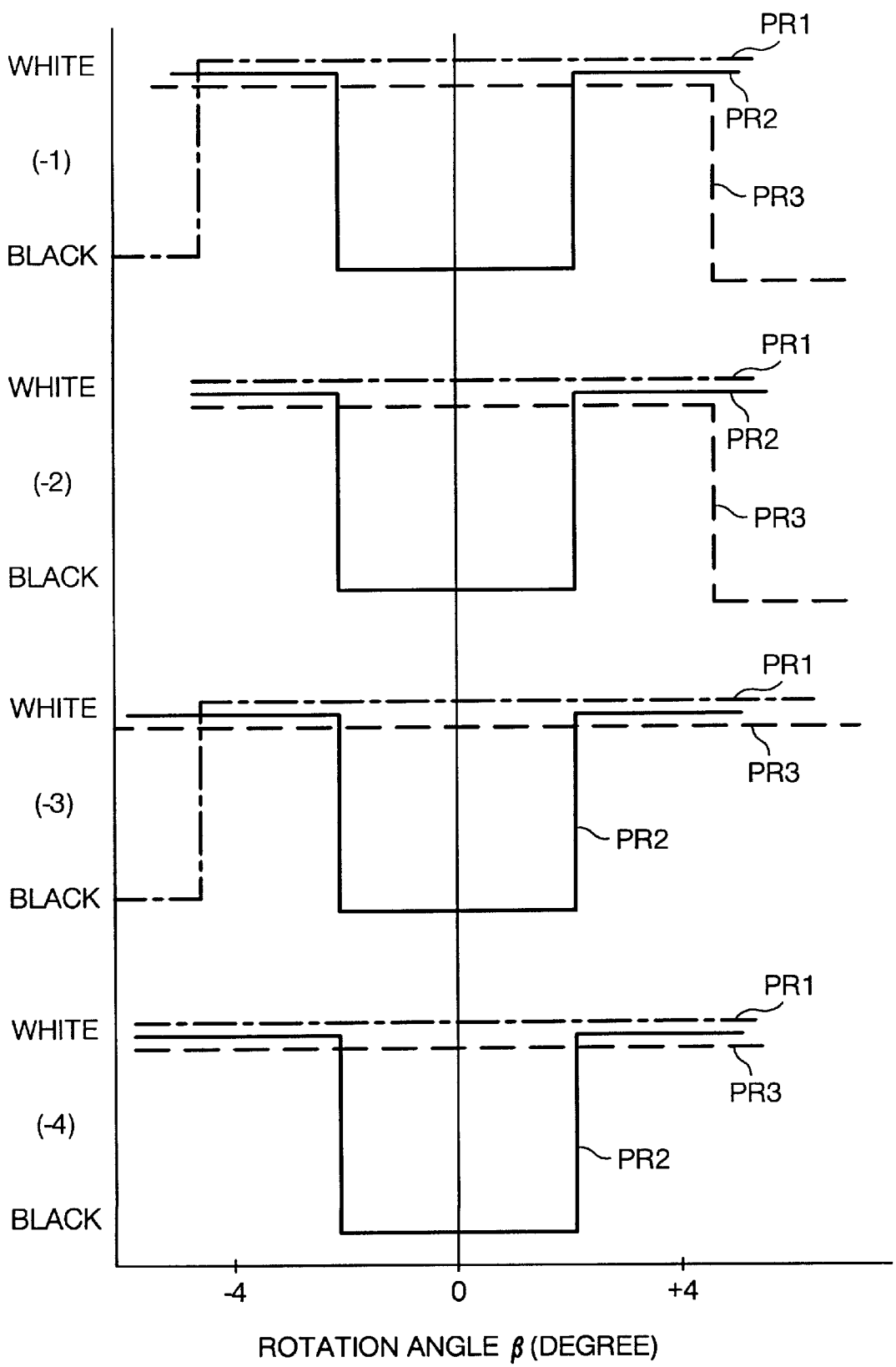
FIG. 25 is a graph showing how white and black are discriminated from each other in each of (−1) through (−4) of FIG. 24.
Figure 26:
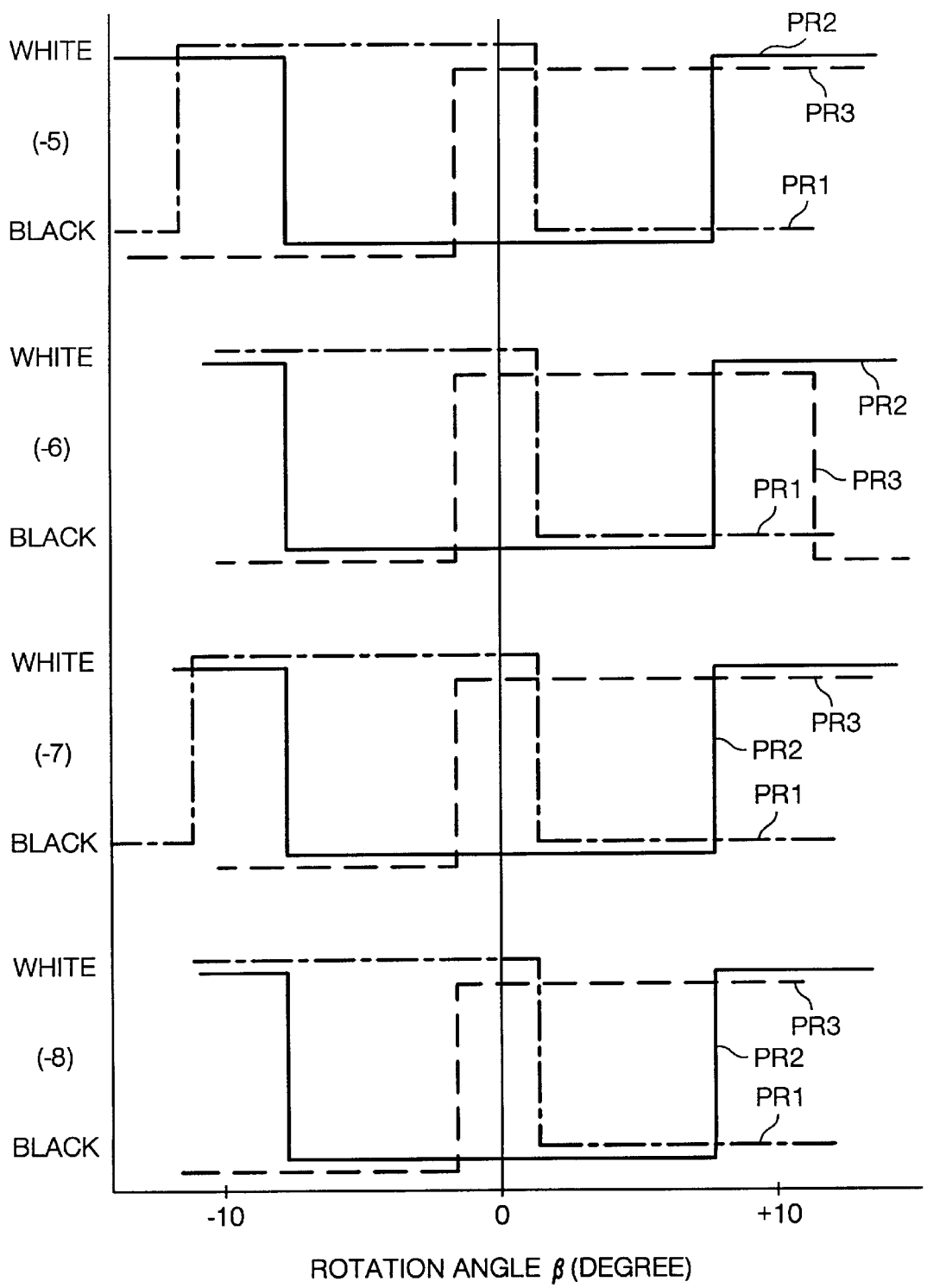
FIG. 26 is a graph showing how white and black are discriminated from each other in each of (−5) through (−8) of FIG. 24.
Figure 27:
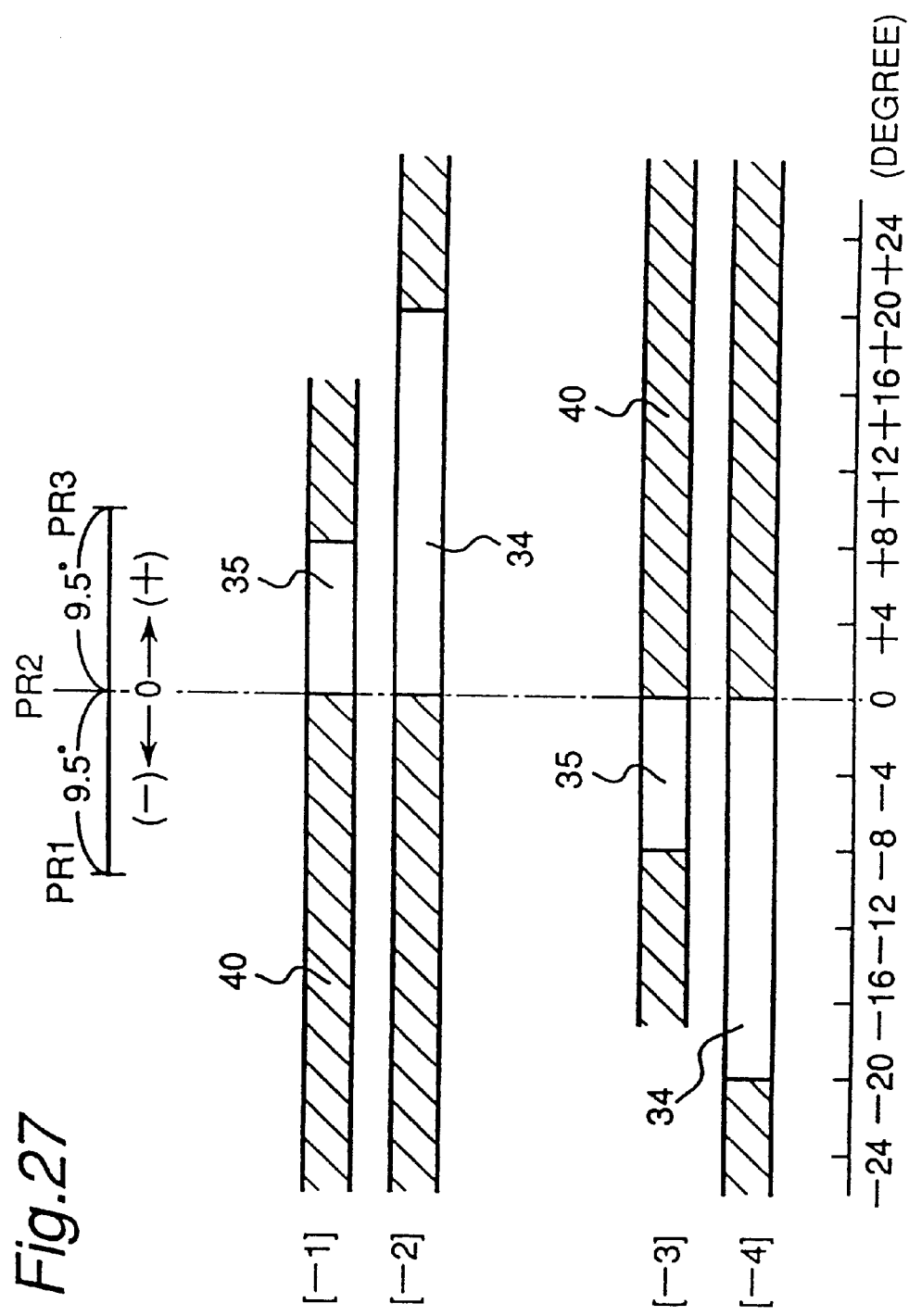
FIG. 27 is a schematic diagram showing the position relationship between photoreflectors and the bar code in proximity to a non-display region.
Figure 28:
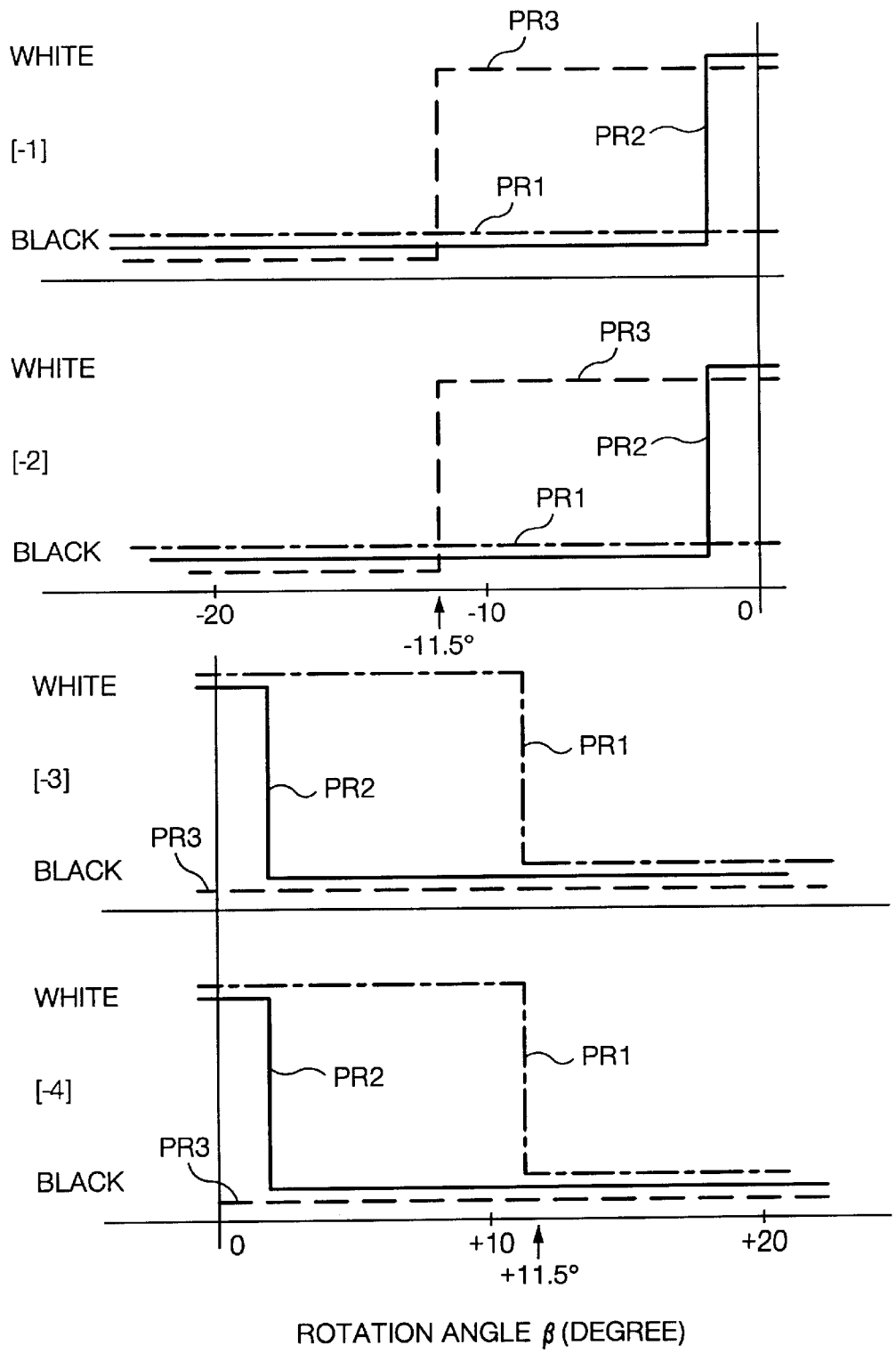
FIG. 28 is a graph how white and black are discriminated from each other in the position relationship shown in FIG. 27.
Figure 29:
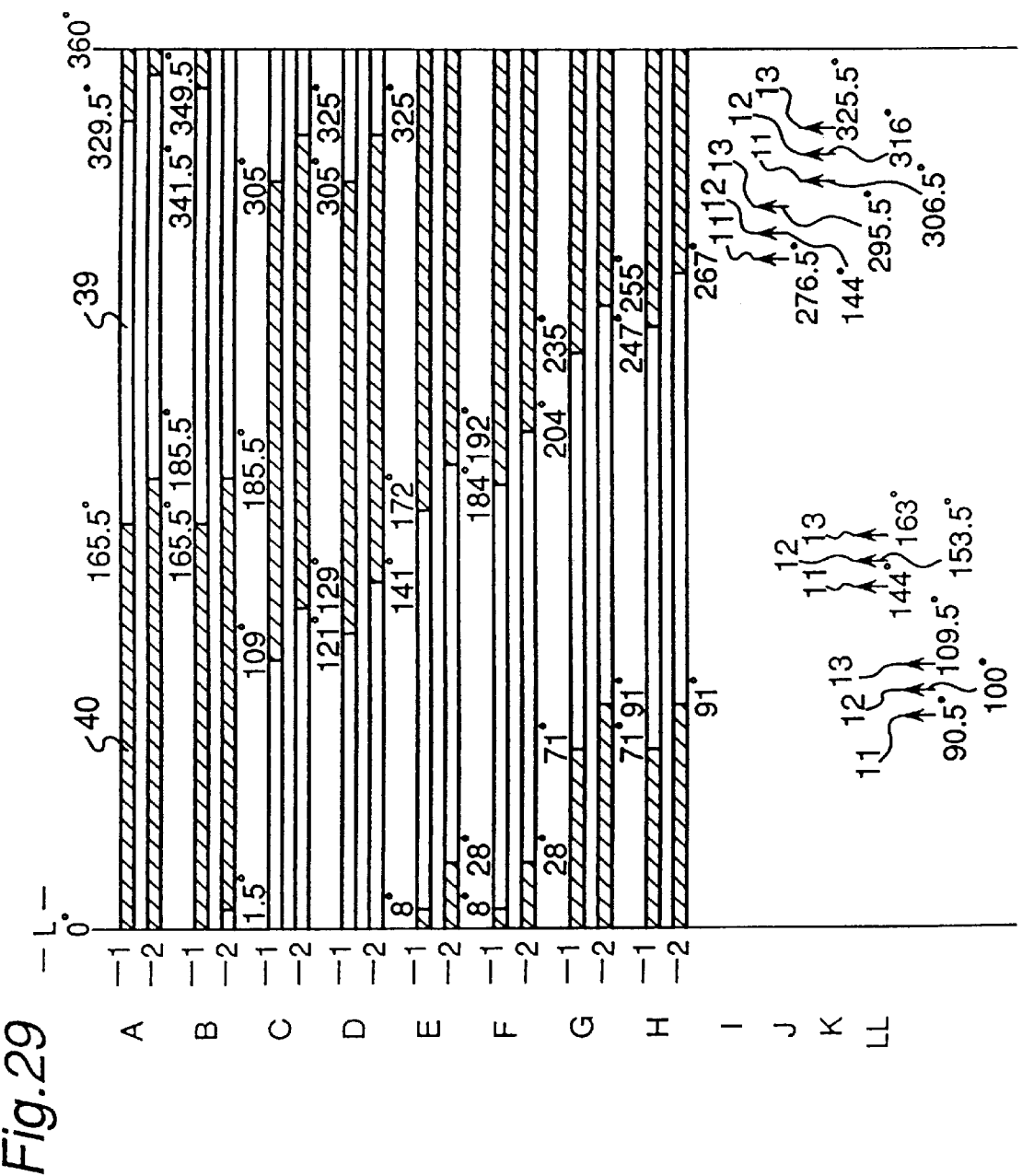
FIG. 29 is a schematic diagram showing the relationship between the stop position of the bar code disk and the positions of the photoreflectors shown in FIGS. 16 and 17 in displayed respective film states.

With reference to FIGS. 16 through 29, the photoreflectors 11, 12, and 13 are described in detail below. FIGS. 16 through 19 are explanatory views showing the arrangement of the photoreflectors PR1, PR2, and PR3. FIG. 20 is a plan view showing the relationship between a photoreflector and a bar code disk. FIG. 21 is a graph showing a change in an output electric current of the photoreflector which occurs according to the position of the photoreflector relative to the position of the bar code disk. FIGS. 22 and 23 are plan views each showing a boundary to be used to discriminate white and black from each other. FIG. 24 is a schematic diagram showing the position relationship between the photoreflector and the bar code disk in a bar code display region. FIGS. 25 and 26 are graphs showing how white and black are discriminated from each other in each of (–1) through (–8) of FIG. 24. FIG. 27 is a schematic diagram showing the position relationship between photoreflectors and the bar code in proximity to a non-display region. FIG. 28 is a graph showing how white and black are discriminated from each other in the position relationship shown in FIG. 27. FIG. 29 is a schematic diagram showing the relationship between the stop position of the bar code disk and the positions of the photoreflectors shown in FIGS. 16 and 17 in displayed respective film states.

Figure 16:
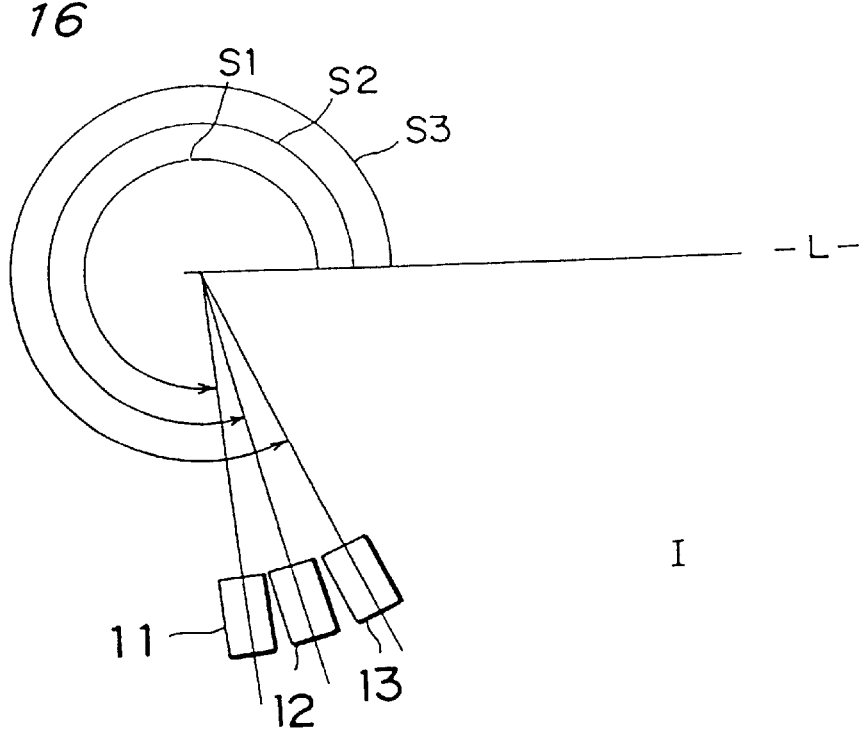
FIG. 16 is an explanatory view, taken along a line XVI—XVI of FIG. 3(b), showing the arrangement of photoreflectors of the camera according to an embodiment of the present invention.
Figure 17:
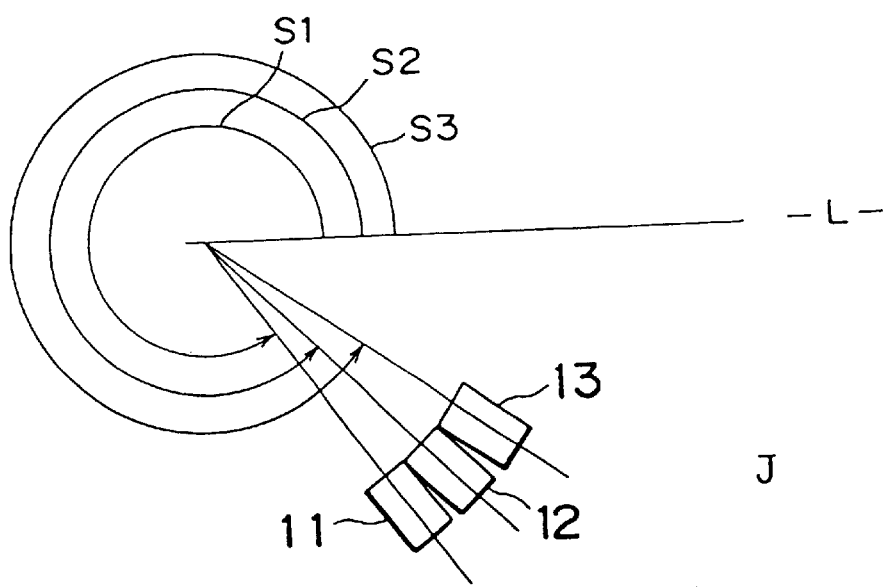
FIG. 17 is an explanatory view, similar to FIG. 16, showing the arrangement of photoreflectors of a camera according to an embodiment of the present invention.
Figure 18:
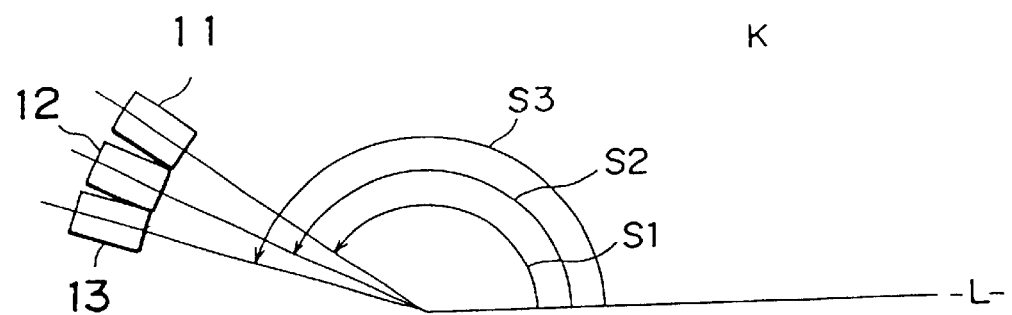
FIG. 18 is an explanatory view, similar to FIG. 16, showing the arrangement of photoreflectors of a camera according to an embodiment of the present invention.

Four kinds of predetermined positions (I, J, K, LL) of the photoreflectors 11, 12, and 13 shown in FIGS. 16 through 18 are described below. The four kinds of the predetermined positions of the photoreflectors 11, 12, and 13 correspond to the positions of the four display windows 52 through 55 shown in FIG. 7 and are selected according to a desired object of a determination to be made on the state of the film 26.

That is, FIGS. 16 through 19 show the predetermined positions of the photoreflectors 11, 12, and 13 viewed from above the bar code disk 30 of the film cartridge 20 along the direction in which the spool shaft 24 extends. The photoreflectors 11, 12, and 13 are arranged at positions spaced by 6 mm from the center of the bar code disk 30 such that they are spaced at intervals of 9.5°. Supposing that the angles formed between the reference line -L- and each of the photoreflectors 11, 12, and 13 are S1, S2, and S3, the angles S1, S2, and S3 are as shown below: the angle S1 is 276.5°, the angle S2 is 286°, and the angle S3 is 295.5° in the case of (I) shown in FIG. 16; the angle S1 is 306.5°, the angle S2 is 316°, and the angle S3 is 322.5° in the case of (J) shown in FIG. 17; the angle S1 is 144°, the angle S2 is 153.5°, and the angle S3 is 163° in the case of (K) shown in FIG. 18; and the angle S1 is 90.5°, the angle S2 is 100°, and the angle S3 is 109.5° in the case of (LL) shown in FIG. 19.

The photoreflectors 11, 12, and 13 are located at any one of the positions, shown in FIGS. 16 through 19, predetermined with respect to the position of the film cartridge 20. The bar code disk 30 is stopped at any one of the predetermined positions in correspondence to a displayed film state, as shown in FIGS. 6, 8, 10, and 12. This construction allows displayed film states to be discriminated from each other when the bar code disk 30 is stationary. The method of discriminating respective displayed film states from each other is described in detail below.

Description is made below on the method of discriminating "white", namely, the spaces 34 and 35, "black", namely, the bars 32 and 33, and the non-display region 40 from each other, based on output signals of the photoreflectors 11, 12, and 13.

FIG. 21 shows output electric current of a photoreflector 100 measured when the photoreflector 100 spaced by 6 mm from the center of the bar code disk 110 detects a bar 112 of a bar code disk 110 and/or a space 114 thereof at a point immediately below the photoreflector 100. Rotation angles α of the bar code disk 110 indicate angles of the bar code relative to a reference angle 0° set when the center of the photoreflector 100 is located at the boundary line 116 between the bar 112 of the photoreflector 100 and the space 114 thereof. The rotation angle a of the bar code disk 110 in the clockwise direction is set to positive, while the rotation angle α thereof in the counterclockwise direction is set to negative. The photoreflector 100 detects the space 114 when the bar code disk 110 rotates in the positive direction, whereas it detects the bar 112 when the bar code disk 110 rotates in the negative direction.

As indicated in FIGS. 20 and 21, when the photoreflector 100 detects the bar 112 as a result of the rotation of the bar code disk 110 in the negative direction, the intensity of the output electric current of the photoreflector 100 decreases because the bar 112 has a lower reflectivity than the space 114. When the photoreflector 100 detects the space 114 as a result of the rotation of the bar code disk 110 in the positive direction, the intensity of the output electric current of the photoreflector 100 increases. The intensity of the output electric current of the photoreflector 100 changes transitionally in the region proximate to the boundary line 116 between the bar 112 and the space 114.

The position of the boundary line 116 between the bar 112 and the space 114 can be correctly detected by setting the boundary determination level at the center of the sensitivity of the photoreflector 100, as indicated by (I) of FIG. 21. The boundary determination level (I) shown in FIG. 21 is used to read the width of a bar indication signal and that of a space indication signal in reading bar code information or correctly detect the position of the bar code disk 110 in controlling the stop position in its rotation.

When the boundary determination level is set at a level (II) lower than the boundary determination level (I), the bar 112 (black) and the space 114 (white) are detected, based on the reference position at which the boundary line 116 is dislocated by 2° from the center of the sensitivity of the photoreflector 100. The boundary determination level (II) is used in discriminating displayed film states from each other, based on the intensity of the output electric current of the photoreflectors 11, 12, and 13.

Description is made below on the principle for discriminating the bar code display region 39 of the bar code disk 30 and the non-display region 40 thereof from each other, using the boundary determination level (II) shown in FIG. 21 and based on the level of the output signals of the photoreflectors 11, 12, and 13.

Initially, description is made below on the principle for detecting the bar code display region 39.

FIG. 24 shows the relationship between the position of the bar code display region 39 and those of the photoreflectors 11, 12, and 13.

In reference numerals (−1) through (−4) of FIG. 24, the photoreflector 12 is positioned at the center of the narrow bar 33, and the photoreflectors 11 and 13 are positioned on both sides of the photoreflector 12. Reference numeral (−1) shows a case in which the narrow spaces 35 are located at both sides of the narrow bar 33; reference numeral (−2) shows a case in which the narrow space 35 is positioned at one side (right side in FIG. 24) of the narrow bar 33 and the wide space 34 is positioned at the opposite side (left side) thereof; reference numeral (−3) shows a case in which the wide space 34 is positioned at one side (right side in FIG. 24) of the narrow bar 33 and the narrow space 35 is positioned at the opposite side (left side) thereof; and reference numeral (−4) shows a case in which the wide spaces 34 are located at both sides of the narrow bar 33.

In reference numerals (−5) through (−8) of FIG. 24, the photoreflector 12 is positioned at the center of the wide bar 32, and the photoreflectors 11 and 13 are positioned on both sides of the photoreflector 12. Reference numeral (−5) shows a case in which the narrow spaces 35 are located at both sides of the narrow bar 33; reference numeral (−6) shows a case in which the narrow space 35 is positioned at one side (right side in FIG. 24) of the wide bar 32 and the wide space 34 is positioned at the opposite side (left side) thereof; reference numeral (−7) shows a case in which the wide space 34 is positioned at one side (right side in FIG. 24) of the wide bar 32 and the narrow space 35 is positioned at the opposite side (left side) thereof; and reference numeral (−8) shows a case in which the wide spaces 34 are located at both sides of the wide bar 32.

FIGS. 25 and 26 show how the white (spaces 34 and 35) and the black (bars 32 and 33 or non-display region 40) are discriminated from each other in the eight cases shown in FIG. 24, based on the levels of the output signals of the photoreflectors 11, 12, and 13 when the bar code disk 30 rotates relative to the photoreflector 12. Rotation angles β of the bar code disk 30 shown on abscissa of FIGS. 25 and 26 indicate the angles of the bar code relative to a reference angle of 0° set when the photoreflector 12 is positioned at the center of the narrow bar 33 or the wide bar 32. As shown in FIG. 24, the rotation angle β is set to positive when the photoreflectors 11, 12, and 13 move to the right with respect to the bar code, whereas it is set to negative when they move to the left with respect thereto. FIG. 25 shows the range of the rotation angle β=±4° with respect to the narrow bar 33 having an angle width 8°. FIG. 26 shows the range of rotation angle β=±10° with respect to the wide bar 32 having an angle width 20°. The cases shown by (−1) through (−8) of FIG. 24 correspond to the cases shown by (−1) through (−8) of FIGS. 25 and 26, respectively. As the boundary determination level, the boundary determination level (II) of FIG. 21 is used.

As indicated in FIGS. 25 and 26, when the photoreflector 12 is located over the narrow bar 33 or the wide space 34, at least one of the photoreflectors 11, 12, and 13 indicates "white" (two photoreflectors detect "white" in FIGS. 25 and 26). When the photoreflector 12 is located over the wide space 34 or the narrow space 35, the photoreflector 13 indicates "white".

Accordingly, when the photoreflector 12 is located over the bar code display region 39, at least one of the photoreflectors 11, 12, and 13 indicates "white".

The principle for detecting the non-display region 40 of the bar code disk 30 is described below.

When the photoreflectors 11, 12, and 13 are located within the non-display region 40 of the bar code disk 30, they indicate "black".

As shown in FIG. 27, there are four cases in the position relationship between the non-display region 40 and the spaces 34 and 35 when the photoreflectors 11, 12, and 13 are located in proximity to the boundary line between the non-display region 40 and the bar code display region 39: a case in which as shown in [−1] of FIG. 27, the narrow space 35 is positioned at the right of the non-display region 40; a case in which as shown in [−2] of FIG. 27, the wide space 34 is positioned at the right of the non-display region 40; a case in which as shown in [−3] of FIG. 27, the narrow space 35 is positioned at the left of the non-display region 40; and a case in which as shown in [−4] of FIG. 27, the wide space 34 is positioned at the left of the non-display region 40.

FIG. 28 shows how white (spaces 34 and 35) and black (bars 32 and 33 or non-display region 40) are discriminated from each other in the four cases shown in FIG. 27, based on the level of the output signals of the photoreflectors 11, 12, and 13 when the bar code disk 30 rotates relative to the photoreflector 12 positioned interposed between the photoreflectors 11 and 13. The rotation angles β of the bar code disk 30 shown on abscissa of FIG. 27 indicate angles of the bar code relative to the reference angle of 0° set when the center of the photoreflector 12 is positioned at the boundary line between the non-display region 40 and the bar code display region 39. As shown in FIG. 27, the rotation angle β is set to positive when the photoreflectors 11, 12, and 13 move to the right with respect to the bar code, whereas it is set to negative when they move to the left with respect to the bar code.

The cases shown by [−1] through [−4] of FIG. 28 correspond to the cases shown by [−1] through [−4] of FIG. 27, respectively. As the boundary determination level, the boundary determination level (II) of FIG. 21 is used.

As indicated in FIG. 28, at least one of the photoreflectors 11, 12, and 13 indicates "white" when the photoreflector 12 is located over the region between the boundary line positioned between the bar code display region 39 and the non-display region 40 and the line which is present in the non-display region 40 and forms 11.5° with the boundary line.

As apparent from the foregoing description, at least one of the photoreflectors 11, 12, and 13 indicates "white" when the photoreflector 12 is located over the bar code display region 39 or over the region between the boundary line positioned between the bar code display region 39 and the non-display region 40 and the line which is present in the non-display region 40 and forms 11.5° with the boundary line. All the photoreflectors 11, 12, and 13 indicate "black" when the photoreflector 12 is located over the non-display region 40 such that the line connecting the position of the photoreflector 12 and a point immediately over the axis of the spool shaft 24 to each other forms an angle more than 11.5° with the boundary line.

FIG. 29 shows the relationship between the position of the bar code display region 39 as well as that of the non-display region 40 and the position of the photoreflectors 11, 12, and 13 shown in FIGS. 16 through 18 in the respective film states. Angles shown on the abscissa are measured counterclockwise with respect to the reference line -L-. Plain portions indicate the bar code display region 39, and portions shown with oblique lines show the non-display region 40.

Referring to FIG. 29, reference symbol (A) shows the position of the bar code disk 30 in a case where a displayed film state is "unexposed"; and a frame number code (3-bit code) comprises two narrow bits and one wide bit (angle of the 3-bit code is 36°, and the angle of the non-display region 40 is 196°). Reference numeral (−1) shows a case in which the bar code disk 30 is dislocated clockwise by 10° from a predetermined position, namely, unexposed state-display position. Reference numeral (−2) shows a case in which the bar code disk 30 is dislocated counterclockwise by 10° from the predetermined position. Reference symbol (B) shows the position of the bar code disk 30 in a case where a displayed film state is "unexposed"; and the frame number code 36 (3-bit code) comprises one narrow bit and two wide bits (angle of the 3-bit code is 48°, and the angle of the non-display region 40 is 184°).

Reference symbol (C) shows the position of the bar code disk 30 in a case where a displayed film state is "partially exposed"; and the frame number code (3-bit code) comprises two narrow bits and one wide bit (angle of the 3-bit code is 36°, and the angle of the non-display region 40 is 196°). Reference symbol (D) shows the position of the bar code disk 30 in a case where a displayed film state is "partially exposed"; and the frame number code (3-bit code) comprises one narrow bit and two wide bits (angle of the 3-bit code is 48°, and the angle of the non-display region 40 is 184°).

Reference symbol (E) shows the position of the bar code disk 30 in a case where a displayed film state is "exposed"; and the frame number code (3-bit code) comprises two narrow bits and one wide bit (angle of the 3-bit code is 36°, and the angle of the non-display region 40 is 196°). Reference symbol (F) shows the position of the bar code disk 30 in a case where a displayed film state is "exposed"; and the frame number code (3-bit code) comprises one narrow bit and two wide bits (angle of the 3-bit code is 48°, and the angle of the non-display region 40 is 184°).

Reference symbol (G) shows the position of the bar code disk 30 in a case where a displayed film state is "developed"; and the frame number code (3-bit code) comprises two narrow bits and one wide bit (angle of the 3-bit code is 36°, and the angle of the non-display region 40 is 196°). Reference symbol (H) shows the position of the bar code disk 30 in a case where a displayed film state is "developed"; and the frame number code (3-bit code) comprises one narrow bit and two wide bits (angle of the 3-bit code is 48°, and the angle of the non-display region 40 is 184°).

Reference symbol (I) shows a state in which the photoreflectors 11, 12, and 13 are located at the positions shown in FIG. 16. In the positions, in the case of the unexposed film (see A and B of FIG. 29), the photoreflectors 11, 12, and 13 are positioned in confrontation with the bar code display region 39. Therefore, at least one of the photoreflectors 11, 12, and 13 detects "white". In the case of the "partially exposed" (see C and D of FIG. 29) film, the exposed (see E and F of FIG. 29) film, and the developed (see G and H of FIG. 29) film, the photoreflectors 11, 12, and 13 are positioned in confrontation with the non-display region 40. Thus, the photoreflectors 11, 12, and 13 detect "black". Referring to FIG. 29, whether the photoreflectors 11, 12, and 13 have detected "white" or "black" can be understood according to whether they are positioned in confrontation with the bar code display region 39 or the non-display region 40 in each of the displayed film states A through H. Accordingly, it can be determined whether the film has not been exposed or not, according to the positions of the photoreflectors 11, 12, and 13 shown by (I) of FIG. 29.

Reference symbol (J) shows a state in which the photoreflectors 11, 12, and 13 are located at the positions shown in FIG. 17. In the positions, in the case of the unexposed film and the partially exposed film, at least one of the photoreflectors 11, 12, and 13 detects "white". In the case of the exposed film and the developed film, the photoreflectors 11, 12, and 13 detect "black". Therefore, it can be determined whether the film has been unexposed/partially exposed or exposed/developed, according to the positions of the photoreflectors 11, 12, and 13 shown by (J) of FIG. 29.

Reference symbol (K) shows a state in which the photoreflectors 11, 12, and 13 are located at the positions shown in FIG. 18. In the positions, in the case of the exposed film and the partially exposed film, the photoreflectors 11, 12, and 13 detect "black". In the case of the exposed film and the developed film, at least one of the photoreflectors 11, 12, and 13 detects "white". Therefore, it can be determined whether the film has been unexposed/partially exposed or exposed/developed, according to the positions of the photoreflectors 11, 12, and 13 shown by (K) of FIG. 29. Reference symbol (LL) shows a state in which the photoreflectors 11, 12, and 13 are located at the positions shown in FIG. 19. In the positions, in the case of the unexposed film, the photoreflectors 11, 12, and 13 detect "black". In the case of the partially exposed, exposed, and developed films, at least one of the photoreflectors 11, 12, and 13 detects "white". Accordingly, it can be determined whether the film has not been exposed or not, according to the positions of the photoreflectors 11, 12, and 13 shown by (LL) of FIG. 29.

Figure 15:
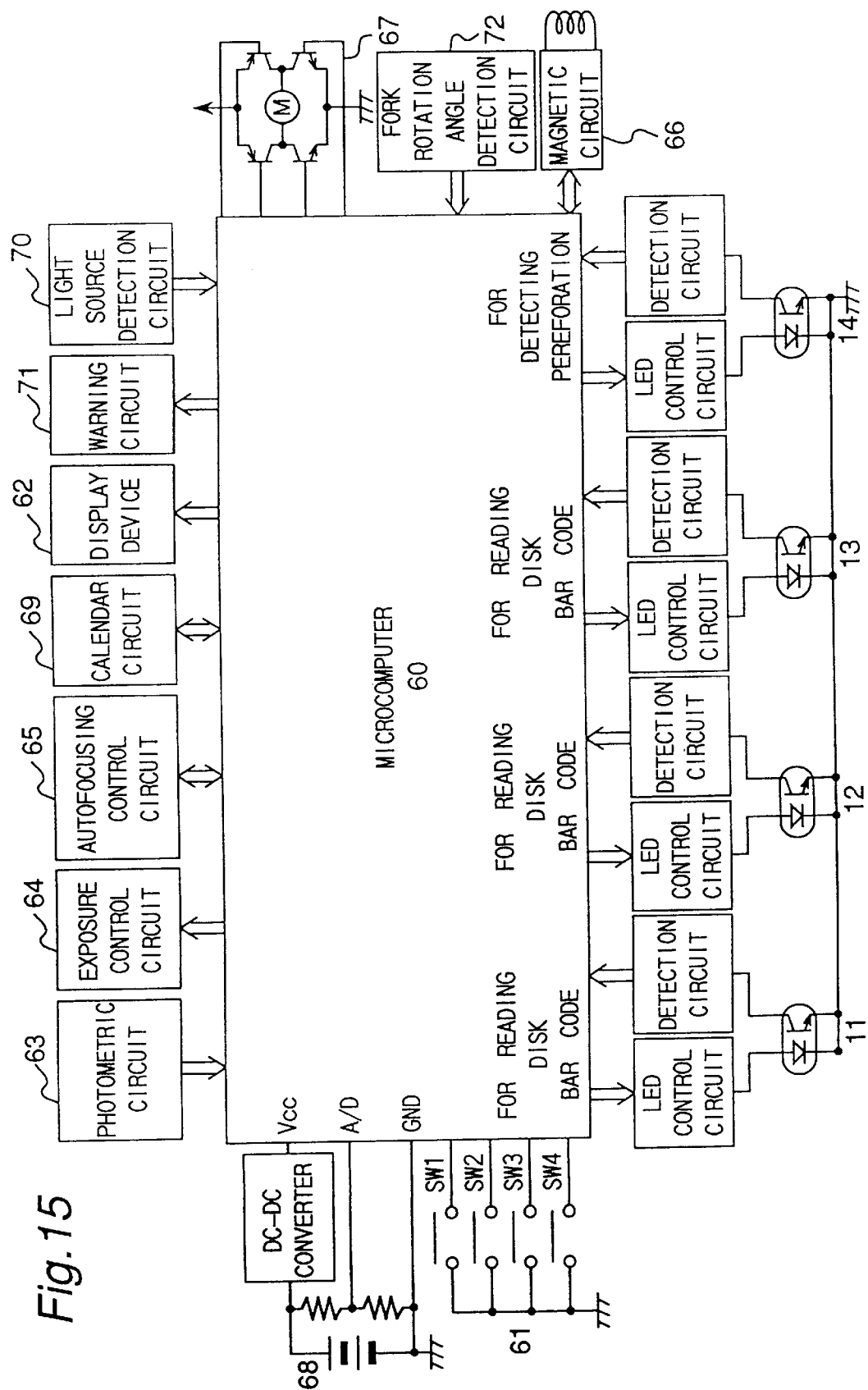
FIG. 15 is a block diagram showing an electric circuit of a camera according to an embodiment of the present invention.

The electric circuit of the camera 10 is described below with reference to the block diagram showing the electric circuit shown in FIG. 15.

A microcomputer 60 accommodates a CPU serving as a control means and a means for determining storage state.

The microcomputer 60 is connected with a switch 61, a display device 62, a photometric circuit 63, an exposure control circuit 64, an autofocusing control circuit 65, a magnetic head signal reproducing circuit 66, a motor driving circuit 67, a power source 68, a calendar circuit 69, a light source detection circuit 70, a warning circuit 71, and a fork rotation angle detection circuit 72.

The switch 61 includes a shutter switch SW1, a cartridge presence/nonpresence detection switch SW2 opened and closed according to whether the film cartridge 20 has been inserted into the cartridge chamber 16 or not, a switch SW3 interlocked with opening and closing operations of the cover 18, and a film rewinding switch SW4 for rewinding the film 26 after some frames, not all frames of the film, have been exposed to light. The display device 62 displays date, a day of the week, hour, minute, second, number of frames, the number of frames exposed to light, the number of frames not exposed to light, film sensitivity, type of film, result of determination on the state of film, result of determination on the kind of light source, state of power source, ratio between length and width of a photographic paper on which image is printed, and content of data written on magnetic track. The photometric circuit 63 detects the luminance of an object to be photographed. The exposure control circuit 64 controls exposure to attain an aperture value and a shutter speed which are determined based on a film sensitivity and the luminance of the object to be photographed. The autofocusing control circuit 65 performs a focusing operation. The magnetic head signal reproducing circuit 66 writes data on the magnetic-recording region 29 of the film 26 and reproduces the data therefrom. The content of the data to be written on the magnetic-recording region 29 includes the kind of the light source, the ratio between length and width of the photographic paper on which images are printed, date, hour, minute, second, and the like. The magnetic head signal reproducing circuit 66 writes magnetic data on a frame exposed to light. Thus, if it is determined that the magnetic data has been written on the magnetic-recording region 29 in reproducing operation, it is determined that the frame has been exposed to light, whereas if it is determined that the magnetic data has not been written thereon, it is determined that the frame has not been exposed to light. The motor driving circuit 67 drives the motor in a direction in which the motor rotates forward, namely, a film winding direction and a direction in which the motor rotates backwardly, namely, a film rewinding direction. The power source 68 supplies electric power to the electric circuit. The calendar circuit 69 indicates year, month, date, hour, minute, second, and a day of the week. The light source detection circuit 70 distinguishes natural light, fluorescent light, and incandescent lamp from each other. The light source detection circuit 70 comprises a photoelectric conversion circuit for outputting a voltage corresponding to a light quantity and a comparator circuit for outputting a high voltage when the output voltage of the photoelectric conversion circuit is higher than a predetermined level and a low voltage when the output voltage thereof is lower than the predetermined level. The warning circuit 71 informs an operator of abnormality visually and audiably when it is detected in an operation for searching unexposed frames. The fork rotation angle detection circuit 72 generates one pulse for 1°-rotation of a fork.

Further, via LED control circuits and detection circuits, the microcomputer 60 is connected with the bar code-reading photoreflectors PR1, PR2, PR3 denoted as 11, 12, and 13, respectively and the perforation detection photoreflector PR4 denoted as 14.

Figure 30:
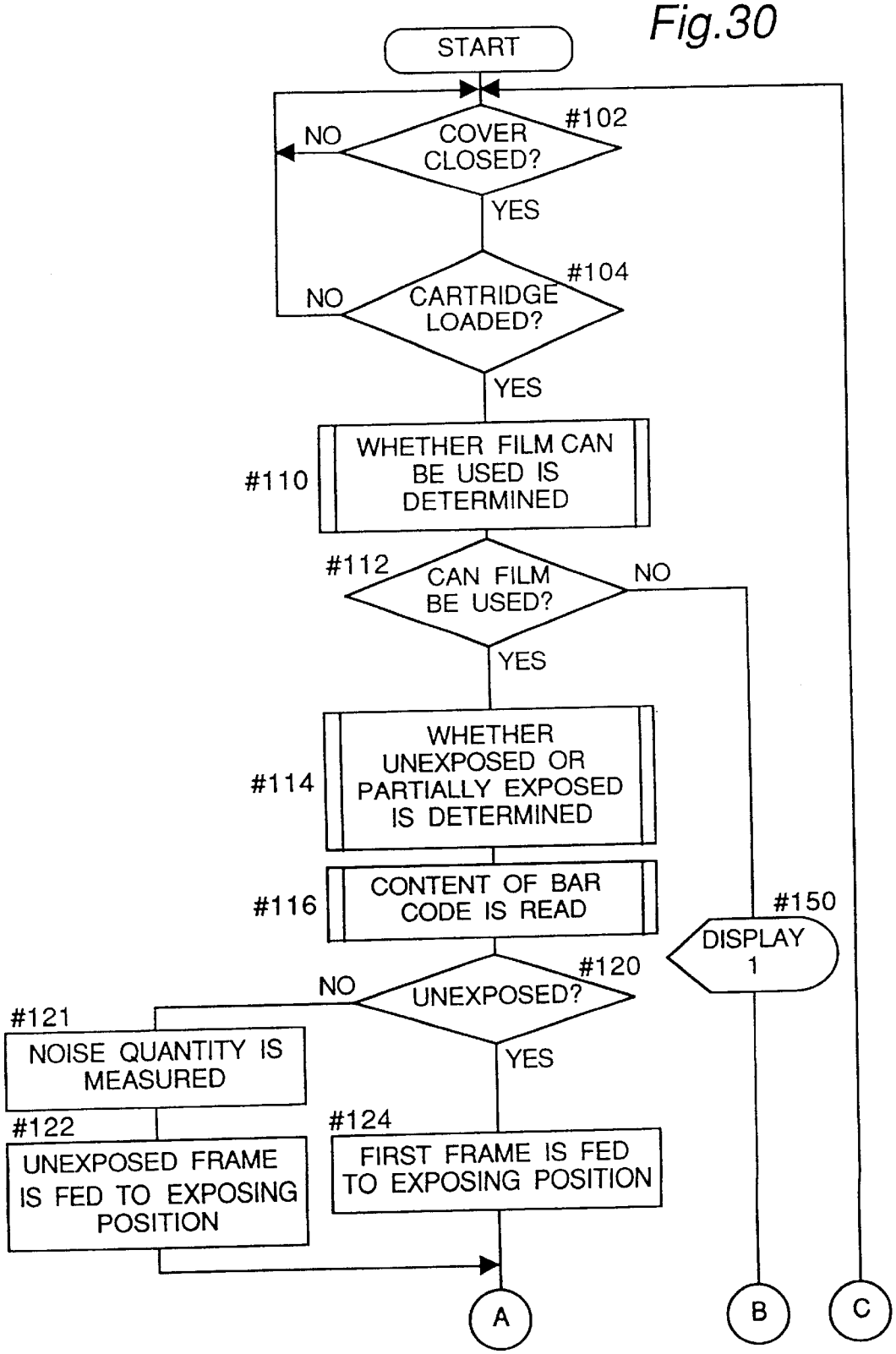
FIG. 30 is a flow chart showing the operation of a camera according to an embodiment of the present invention.
Figure 31:
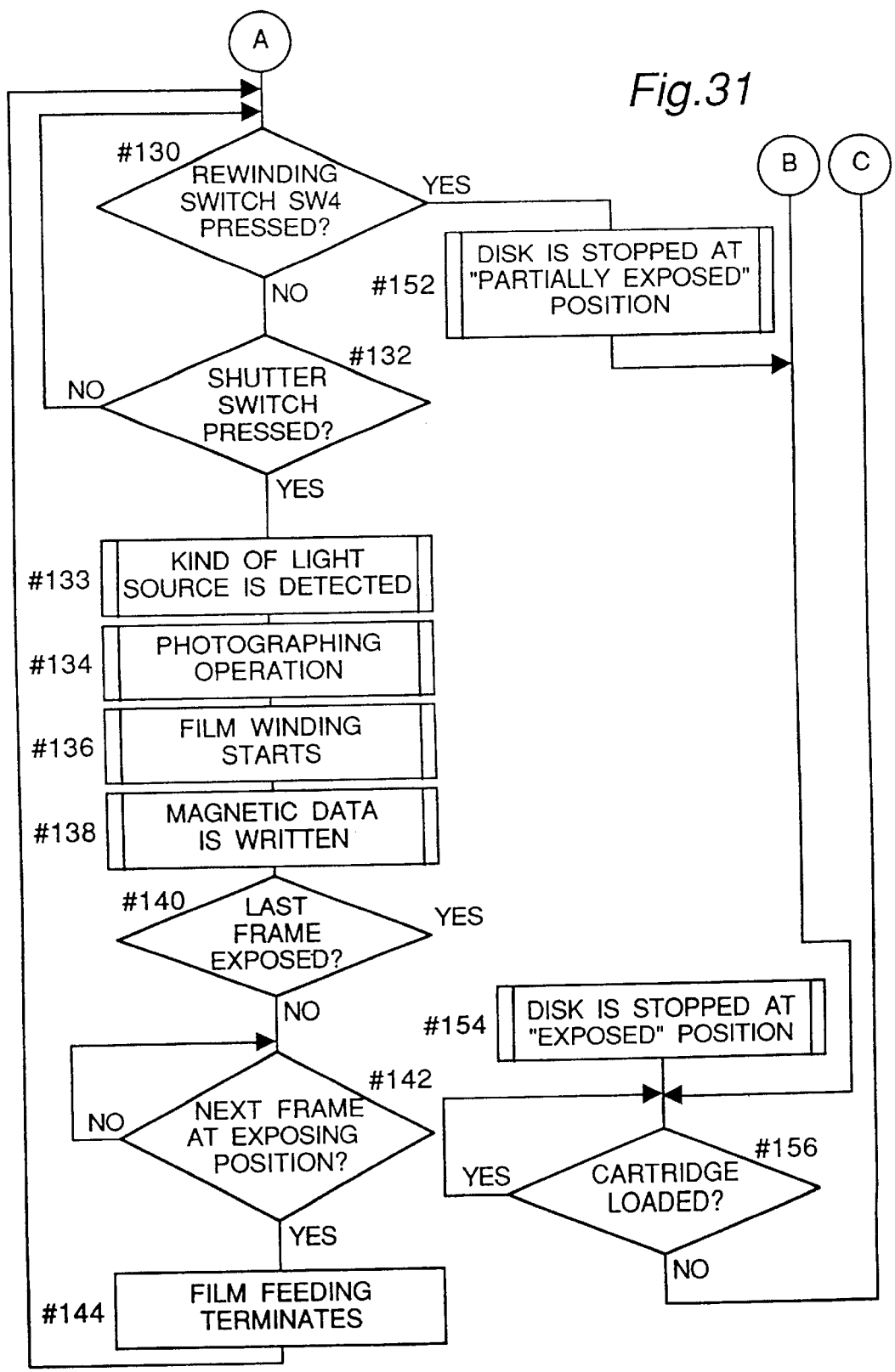
FIG. 31 is a flow chart showing the operation of a camera according to an embodiment of the present invention.
Figure 41:
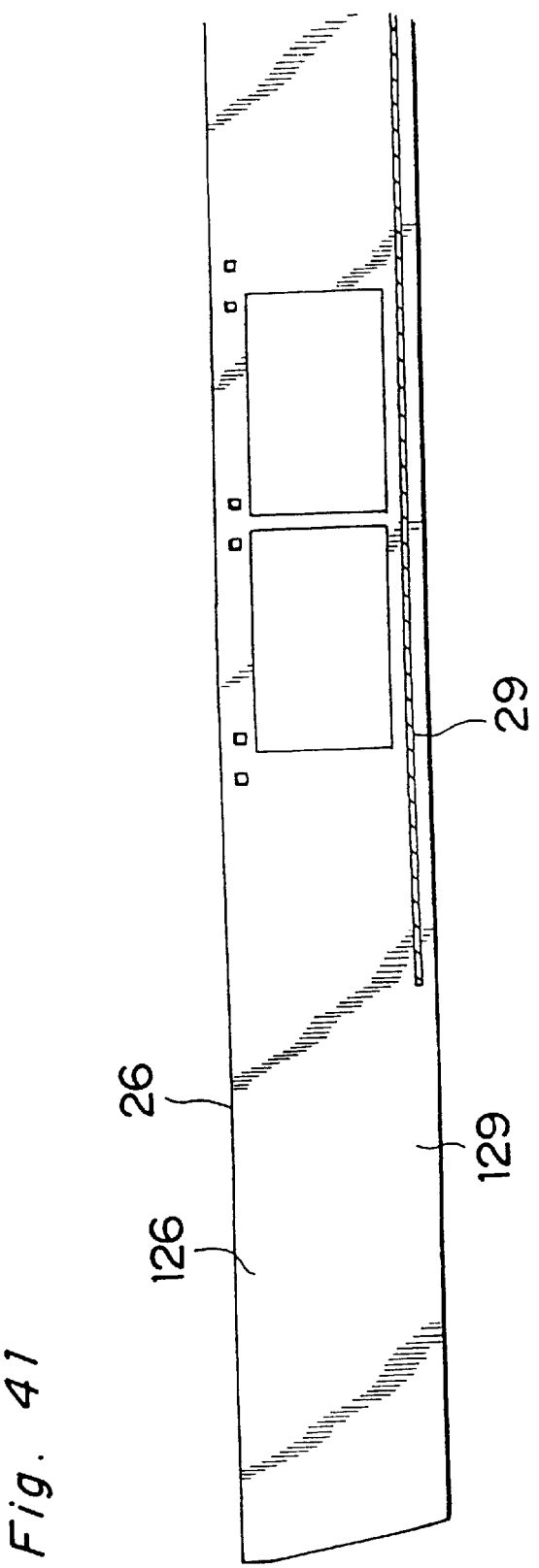
FIG. 41 is an enlarged view showing principal portions of a leading end of a film.

The construction of the camera 10 as well as the operation thereof are described with reference to flowcharts shown in FIGS. 30 through 40 and FIG. 41. FIGS. 30 and 31 are flow charts showing the operation of the camera 10. FIGS. 32 through 40 are flowcharts showing in detail the operation to be executed at step #110 of FIG. 30. FIG. 41 is an enlarged view showing principal portions of the leading end of the film. It is to be noted that the photoreflectors 11, 12, and 13 are placed at the positions shown by (J) of FIG. 29, i.e., as shown in FIG. 17. A magnetic signal recorded on the magnetic-recording region 29 of the film cartridge 20 can be reproduced therefrom.

The outline of the operation of the camera 10 is described below with reference to flowcharts shown in FIGS. 30 and 31.

It is determined at steps #102 and #104 whether or not the film cartridge 20 has been inserted into the cartridge chamber 16 and the cover 18 has been closed.

If YES at steps #102 and #104, it is determined at step #110 whether or not the film can be used, i.e., whether or not the film has been exposed or developed. Only an unexposed film or a film partially exposed can be used in the camera 10 which is capable of reproducing a data signal.

If it is determined that the film cannot be used, i.e., if the film has been exposed or developed, the display device 62 makes a "display 1" at step #150, and it is determined at step #156 whether or not the film cartridge 20 has been taken out from the cartridge chamber 16.

If YES at step #112, it is determined at step #114 whether the film has been unexposed or partially exposed. Then, the content of the bar code is read at step #116. The content of the bar code includes a film sensitivity, the number of exposed frames, and the kind of the film.

If it is determined that the film has not been exposed, the film 26 is fed to place the first frame at the exposing position. If NO at step #120, i.e., if the film 26 has been partially exposed, the film 26 is fed to place the first frame of unexposed frames at the exposing position.

Whether the frame has not been exposed is determined by whether or not a magnetic signal has been recorded on the magnetic-recording region 29 thereof. That is, the magnetic signal is not recorded on the magnetic-recording region 29 of the unexposed frame, whereas it is recorded on the magnetic-recording region 29 of the exposed frame. If it is determined at step #120 that the frame is not unexposed, i.e., if it is determined that the frame is partially exposed, the quantity of noise generated by the magnetic head signal reproducing circuit 66 is measured at step #121. Then, it is determined whether or not the unexposed frame can be fed to the exposing position. The operation at step #121 will be described later. If it is determined that the unexposed frame can be fed to the exposing position, the unexposed frame is fed to the exposing position at step #122. That is, at step #122, an operation for reproducing the data signal from the magnetic-recording region 29 is executed. If it is determined that the magnetic signal has been recorded thereon, the feeding of the film 26 continues, whereas if it is determined that the magnetic signal has not been recorded thereon, the feeding of the film 26 is stopped when the photoreflector PR4 (not shown) has detected the perforation 28 of the film 26 and then, the unexposed frame is placed at the exposing position.

It is determined at steps #130 and #132 whether or not the film rewinding switch SW4 or the shutter switch SW1 has been pressed. If it is determined that the film rewinding switch SW4 has been pressed at step #130, the film 26 is rewound at step #152, and then, the film state display plate 50 and the bar code disk 30 are stopped at the "partially exposed" position. Then, the program goes to step #156 at which it is determined whether the film cartridge 20 has been taken out from the cartridge chamber 16.

If it is determined that the shutter switch SW1 is turned on at step #132, the light source detection circuit 70 detects the kind of the light source at step #133. Then, at step #134, a photographic operation is executed. That is, an aperture value and a shutter speed are determined, based on a film sensitivity and information outputted from the photometric circuit 64, and then the autofocusing circuit 65 is actuated to execute a focusing operation. Then, the exposure control circuit 64 is actuated to expose a frame.

Upon completion of the exposure, the film winding operation starts at step #136, and then, predetermined magnetic data is recorded on the magnetic-recording region 29 at step #138. The data to be recorded includes date, hour, minute, second, a day of the week, a luminance, a shutter speed, an aperture value, and the kind of the light source detected by the light source detection circuit 70.

If it is determined at step #140 that the last frame has been exposed, the film 26 is rewound at step #154, and then, the film state display plate 50 and the bar code disk 30 are stopped at the "exposed" position. Then, the program goes to step #156 at which it is determined whether the film cartridge 20 has been taken out from the cartridge chamber 16.

If NO at step #140, the program goes to step #142 at which it is determined whether the film 26 has been fed to place the next frame at the exposing position. If YES at step #144, the CPU waits until the shutter switch SW1 is turned on. If YES at step #140, the bar code disk 30 is stopped at the "exposed" position.

The operations to be executed at steps #110, #114, #121, #152, and #154 are described in detail below.

Figure 32:
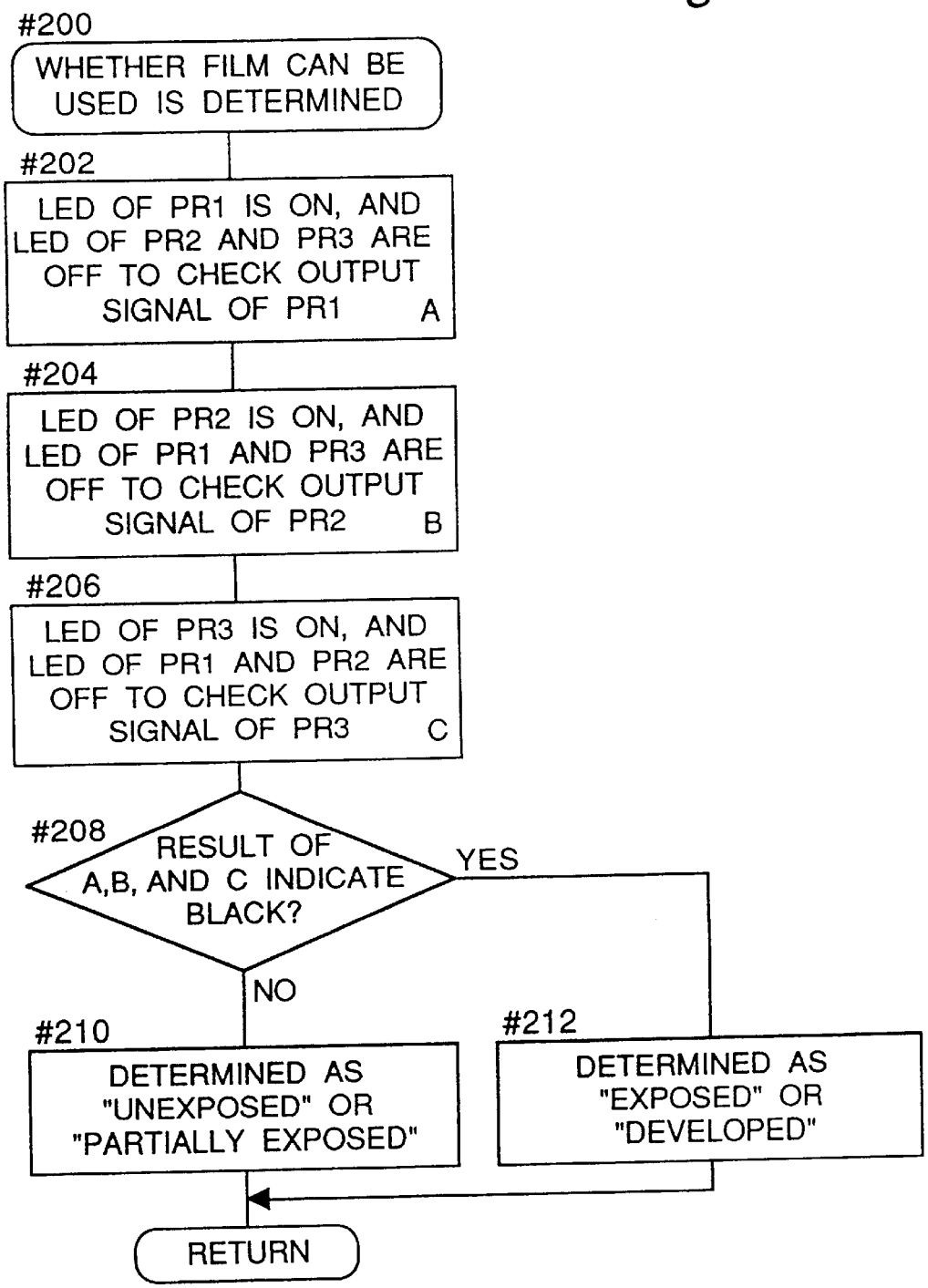
FIG. 32 is a flowchart showing in detail the operation to be executed at step #110 of FIG. 30.

The operation to be executed at step #110 of the flowchart of FIG. 30, namely, the procedure for determining whether or not the film can be used is described below with reference to the detailed flowchart of FIG. 32.

That is, at step #202, the LED of the photoreflector PR1 is turned on to check the level of an output signal thereof. At this time, the LED of the photoreflector PR2 and that of the photoreflector PR3 are turned off to prevent light emitted by the LED thereof from affecting the light emitted from the LED of the photoreflector PR1. If the electric current outputted from the photoreflector PR1 is greater than a predetermined value, it is determined that the output signal of the photoreflector PR1 indicates "white", whereas if it is smaller than the predetermined value, it is determined that the output signal indicates "black". The result thus obtained is denoted as (A). As the predetermined value or level for discriminating "white" and "black" from each other, the boundary determination level (II) shown in FIG. 21 is used. The boundary determination level (II) is used to discriminate "white" and "black" from each other in procedures which will be described below.

At step #204, the LED of the photoreflector PR2 is turned on to check the level of an output signal thereof. At this time, the LED of the photoreflector PR1 and that of the photoreflector PR3 are turned off to prevent light emitted by the LED thereof from affecting the light emitted from the LED of the photoreflector PR2. If the electric current outputted from the photoreflector PR2 is greater than the predetermined value, namely, the boundary determination level (II), it is determined that the output signal of the photoreflector PR2 indicates "white", whereas if it is smaller than that, it is determined that the output signal indicates "black". The result thus obtained is denoted as (B).

At step #206, the LED of the photoreflector PR3 is turned on to check the level of an output signal thereof. At this time, the LED of the photoreflector PR1 and that of the photoreflector PR2 are turned off to prevent light emitted by the LED thereof from affecting the light emitted from the LED of the photoreflector PR3. If the electric current outputted from the photoreflector PR3 is greater than the predetermined value, namely, the boundary determination level (II), it is determined that the output signal of the photoreflector PR3 indicates "white", whereas if it is smaller than that, it is determined that the output signal indicates "black". The result thus obtained is denoted as (C).

If it is determined at steps #208 through #212 that the results (A), (B), and (C) are "black", the film 26 is determined as "exposed" or "developed". If it is determined that at least one of the results (A), (B), and (C) is "white", the film 26 is determined as "unexposed" or "partially exposed".

Instead of the above-described white/black discriminating method, it is possible to determine the state of the film based on three detection points by using only the photoreflector PR1 and PR3, based on results obtained at three detection points. With reference to the flowchart of FIG. 33, description is made below on a procedure of a modification for detecting the state of the film by using only the photoreflector PR1 and PR3.

At step #252, the LED of the photoreflector PR1 is turned on to check the level of an output signal thereof. At this time, the LED of the photoreflector PR3 is turned off to prevent light emitted by the LED thereof from affecting the light emitted from the LED of the photoreflector PR1. If the electric current outputted from the photoreflector PR1 is greater than the predetermined value, namely, the predetermined white/black-discriminating level, namely, the boundary determination level (II), it is determined that the output signal of the photoreflector PR1 indicates "white", whereas if it is smaller than that, it is determined that the output signal indicates "black". The result thus obtained is denoted as (A).

At step #254, the LED of the photoreflector PR3 is turned on to check the level of an output signal thereof. At this time, the LED of the photoreflector PR1 is turned off to prevent light emitted by the LED thereof from affecting the light emitted from the LED of the photoreflector PR3. If the electric current outputted from the photoreflector PR3 is greater than the predetermined level, namely, the boundary determination level (II), it is determined that the output signal of the photoreflector PR3 indicates "white", whereas if it is smaller than that, it is determined that the output signal indicates "black". The result thus obtained is denoted as (B).

At step #256, the LED of the photoreflector PR3 is turned on to check the level of the output signal of the photoreflector PR1. At this time, the LED of the photoreflector PR1 is turned off to prevent the light emitted by the LED thereof from affecting the signal of the LED of the photoreflector PR3. The light of the LED of the photoreflector PR3 is reflected at a position intermediate between the photoreflector PR1 and the photoreflector PR3 and then incident on the light receiving element of the photoreflector PR1. This means that the light reflected at the same position of the bar code as the detection position in confrontation with the photoreflector PR2 is detected. If the electric current outputted from the photoreflector PR1 is greater than the predetermined level, namely, the boundary determination level (II), it is determined that the output signal of the photoreflector PR1 indicates "white", whereas if it is smaller than that, it is determined that the output signal thereof indicates "black". The result thus obtained is denoted as (C).

If it is determined at steps #258 through #262 that the results (A), (B), and (C) are all "black", the film 26 is determined as "exposed" or "developed". If it is determined at steps #258 that at least one of the results (A), (B), and (C) is "white", the film 26 is determined as "unexposed" or "partially exposed".

In the above-described procedures, the photoreflectors PR1, PR2, and PR3 are located as shown by (J) of FIG. 29, namely, as shown in FIG. 17. But it is possible to detect the state of the film, i.e., determine whether or not the film can be used, based on the results (A), (B), and (C) obtained by executing operations similar to those to be executed at steps #202 through #206 of FIG. 32, when the photoreflectors PR1, PR2, and PR3 are located as shown by (K) of FIG. 29.

That is, if it is determined that the results (A), (B), and (C) are all "black", the film 26 is determined as "unexposed" or "partially exposed". If it is determined that at least one of the results (A), (B), and (C) is "white", the film 26 is determined as "exposed" or "developed".

Figure 34:
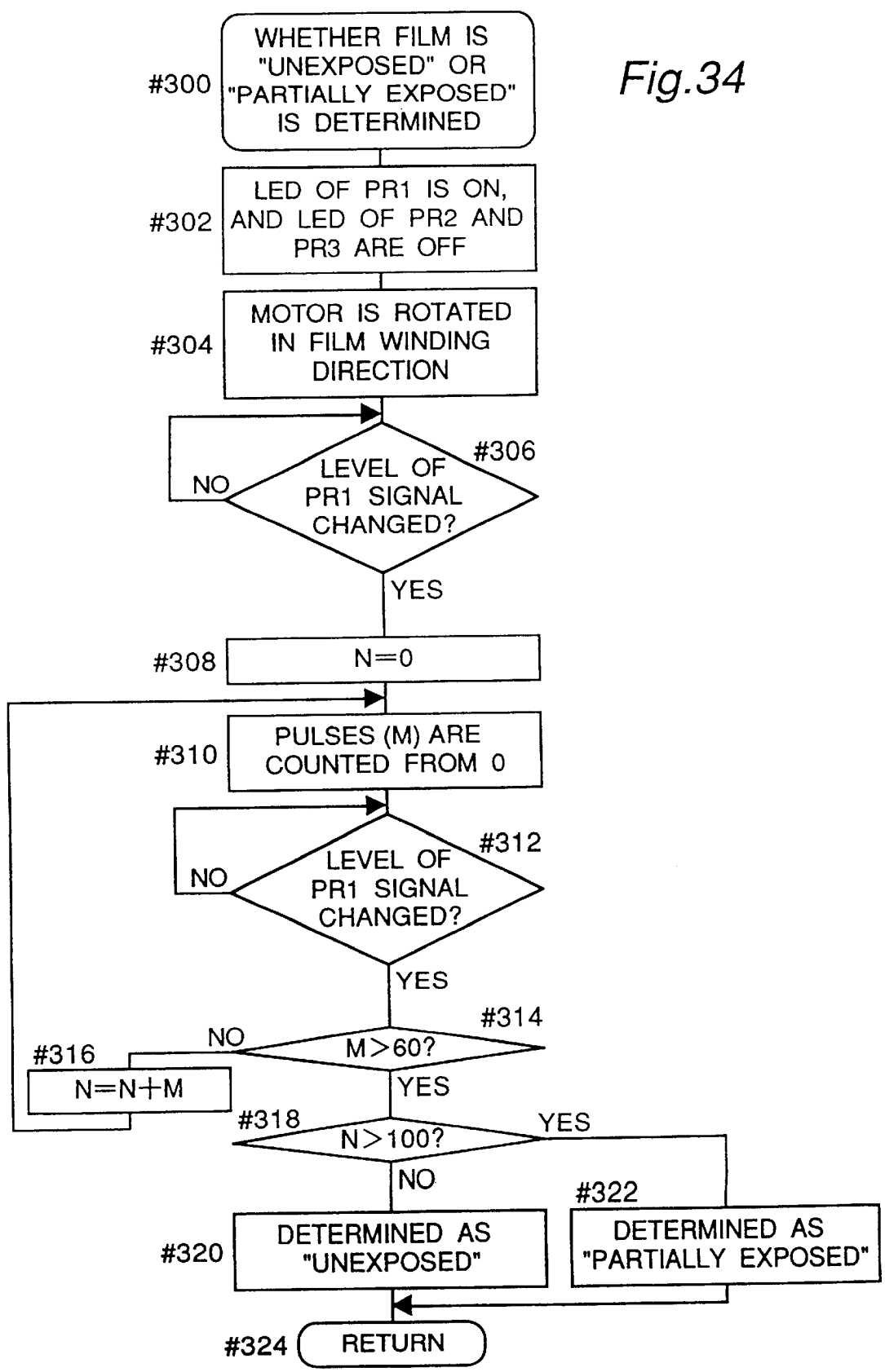
FIG. 34 is a flowchart showing in detail the operation to be executed at step #114 of FIG. 30.

With reference to the detailed flowchart of FIG. 34, description is made below on a procedure, to be executed at step #114 of the flowchart of FIG. 30, for discriminating "unexposed" and "partially exposed" from each other.

At step #302, the LED of the photoreflector PR1 is turned on to check the level of an output signal thereof. At this time, the LED of the photoreflector PR2 and that of the photoreflector PR3 are turned off to prevent light emitted by the LED thereof from affecting the light emitted from the LED of the photoreflector PR1.

At step #304, the motor is rotated in the film winding (film feeding) direction. As a result, the bar code disk 30 rotates clockwise.

It is determined at step #306 whether the level of the signal outputted from the photoreflector PR1 has changed in order to check whether or not the bar code disk 30 has started to rotate. It is preferable to set the threshold to be used to detect the level of the signal at the center of the sensitivity of the photoreflector, as indicated by the boundary determination level (I) of FIG. 21.

If YES at step #306, N is set to "0" at step #308. The reference character (N) indicates the number of pulses (corresponding to rotation angle of the fork) counted from a point at which the level of the signal outputted from the photoreflector PR1 has changed until a point at which the non-display region 40 reaches the position of the photoreflector PR1.

At step #310, counting of the number (M) of pulses starts. One pulse is generated for each 1°-rotation of the fork. Thus, the number (M) of pulses corresponds to the rotational angle of the fork, namely, the bar code disk 30.

It is determined at step #312 whether or not the level of the signal outputted from the photoreflector PR1 has changed.

If YES at step #312, it is determined at step #314 when the level of the photoreflector PR1 has changed, whether or not the non-display region 40 has passed the position of the photoreflector PR1, based on whether the value (M) is greater than the predetermined value. The value (M) counted between the previous change and the current change in the level of the signal outputted from the photoreflector PR1 corresponds to the angle of one space ("white") or one bar ("black") of the bar code disk 30. The angle of the non-display region 40 is greater than 184° and that of the wide bar 32 is 20°. Thus, whether or not the non-display region 40 has passed the photoreflector PR1 can be determined by setting a value intermediate between 184° and 20° to the threshold. In this embodiment, the threshold is set to 60°.

If NO at step #314, the value of (M) is added to the value (N) at step #316.

If YES at step #314, it is determined at step #318 whether or not the total of the counted values (N) is greater than 100. Based on the result of the determination made at step #318, it is determined at steps #320 and #322 that the film is "unexposed" or "partially exposed", respectively. The time period corresponding to the rotation angle (N) between the time at which "unexposed" is displayed and the time at which the non-display region 40 is detected is different from the time period corresponding to the rotation angle (N) between the time at which "partially exposed" is displayed and the time at which the non-display region 40 is detected. Therefore, the determining operation can be executed at steps #318 through #322 as described above.

Figure 35:
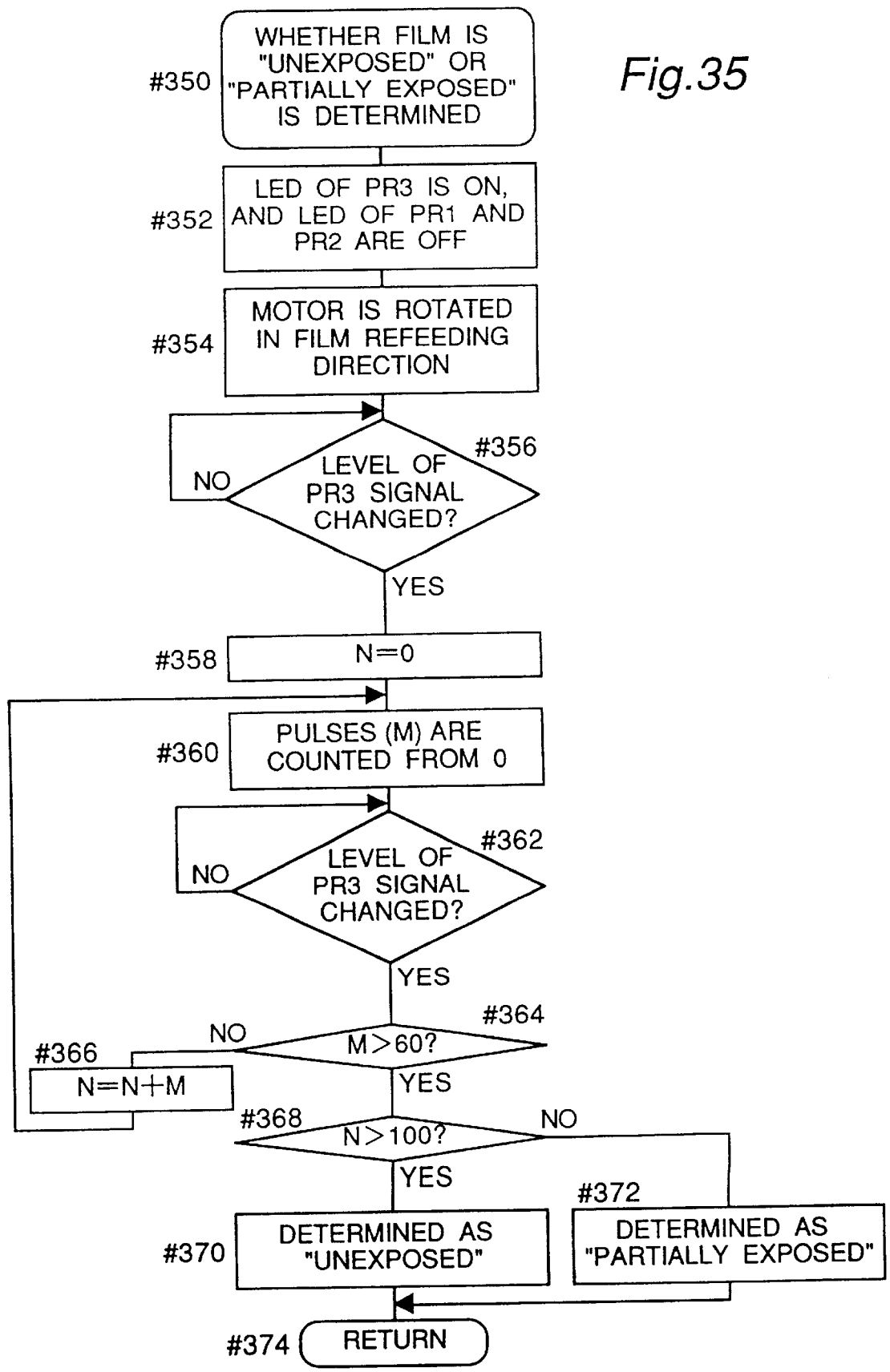
FIG. 35 is a flowchart showing in detail a modification of the operation to be executed at step #114 of FIG. 30.

Whether the film is unexposed or partially exposed can be checked by rotating the spool shaft 24 of the film cartridge 20 in the film rewinding direction as well as by rotating it in the film winding direction. With reference to FIG. 35, description which is made below concerns a modified procedure for determining whether the film has not been exposed or partially exposed.

That is, at step #352, the LED of the photoreflector PR3 is turned on to check the level of an output signal thereof. At this time, the LED of the photoreflector PR1 and that of the photoreflector PR2 are turned off to prevent light emitted by the LED thereof from affecting the light emitted from the LED of the photoreflector PR3.

At step #354, the motor is rotated in the film rewinding direction. As a result, the bar code disk 30 rotates counterclockwise.

It is determined at step #356 whether the level of the signal outputted from the photoreflector PR3 changes.

If YES at step #356, N is set to "0" at step #308. The reference character (N) indicates the number of pulses (corresponding to rotation angle of the fork) counted from a point at which the level of the signal outputted from the photoreflector PR1 has changed until a point at which the non-display region 40 reaches the photoreflector PR1.

At step #360, counting of the number (M) of pulses starts. One pulse is generated for each 1°-rotation of the fork (bar code disk). Thus, the number (M) of pulses corresponds to the rotational angle of the fork.

It is determined at step #362 whether or not the level of the signal outputted from the photoreflector PR3 changes. If YES at step #362, it is determined at step #364 whether or not the non-display region 40 has passed the photoreflector PR3, based on whether the counted value (M) has exceeded the predetermined value, namely, the threshold. The angle of the non-display region 40 is greater than 184° and that of the wide bar 32 is 20°. Thus, whether or not the non-display region 40 has passed the photoreflector PR1 can be determined by setting the value intermediate between 184° and 20° to the threshold. In this embodiment, the threshold is set to 60°.

If NO at step #364, the value (M) is added to the value (N) at step #366. If YES at step #364, based on the result of the determination made at step #368, whether the film is "unexposed" or "partially exposed" is determined at steps #370 and #372.

The operation at step #121 of the flowchart of FIG. 30 is described in detail below.

The operation at step #121 is executed before the unexposed frame of the film 26 is fed to the exposing position as described above. The unexposed frame of the film 26 is fed to the exposing position, based on whether or not the magnetic signal has been recorded on the magnetic-recording region 29 of the film 26. That is, as described previously, it is not until the frame is exposed that magnetic data such as a date, a shutter speed, and the like is recorded on the magnetic-recording region 29 thereof. Thus, the magnetic head signal reproducing circuit 66 is actuated to reproduce the magnetic data, namely, the data signal in order to determine whether the frame has been exposed or not.

If the reproduced data signal includes a great amount of noise, it is impossible to distinguish the magnetic data and noise from each other. Therefore, there is a possibility that malfunction occurs if "exposed" and "unexposed" are discriminated from each other according to whether the magnetic signal has been recorded on the magnetic-recording region 29. That is, if the unexposed frame is determined as the exposed frame because the noise is erroneously determined as the magnetic signal, an operation of exposing the unexposed cannot be executed. On the other hand, if the noise is determined as the magnetic signal, the exposed frame is determined as being "unexposed" and thus there is a possibility that the exposed frame is exposed again. Thus, if a great amount of noise is generated, it is impossible to feed the unexposed frame to the exposing position.

Accordingly, in order to check whether the frame has not been exposed or has been exposed can be determined, it is necessary to measure the amount of noise before the film 26 is wound. A procedure for measuring the amount of noise is described below based on the detailed flowchart shown in FIG. 36.

At step #381, the motor driving circuit 67 is actuated to drive the motor to wind the film 26, and the level of a signal reproduced from the magnetic head signal reproducing circuit 66 is measured in a time period of 100 mS. Because the magnetic-recording region 29 of the film 26 does not reach the magnetic head at this point, the magnetic head is incapable of reproducing the magnetic data written on the magnetic track of the film 26. That is, as shown in FIG. 41, the magnetic head traces a region 129 in which the magnetic-recording region 29 is not formed. Thus, at this point, only noises generated by a magnetic field outside the camera 10 are reproduced. That is, the quantity of noise is measured at step #381.

At step #382, the amplitude voltage of noise is compared with a predetermined value. The predetermined value is set at a value smaller than the amplitude voltage of a data signal measured at the time when the magnetic data recorded on the magnetic-recording region 29 of the film 26 is generated. Whether or not the magnetic data has been recorded on the magnetic-recording region 29 can be detected in spite of the presence of noise having a quantity smaller than the predetermined value. In this embodiment, the predetermined value is set at 300 $mV_{p-p}$. Thus, if the amplitude voltage of noise is less than 300 $mV_{p-p}$, the unexposed frame and the exposed frame can be correctly discriminated from each other. If YES at step #382, the program goes to step #391 to execute the subsequent sequence, namely, the step (step #122 of FIG. 30) at which the unexposed film is fed to the exposing position.

If NO at step #382, i.e., if the amount of the noise is great, the motor driving circuit 67 is turned off to stop the motor at step #383. Then, at step #384, a "warning display 2" is made by the display device 62. Then, the warning circuit 71 is turned on to flash on and off a warning LED and warning sounds are generated at steps #385 and #386, respectively.

At step #388, the motor driving circuit 67 is actuated to rotate the motor in the film rewinding direction to stop the film state display plate 50 and the bar code disk 30 at the "partial exposure" position.

Then, at steps #389, the level of a signal outputted from the magnetic head signal reproducing circuit 66 is measured. Then, it is determined at step #390 whether or not the amplitude voltage of the signal becomes less than 300 $mV_{p-p}$, i.e., whether or not the quantity of noise generated by the magnetic field outside the camera 10 becomes small. If YES at step #390, the program goes to step #391 and then to the subsequent step, namely, the step (step #122 of FIG. 30) at which the unexposed film is fed to the exposing position.

Figure 36:
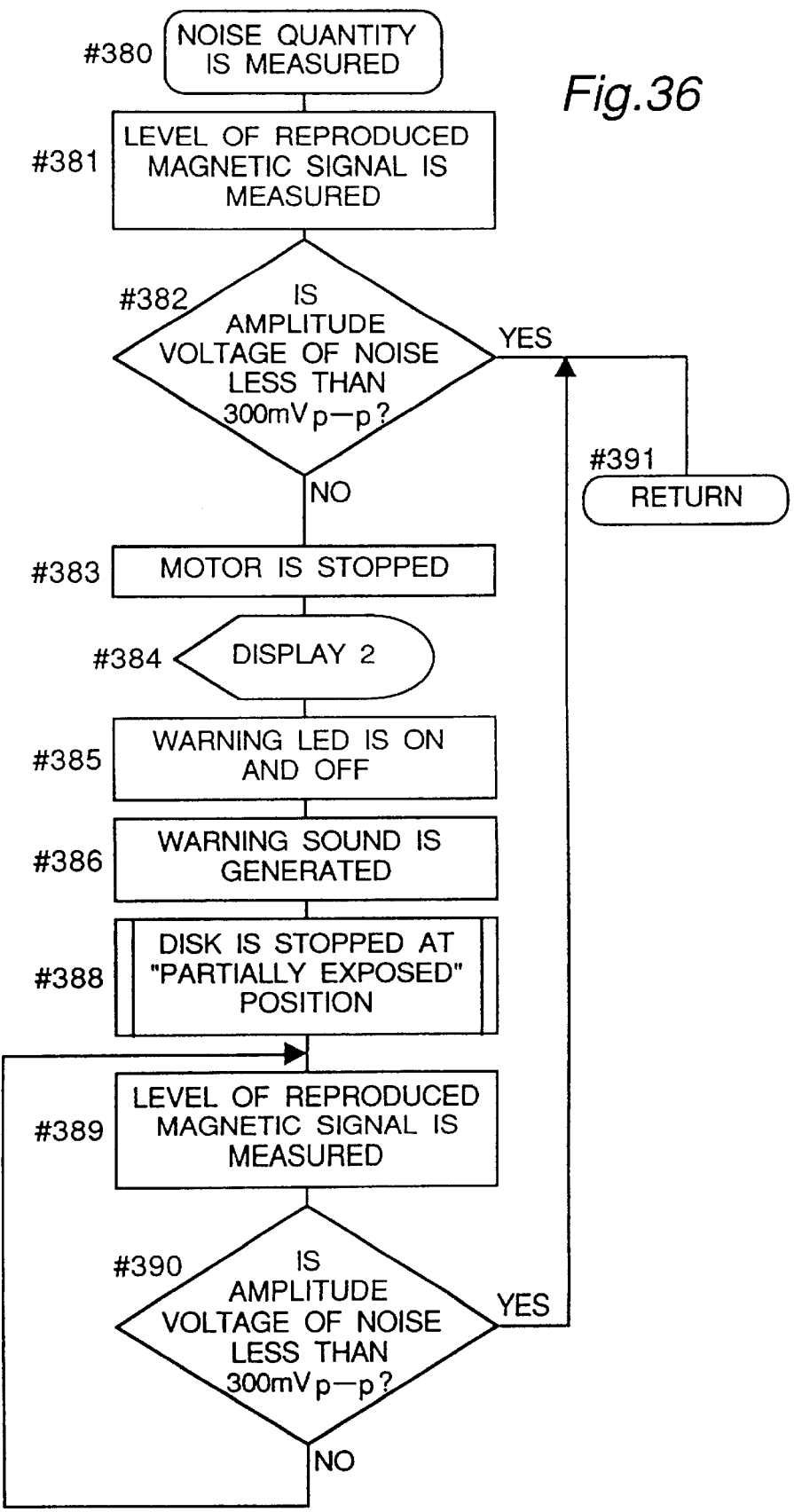
FIG. 36 is a flowchart showing in detail the operation to be executed at step #121 of FIG. 30.
Figure 37:
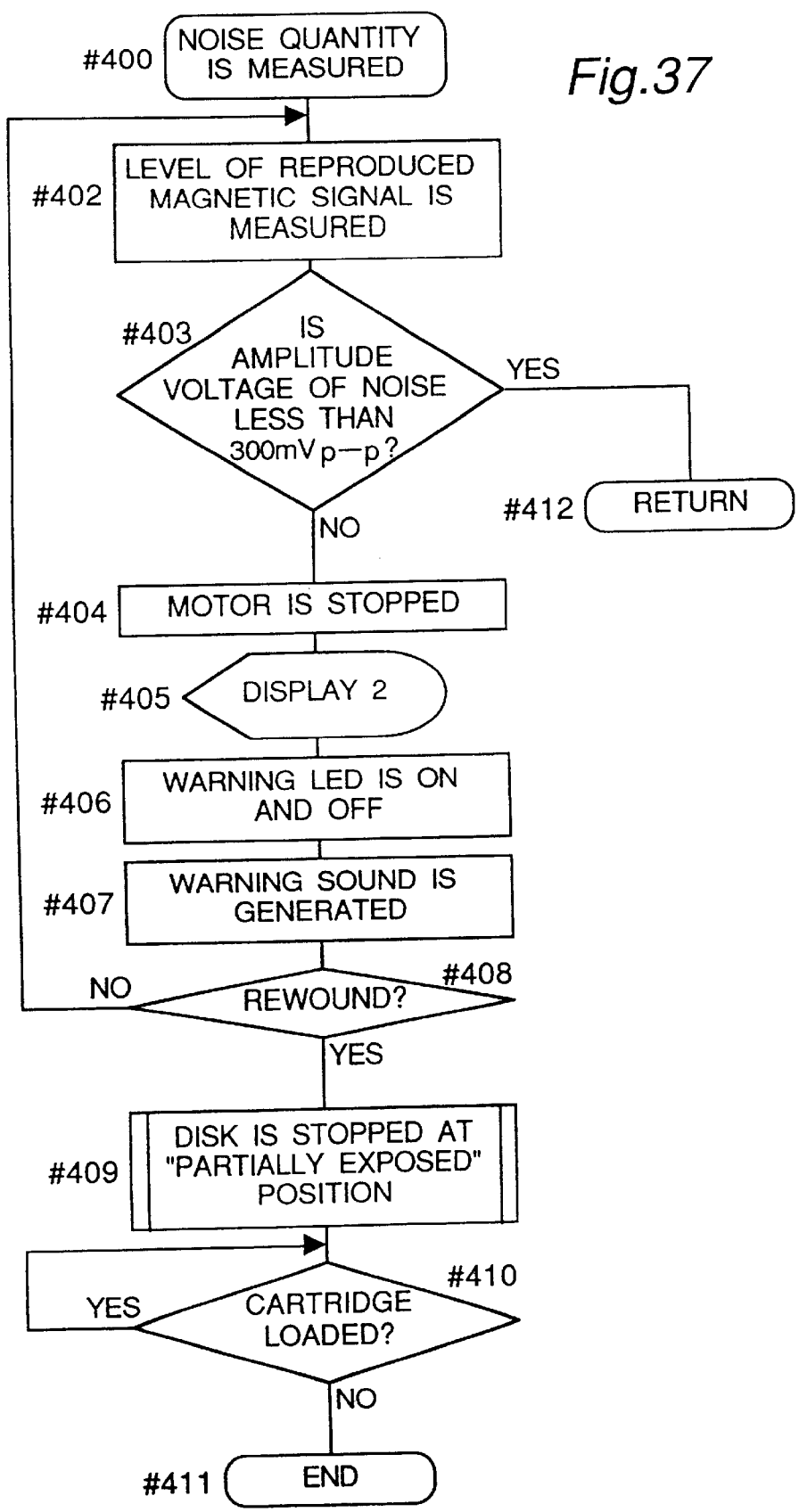
FIG. 37 is a flowchart showing in detail a modification of the operation to be executed at step #114 of FIG. 30.

In the flowchart shown in FIG. 36, if the amount of the noise is great, the film 26 of the film cartridge 20 is rewound unconditionally. Instead, the film 26 may be rewound if the film rewinding switch SW4 is pressed. With reference to the detailed flowchart of FIG. 37, description is made below on a modified procedure of rewinding the film 26 by stopping the measurement of a noise quantity when the film rewinding switch SW4 is turned on.

That is, at step #402, the motor driving circuit 67 is actuated to drive the motor so as to wind the film 26 and the level of a signal outputted from the magnetic head signal reproducing circuit 66 is measured in the time period of 100 mS. Because the magnetic-recording region 29 of the film 26 does not reach the magnetic head at this point, the magnetic head is incapable of reproducing the magnetic data written on the magnetic track of the film 26. Thus, at this point, only noise generated by the magnetic field outside the camera 10 is reproduced.

It is determined at step #403 whether the amplitude voltage of noise is smaller the predetermined value of 300 $mV_{p-p}$. If YES, whether the signal reproduced from the magnetic track of the film 26 indicates the frame has been unexposed or exposed can be correctly determined. Then, the program goes to step #412 to execute the subsequent sequence.

If NO at step #403, i.e., if the amount of the noise is great, the motor driving circuit 67 is turned off to stop the motor at step #404 because whether the frame has not been exposed or exposed cannot be correctly determined. Thus, Then, at step #405, the "warning indication 2" is displayed by the display device 62. Then, the warning circuit 71 is turned on to flash on and off the warning LED at step #406 and warning sounds are generated at step #407.

At step #408, the sequence of steps #402 through #407 is repeatedly executed provided that the film rewinding switch SW4 is not pressed.

If the film rewinding switch SW4 is pressed, the film state display plate 50 and the bar code disk 30 are stopped at the "partial exposure" position at step #409. Then, it is determined at step #410 whether or not the film cartridge 20 has been taken out from the cartridge chamber 16.

Figure 38:
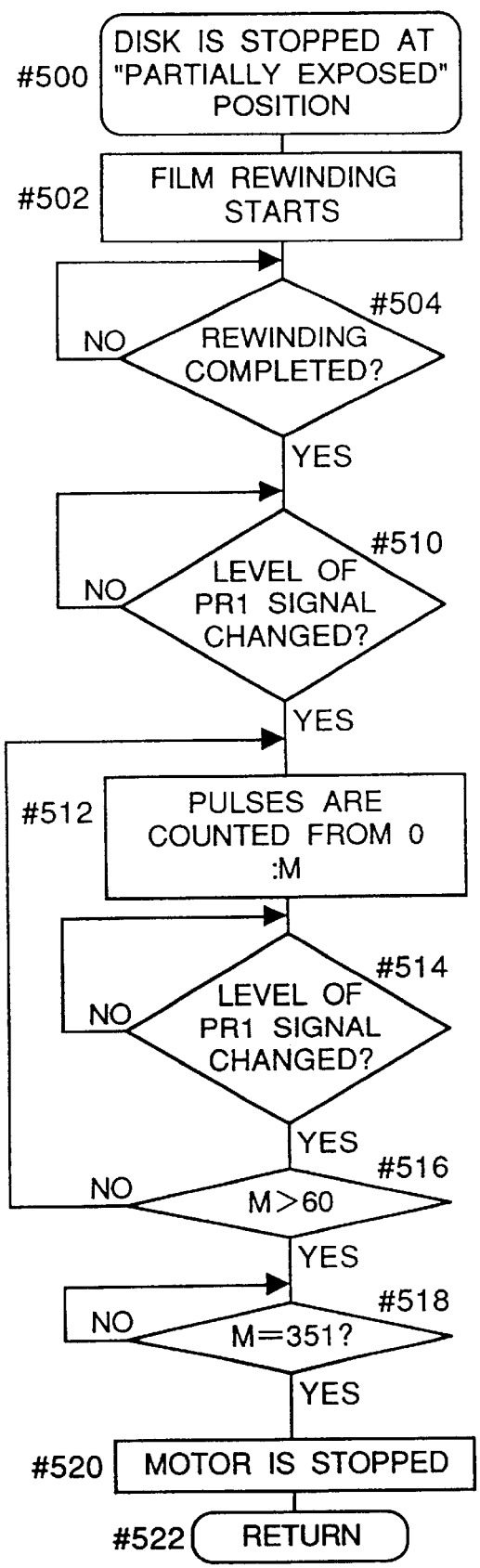
FIG. 38 is a flowchart showing in detail the operation to be executed at step #152 of FIG. 31.
Figure 39:
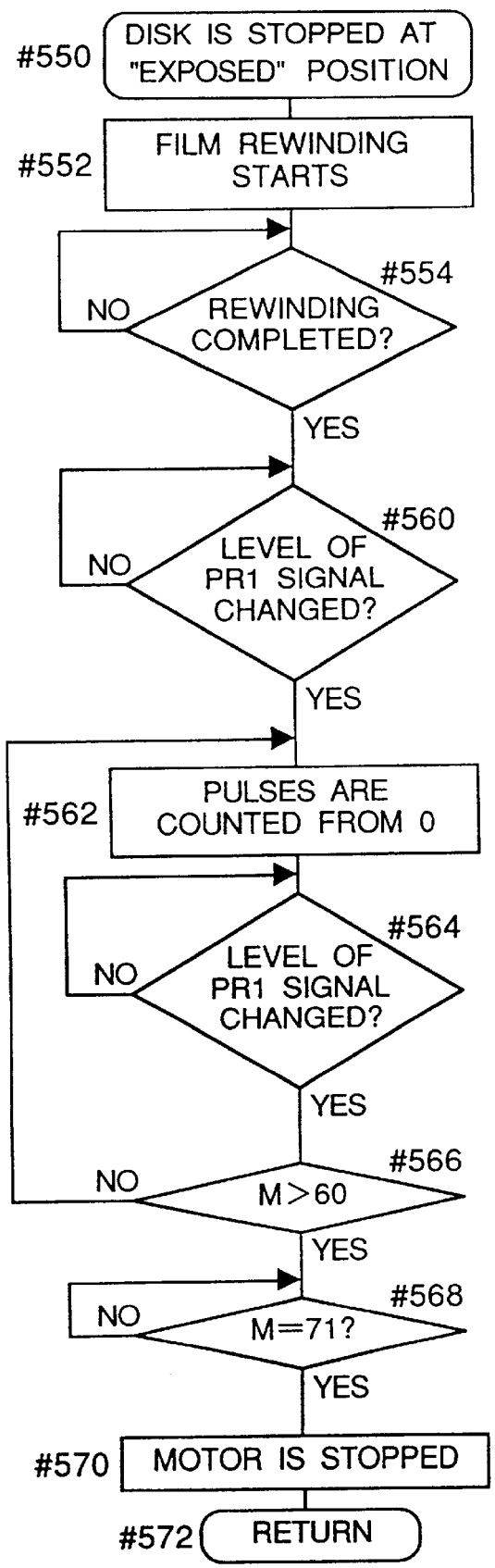
FIG. 39 is a flowchart showing in detail the operation to be executed at step #154 of FIG. 31.
Figure 40:
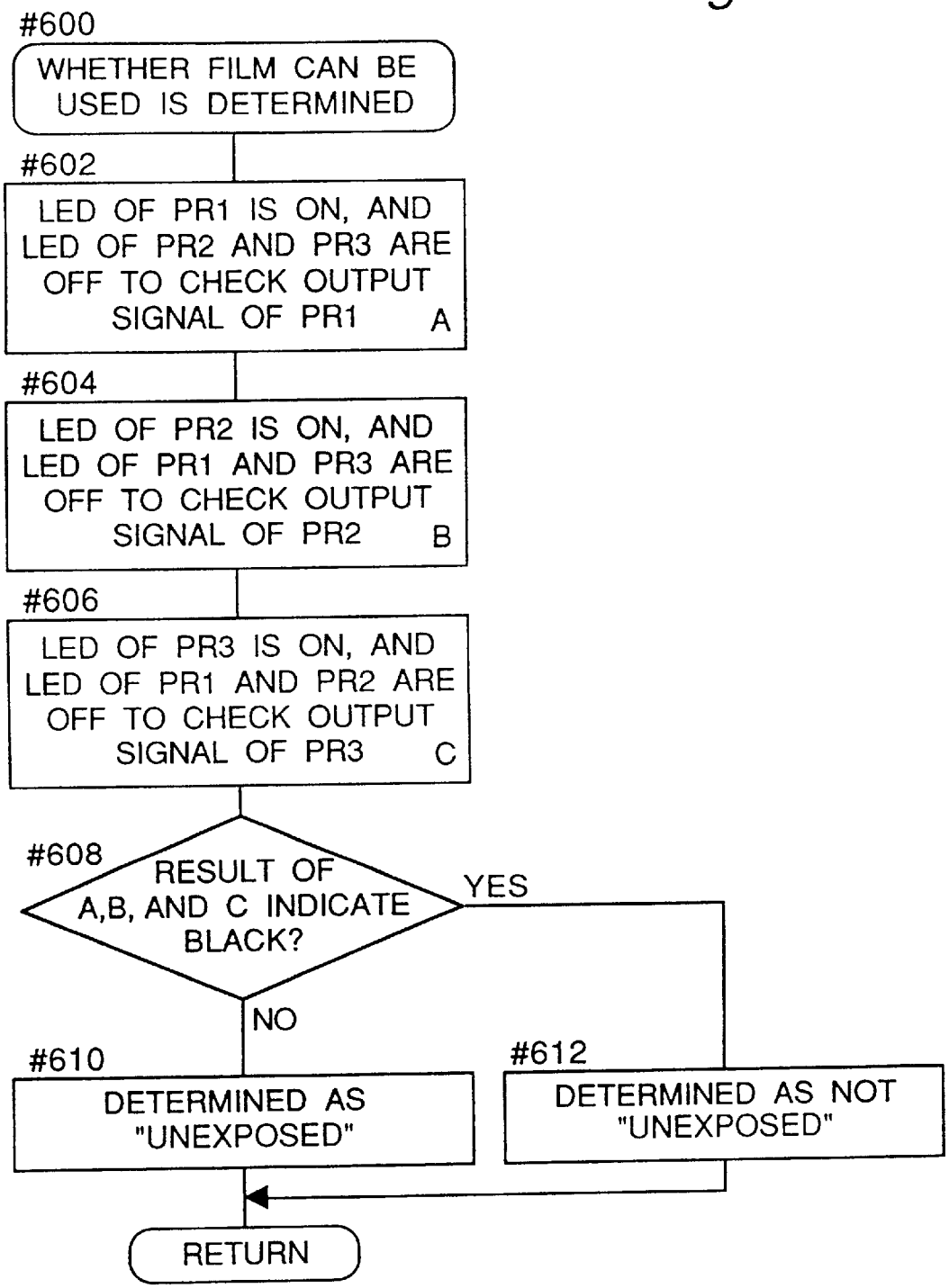
FIG. 40 is a flowchart for determining whether a film is applicable to a camera, according to an embodiment, using only an unexposed film.

With reference to the detailed flowchart of FIG. 38, description is made below on the operation at step #152 of the flowchart of FIG. 31, namely, the operation of stopping the bar code disk 30 at the "partially exposed" position.

That is, rewinding of the film starts at step #502. Then, it is determined at step #504 whether the rewinding of the film terminates.

Similarly to the procedure (see FIGS. 34 and 35) for determining whether the frame has not been exposed or exposed partially, at step #512, the rotation angle of the bar code disk 30 formed between a point of a level change in the signal of the photoreflector PR1 and a point of a subsequent level change in the signal thereof is measured in terms of pulses, by which number it is decided whether or not it is the display region 40. If NO at step #516, the rotation angle of the bar code disk 30 is measured again, whereas if YES at step #516, it is determined that the photoreflector PR1 has detected the non-display region 40. Then, at steps #518 (YES) and #520, the bar code disk 30 is stopped at the predetermined position.

That is, if M>60 at step #516, at step #518, counting of M continues without resetting the level of the signal of the photoreflector PR1, even though it has changed. If it is determined at step #518 that the value (M) has reached 351, the motor is stopped at step #520. As shown in FIG. 29, the photoreflector PR1 is located at 306.5° with respect to the reference line -L- , and the stop position of the bar code disk 30 in the display state (C, D of FIG. 29) of "partially exposed" should be at the position at which one of the boundary lines (E) between the non-display region 40 and the bar code display region 39 forms 315°±10° with respect to the reference line -L-. Accordingly, the bar code disk 30 should be stopped at the position at which the bar code disk 30 has rotated by about 351°, namely, (306.5°+(360°−315°)) with respect to the boundary line (E).

As in the case of the above-described procedure, the bar code disk 30 can be stopped at a position indicating "exposed". With reference to the detailed flowchart of FIG. 39, the operation for displaying "exposed" to be executed at step #154 of the flowchart of FIG. 31 is described in detail below.

That is, at step #552, rewinding of the film 26 starts. It is determined at step #554 whether the rewinding is completed.

At steps #560 through 566, the rotation angle of the bar code disk 30 formed between a point of a level change in the signal of the photoreflector PR1 and a point of a subsequent level change in the signal thereof is measured in terms of pulses. If NO at step #566, the rotation angle of the bar code disk 30 is measured again, whereas if YES at step #566, it is determined that the photoreflector PR1 has detected the non-display region 40.

If M>60 at step #562, at step #568, counting of M continues without resetting the level of the signal of the photoreflector PR1, even though it has changed. If it is determined at step #568 that the value (M) has reached 71, the motor is stopped at step #570. As shown in FIG. 29, the photoreflector PR1 is located at 306.5° with respect to the reference line -L- , and the stop position of the bar code disk 30 in the display state (E, F of FIG. 29) of "exposed" should be at the position at which one of the boundary lines (E) between the non-display region 40 and the bar code display region 39 forms 18°±10° with respect to the reference line -L-. Accordingly, the bar code disk 30 should be stopped at the position at which the bar code disk 30 has rotated by about 710, namely, ((360°−306.5°)+18°) with respect to the boundary line (E).

In each of the above-described embodiments, the camera 10 capable of using the "unexposed" and "partially exposed" films has been described, but even in a camera capable of using only the "unexposed" film, the state of the film can be detected by arranging the photoreflectors PR1, PR2, and PR3 appropriately. With reference to the detailed flowchart of FIG. 40, a procedure for detecting the state of the film is described below, supposing that the photoreflector PR1, PR2, and PR3 are arranged as shown by (I) of FIG. 29, i.e., as shown in FIG. 16.

At step #602, the LED of the photoreflector PR1 is turned on to check the level of an output signal thereof. Then, at step #604, the LED of the photoreflector PR2 is turned on to check the level of an output signal thereof. Then, at step #606, the LED of the photoreflector PR3 is turned on to check the level(of an output signal thereof.

It is determined at step #608 that the output signals of the photoreflectors PR1, PR2, and PR3 indicate "black". If YES at step #608, it is determined that the film is not "unexposed". If any one of the output signals indicates "white" at step #608, it is determined that the film is "unexposed".

Figure 19:
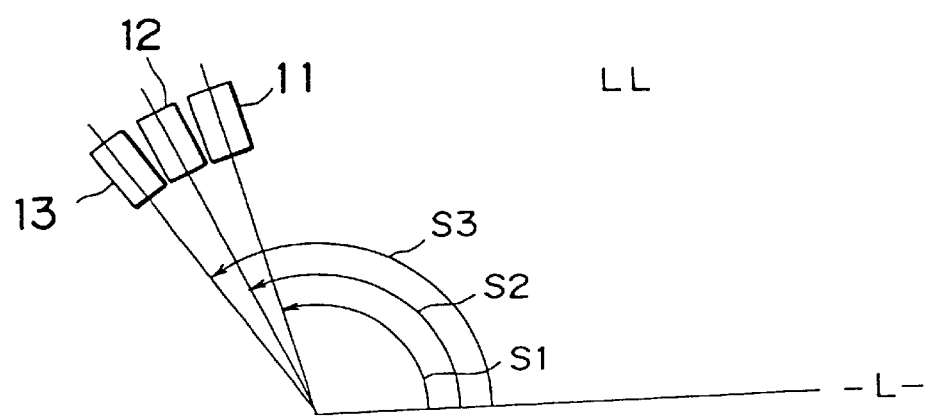
FIG. 19 is an explanatory view, similar to FIG. 16, showing the arrangement of photoreflectors of a camera according to an embodiment of the present invention.

When the photoreflectors PR1, PR2, and PR3 are arranged as shown by (LL) of FIG. 29, namely, as shown in FIG. 19, the level of the output signal of each of the photoreflectors PR1, PR2, and R3 is detected, as in the case of the operations to be executed at step #602 through 606. If the output signals of the photoreflectors PR1, PR2, and PR3 indicate black, it is determine that the film is "unexposed". If any one of the output signals indicates "white" at step #608, it is determined that the film is not "unexposed".

In even a camera capable of using only the "unexposed" film 26, whether the film is applicable thereto can be determined by carrying out a method similar to the above-described method.

In each of the above-described embodiments, in a camera using a film cartridge indicating the state of the film, the state of the film can be detected without rotating the spool shaft of the film cartridge. Further, when the noise of a reproduced data signal is great, the camera 10 can be so constructed that it is unnecessary to determine whether the frame is exposed or unexposed.

The present invention is not limited to the above-described embodiments, but may be embodied in various modes. For example, it is possible to replace the bar with the space.

Figure 42:
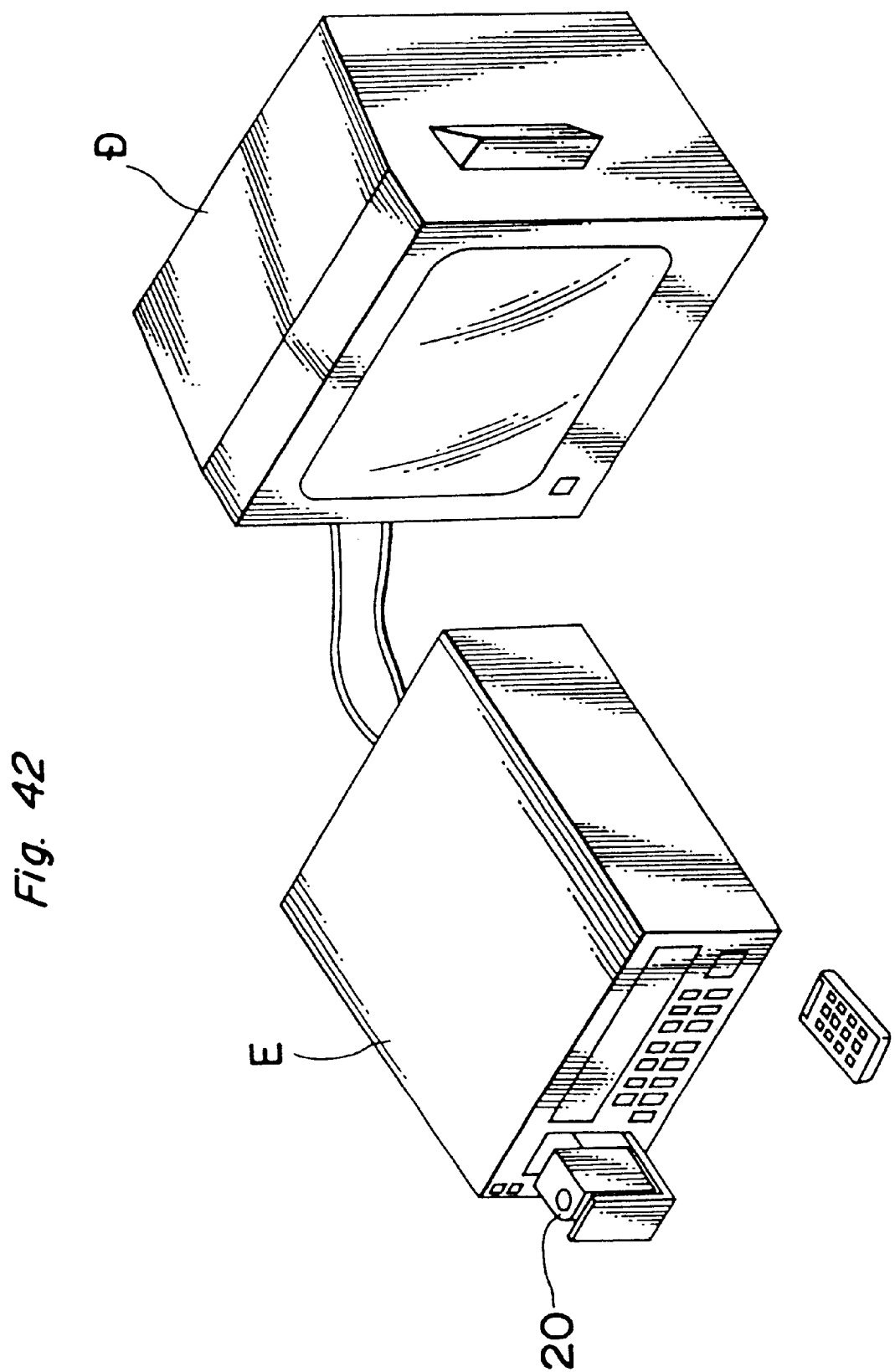
FIG. 42 is a perspective view showing a reading device for reading an image of a film and a display device.

As an apparatus having a function of reading magnetic information, the camera has been exemplified. In addition, the present invention is applicable to a printing apparatus for reading an image recorded on a film and printing the image on a sheet of paper; and various types of image-reading apparatuses (E) for displaying an image on a display device (D), as shown in FIG. 42. In the image-reading apparatus, processing is executed according to the content of information recorded on the magnetic-recording region. For example, data of images is printed on a necessary number of sheets, based on the information of the number of sheets on which images are printed; photographed dates and photographic information such as a shutter speed and an aperture value are displayed on the display device together with the display of images; or image processing is automatically executed based on the photographic information so as to display images on the display device.

In the image-reading apparatus of reading magnetic information, noise is detected before a reading operation is executed to determine whether or not the magnetic information can be read correctly before the magnetic information is read, similarly to the camera.

With reference to FIGS. 43 through 57, preferred embodiments of a magnetic recording/reproducing apparatus of the present invention will be described in detail below.

Figure 43:
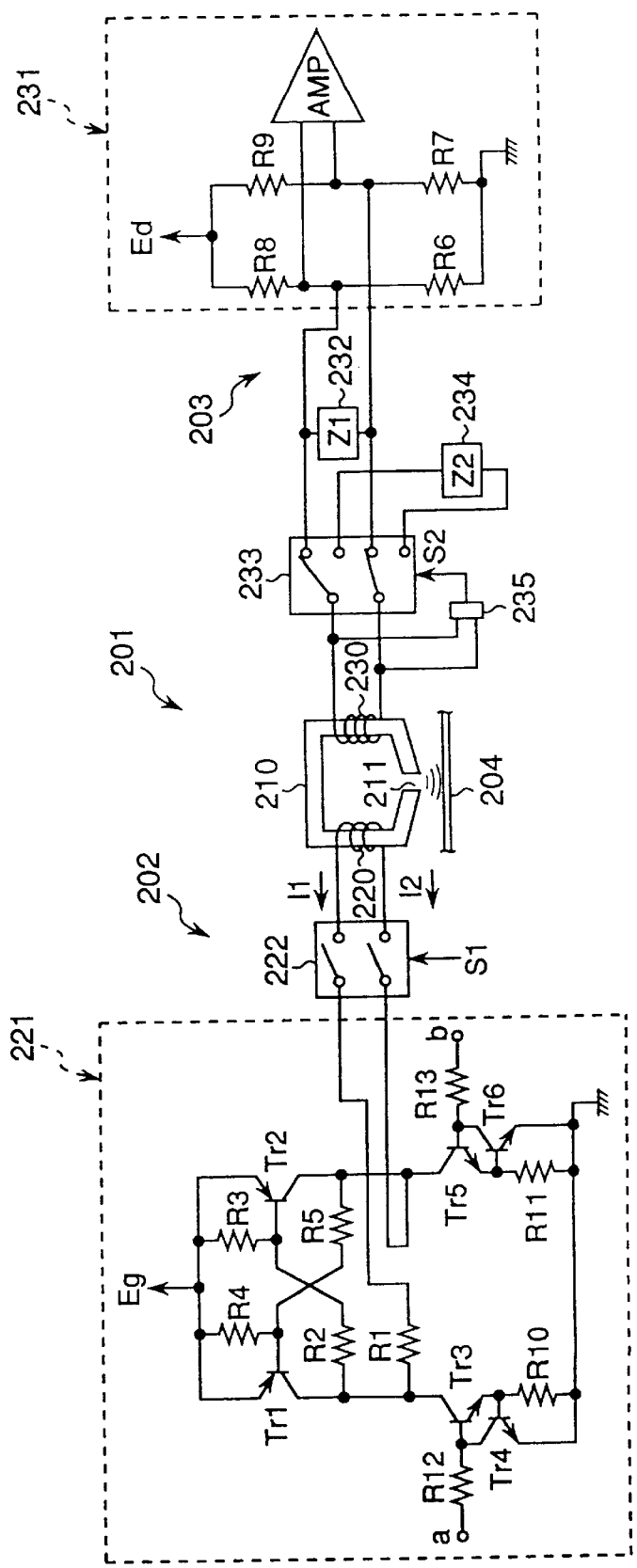
FIG. 43 is a circuit diagram showing writing and reproducing circuits provided in the periphery of a magnetic head according to a first embodiment of a magnetic recording/reproducing apparatus or an image-reading apparatus of the present invention.

FIG. 43 is a circuit diagram showing writing and reproducing circuits provided in the periphery of a magnetic head according to a first embodiment of the magnetic recording/reproducing apparatus.

Referring to FIG. 4 , a magnetic head 201 has an annular core 210 having a gap 211, having a predetermined size, formed on a portion thereof. A writing coil 220 and a read-out coil 230 are wound on the core 210 such that the former is positioned on one side of the gap 211 and the latter is positioned on the other side thereof. That is, the writing coil 220 and the read-out coil 230 have the core 210 in common. The writing coil 220 and the read-out coil 230 are connected with a recording circuit section 202 and a reproducing circuit section 203, respectively. A magnetic recording medium 204, for example, a magnetic tape having a magnetic material applied to the sur face thereof is provided in confrontation with the gap 211 such that the magnetic recording medium 204 is movable relative to the magnetic head 201.

The recording circuit section 202 comprises a driver 221 which outputs information to be written on the recording medium 204 as high and low level signals; and a switch 222 interposed between the driver 221 and the writing coil 220. The switch 222 is turned on and off, upon receipt of a change-over signal S1 to be output ed when a writing signal is detected.

The driver 221 comprises a power source Eg and input terminals (a) and (b). A writing signal is inputted to the input terminals (a) and (b). The input terminal (a) is connected with the base of a transistor Tr3 and the collector of a transistor Tr4 via a resistor R12. The emitter of the transistor Tr3 is connected with the base of the transistor Tr4 and one end of a resistor R10, and the other end of the resistor R10 and the emitter of the transistor Tr4 are grounded, thus constituting a constant current circuit. The input terminal (b) is connected with the base of a transistor Tr5 and the collector of a transistor Tr6 via a resistor R13. The emitter of the transistor Tr5 is connected with the base of the transistor Tr6 and one end of a resistor R11, and the other end of the resistor R11 and the emitter of the transistor Tr6 are grounded, thus constituting another constant current circuit. Between the power source Eg and the collector of the transistor Tr3, a series circuit of resistors R2 and R3 for setting the voltage of the base of a transistor Tr2 is connected in parallel with a transistor Tr1. Between the power source Eg and the collector of the transistor Tr5, another series circuit of resistors R4 and R5 for setting the voltage of the base of the transistor Tr1 is connected in parallel with the transistor Tr2. Further, a series circuit comprising a resistor R1 and the writing coil 220 is connected between the collector of the transistor Tr1 and the collector of the transistor Tr2. The transistors Tr1 and Tr2 have a function of flowing constant electric currents I1 and I2 to the writing coil 220 in the directions shown in FIG. 43.

In this construction, upon input of a high level signal to the input terminal (a) (low level signal is inputted to input terminal (b)), the constant current I1 flows from the power source Eg to the ground (GND) via the transistor Tr2, the writing coil 220, the resistor R1, the transistor Tr3, and the resistor R10. Upon input of a high level signal to the input terminal (b) (low level signal is inputted to input terminal (a)), the constant current I2 flows from the power source Eg to the ground GND via the transistor Tr1, the resistor R1, the writing coil 220, the transistor Tr5, and the resistor R11. As a result, for each data to be recorded, magnetic fields in opposite directions are generated in the gap 211 so as to magnetize (write) the magnetic recording medium 204 in the directions corresponding to those of the magnetic fields.

The reproducing circuit section 203 comprises a reproducing circuit 231 having an amplifier AMP which amplifies a signal picked up by the read-out coil 230 up to a predetermined level and an impedance circuit 232, having a predetermined impedance Z1, comprising a parallel circuit of a resistor and a capacitor connected with an input portion of the amplifier AMP. The impedance circuit 232 is a CR circuit functioning as a secondary low pass filter for cutting off a high frequency noise. A switch 233 provided between the read-out coil 230 and the impedance circuit 232 selectively connects the read-out coil 230 and the reproducing circuit 231 to each other and the read-out coil 230 and an impedance circuit 234, upon receipt of a change-over signal S2. A change-over switch generation circuit 235 generates the change-over signal S2, based on a voltage induced at the read-out coil 230. The impedance circuit 234, having a predetermined impedance Z2, comprises capacitor or the capacitor and a resistor connected in parallel with each other.

The reproducing circuit 231 has a bias power source Ed in addition to the amplifier AMP. Between the amplifier AMP and the ground (GND), a series circuit of bias resistors R8 and R6 is connected in parallel with a series circuit of bias resistors R9 and R7. The midpoint of the former series circuit is connected with one end of the read-out coil 230 and one input terminal of the amplifier AMP, while the midpoint of the later series circuit is connected with the other end of the read-out coil 230 and the other input terminal of the amplifier AMP so as to set a bias voltage. The read-out coil 230 and the amplifier AMP are kept to be biased. The change-over signal S2 may be generated, only upon receipt of a data-recording instruction signal or a data-reproducing instruction signal.

The operation of the above-described construction is described below.

In a data-recording time, a high level signal is inputted to the input terminal (a) while a low level signal is inputted to the input terminal (b) to flow the constant electric current I1 through the writing coil 220. As a result, the transistors Tr3 and Tr4 function to flow the constant current I1 through the writing coil 220. At this time, the transistor Tr5 and Tr6 are OFF. As a result, the voltage at the midpoint between the resistors R3 and R2 drops to turn ON the transistor Tr2. Thus, the constant electric current I1 flows from the power source Eg to the ground (GND) via the transistor Tr2, the writing coil 220, the resistor R1, the transistor Tr3, and the resistor R10. At this point, due to the flow of the constant electric current I1, a voltage drop is great at the resistor R1 and the writing coil 220, and thus a voltage drop at the resistor R4 is small. Thus, the transistor Tr1 remains OFF. In order to flow the constant electric current I2 through the writing coil 220, a low level signal is inputted to the input terminal (a) while a high level signal is inputted to the input terminal (b). As a result, the transistors Tr5 and Tr6 function to flow the constant current I2 through the writing coil 220. At this time, the transistor Tr3 and Tr4 are OFF. As a result of the turning ON of the transistor Tr5, the voltage at the midpoint between the resistors R4 and R drops to turn ON the transistor Tr2. Thus, the constant electric current I2 flows from the power source Eg to the ground (GND) via the transistor Tr1, the resistor R1, the writing coil 220, the transistor Tr5, and the resistor R11.

The switch 222 is turned ON upon receipt of the change-over signal S1 generated by utilizing the high level signal applied to the input terminal (a) or to the input terminal (b) as described above, thus connecting the writing coil 220 and the driver 221 to each other. As described previously, upon application of the high level signal to the input terminal (a) or the input terminal (b), the constant electric currents I1 and I2 flow. As a result, a voltage is induced at the read-out coil 230. Based on the induced voltage, the change-over switch generation circuit 235 generates the change-over signal S2. When the voltage is induced at the read-out coil 230, the switch 233 is turned OFF, thus disconnecting the read-out coil 230 from the reproducing circuit 231 and connecting the read-out coil 230 to the impedance circuit 234. If the voltage is not induced at the read-out coil 230, the switch 233 connects the read-out coil 230 to the reproducing circuit 231.

In a data-reproducing time, the collector terminal of the transistors Tr3 and Tr5 is allowed to have a high impedance, with the level of signals to be inputted to the terminals (a) and (b) kept at "low". When the recording medium 204 on which magnetic signals have been written moves relative to the gap 211, the intensity of a magnetic field changes in the gap 211. A resultant change of a magnetic flux density is taken out as an induced voltage signal via the read-out coil 230. In the data reproducing time, because the switch 233 connects the read-out coil 230 and the reproducing circuit 231 to each other, upon receipt of the change-over signal S2, the induced voltage is superimposed on the bias voltage through the impedance circuit 232 and introduced into the amplifier AMP. Then, the amplifier AMP amplifies the voltage up to a predetermined level.

As described above, ON and OFF of the switches 222 and 233 are controlled in correspondence to writing operation. Thus, the induced voltage is not applied to the reproducing circuit 231 even though the mutual induction voltage is generated on the read-out coil 230 when writing electric current flows. Accordingly, electronic parts constituting the reproducing circuit 231 can be prevented from being deteriorated or damaged. At this time, owing to the impedance circuit 234, the induced voltage becomes low and hence an excess voltage is not induced. Consequently, the switch 233 can be prevented from being damaged.

In the data-reproducing time, because the switch 222 is turned OFF and the writing coil 220 is set at a high impedance, electric current does not flow through the writing coil 220 even though the induced voltage is generated at the writing coil 220. Thus, a signal picked up by the read-out coil 230 can be prevented from being deteriorated.

Figure 44:
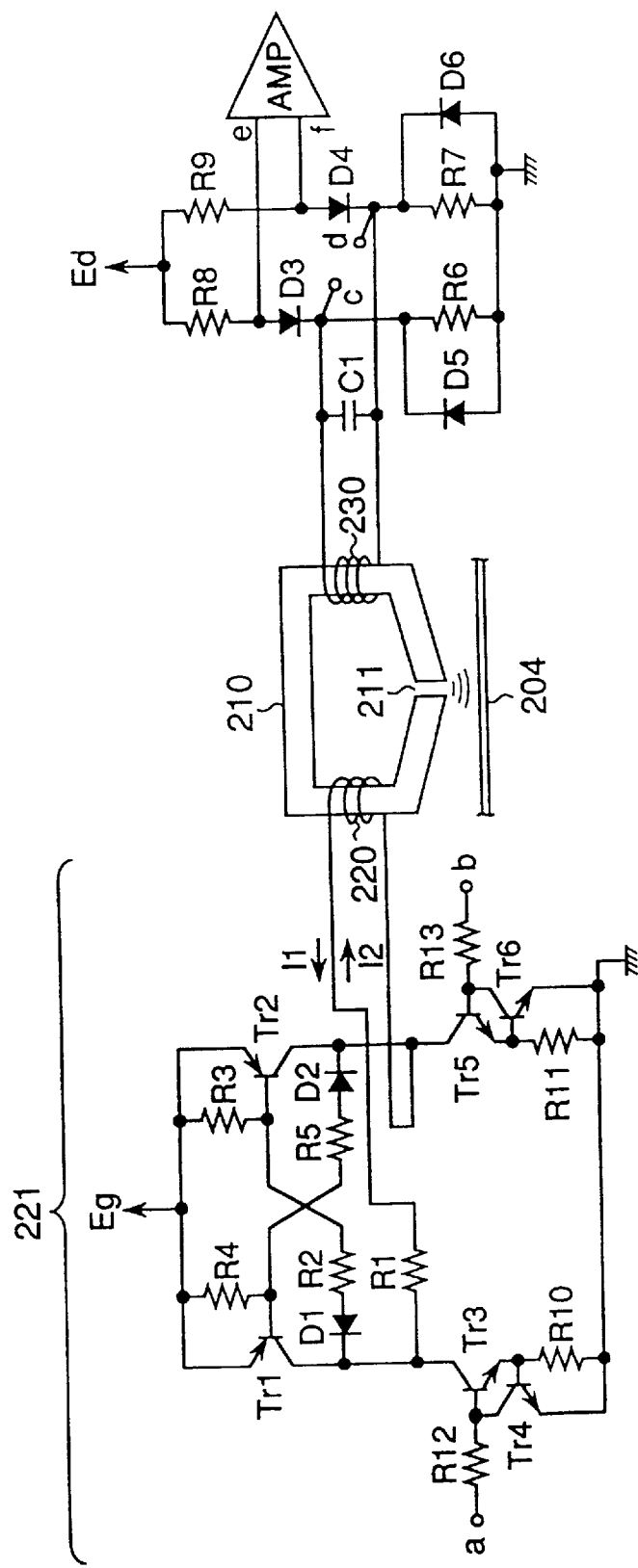
FIG. 44 is a circuit diagram showing writing and reproducing circuits provided in the periphery of a magnetic head according to a second embodiment of the magnetic recording/reproducing apparatus of the present invention.

FIG. 44 is a circuit diagram showing writing and reproducing circuits provided in the periphery of a magnetic head according to a second embodiment of the magnetic recording/reproducing apparatus.

In the second embodiment, instead of the switches 222 and 233, the impedance circuits 232 and 234, and the change-over switch generation circuit 235, diodes D1 through D6 are provided.

That is, in the driver 221, the diode D1 is connected between the resistors R2 and R1 with the anode thereof being at the side of the resistor R2, and the diode D2 is connected between the resistors R5 and the writing coil 220 with the anode thereof being at the side of the resistor R5.

In the reproducing circuit 231, the diode D3 is connected between the resistors R8 and an input terminal (c) with the anode thereof being at the side of the resistor R8; the diode D4 is connected between the resistor R9 and an input terminal (d) with the anode hereof being at the side of the resistor R9; the diode D5 is connected in parallel with the resistor R6 with the anode thereof earthing; and the diode D6 is connected with the resistor R7 with the anode thereof earthing. A capacitor C1 is connected between the input terminals (c) and (d), i.e., the capacitor C1 is connected in parallel with the read-out coil 230.

The operation of the diodes D1 and D2 is described below.

In a data-reproducing time, because a low level signal is inputted to the input terminals (a) and (b) of the driver 221, the transistor Tr1, Tr2, Tr3, and Tr5 are OFF. Although the writing coil 220 is connected with the series circuit of the resistors R1 through R5 and the diodes D1 and D2, the writing coil 220 has a high impedance constantly at both ends thereof. This is because the polarity of the diodes D1 and D2 acts such that one of the diodes D1 and D2 does not fail to be in a reverse bias state even though an induced voltage is generated in both directions at the writing coil 220. Accordingly, although a voltage is induced at the writing coil 220, electric current does not flow therethrough. Thus, a signal picked up by the read-out coil 230 is not influenced by the voltage induced at the writing coil 220.

In a data-recording time, when a positive voltage is generated at the input terminal (c), a reverse bias voltage is applied to the diode D3. As a result, the amplifier AMP goes into a cut-off state. At this time, a negative voltage is generated at the input terminal (d) and the diode D6 is at a forward bias. As a result, the diode D6 becomes conductive, and thus the electric potential at the input terminal (d) becomes $-V_{F6}$ which is the forward electric potential of the diode D6. At this time, the diode D4 also becomes conductive and thus the electric potential of an input terminal (f) of the amplifier AMP becomes $-V_{F6}+V_{F4}$, supposing that the forward electric potential of the diode D4 is $V_{F4}$. Because the electric potentials $V_{F6}$ and $V_{F4}$ are almost equal to each other, the electric potential at the input terminal (f) becomes almost equal to the electric potential of the GND. Accordingly, an excess negative voltage is not applied to the input terminal (f). Thus, there is no possibility that a parasitic diode generated at the electric circuit of the amplifier AMP due to the structure of a silicon chip constituting the amplifier AMP is turned ON. Therefore, excess electric current does not flow through the amplifier AMP and thus the performance of the chip can be prevented from being deteriorated.

When a positive voltage is generated at the input terminal (d), a reverse bias voltage is applied to the diode D4. As a result, the amplifier AMP goes into a cut-off state, and similarly to the above case, an excess negative voltage is not generated at an input terminal (e) of the amplifier AMP. Thus, in both cases, an excess voltage is not applied to the amplifier AMP due to the mutual induction action and further, the performance of the chip constituting the amplifier AMP can be prevented from being deteriorated.

In the second embodiment, because the capacitor C1 is connected in parallel with the read-out coil 230, the following actions take place.

The read-out coil 230 can be allowed to have a reduced impedance at the termination thereof. Thus, a low voltage is generated by the mutual induction action. Hence, even though the induced voltage is applied to the input terminals (c) and (d), the performance of the diodes D3 and D4 can be prevented from being deteriorated.

Figure 45A:
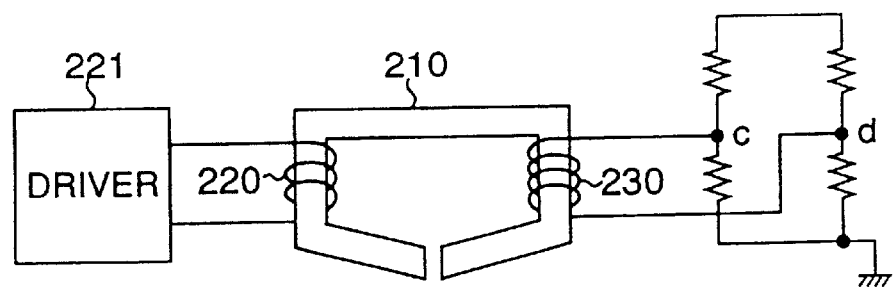
FIG. 45(a) is a circuit diagram showing the operation of an electric circuit not provided with a capacitor C1.
Figure 45B:
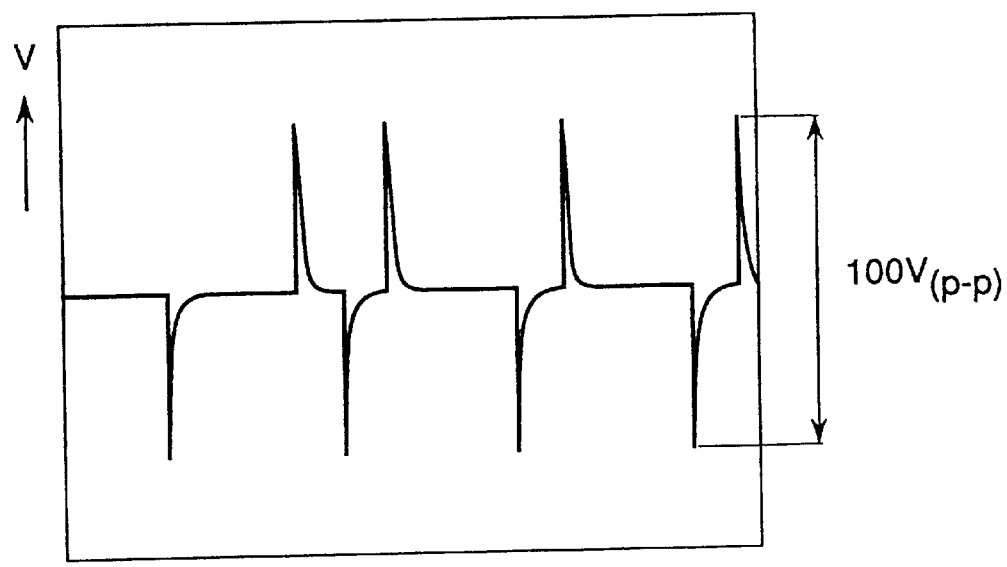
FIG. 45(b) is a waveform chart obtained by experiments.
Figure 46A:
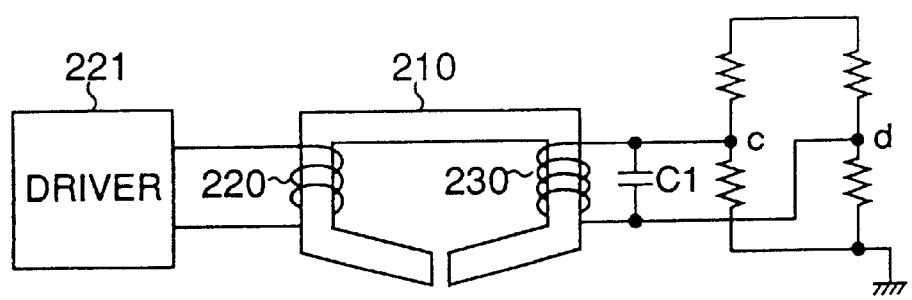
FIG. 46(a) is a circuit diagram showing the operation of the electric circuit provided with the capacitor.
Figure 46B:
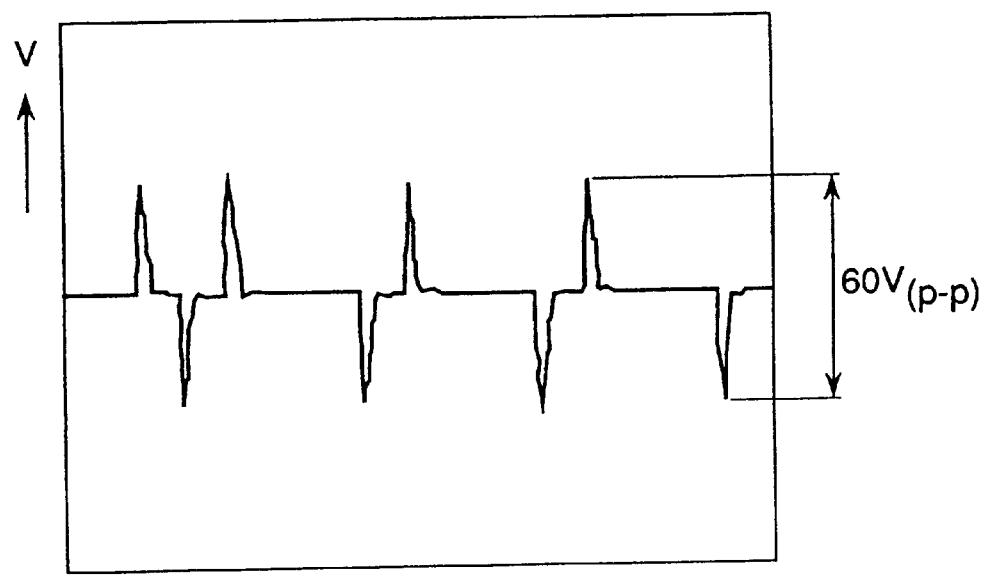
FIG. 46(b) is a waveform chart obtained by experiments.

FIGS. 45(a), 45(b), 46(a), and 46(b) are views each showing a circuit diagram for describing the operation of the capacitor C1 and a waveform obtained by experiments. In FIG. 45(a), the capacitor C1 is not provided between the input terminals (c) and (d), whereas in FIG. 46(a), the capacitor C1 is provided between the input terminals (c) and (d). Referring to FIG. 45(b), when the capacitor C1 is not provided between the input terminals (c) and (d), a voltage of 100V(p-p) (p-p: peak to peak) is induced at the read-out coil 230 due to the mutual induction action in the data-recording time. Supposing that the coil-winding ratio between the writing coil 220 and the read-out coil 230 is 1:20; the resistor R1 has 10 Ω; and a writing signal of 1V is applied, electric current of 100 mA flows and an induction voltage of 100V(p-p) is generated at the read-out coil 230. When the capacitor C1 is provided between the input terminals (c) and (d) as shown in FIG. 46(a), a smaller induction voltage of 60V(p-p) is generated at the read-out coil 230.

Because the read-out coil 230 terminates at the capacitor C1 and the resistors, a secondary low-pass filter can be constituted. The secondary low-pass filter cuts off a high frequency noise. Thus, signals having a small quantity of noise are introduced to the amplifier AMP.

Figure 47:
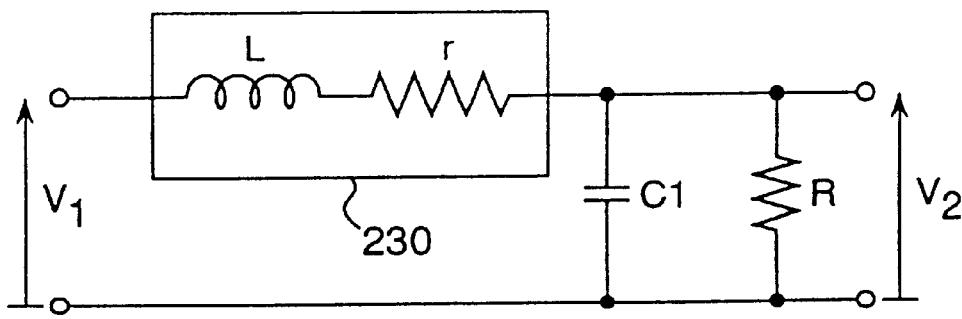
FIG. 47 is a view showing the construction of a secondary low-pass filter, namely, the construction of an equivalent circuit viewed from terminals (c) and (d) toward an output side.

FIG. 47 is a view showing a construction of the secondary low-pass filter, namely, a view showing the construction of an equivalent circuit viewed from the input terminals (c) and (d) shown in FIG. 44 toward the read-out coil 230. In FIG. 47, V1 is the induction voltage of the read-out coil 230; V2 is a voltage to be inputted to the amplifier AMP; L and r are inductance and DC resistance; and R is an equivalent resistance in the above equivalent circuit. The equivalent circuit is expressed as (R8+R9)//(R6+R7) (// is an operator for finding a parallel combined resistance). The equivalent resistance of the diodes D3 and D4 is ignored.

Supposing that the voltage V1 is generated at the read-out coil 230 by application of a magnetic signal to the electric circuit, the voltage V2 is outputted to the amplifier AMP. Thus, a transfer function V2/V1 is expressed by the following equation:

$$V2/V1 = R/[S^2 \times L \times C1 \times R + S(L + C1 \times R \times r) + r + R]$$

The above equation shows the characteristic of the secondary low-pass filter. The cut-off frequency of the low-pass filter is set roughly at the capacity of the capacitor C1 with respect to the equivalent circuit of the read-out coil 230. A value (Q) indicating a cut-off amplitude characteristic is set roughly at the resistance (R). When the resistance (R) is great, a resistor is connected in parallel with the capacitor C1 as necessary to suppress the resistance (R). The cut-off frequency is set at a value in proximity to the highest frequency of the data signal to effectively cut off noise having a frequency higher than that of the data signal which can be picked up by the read-out coil 230. Thus, S/N ratio can be improved.

Because the read-out coil 230 terminates at the capacitor C1 and the resistors, a favorable performance in writing data can be provided.

Improved characteristics in writing data are described below with reference to FIGS. 48 through 53.

Figure 48:
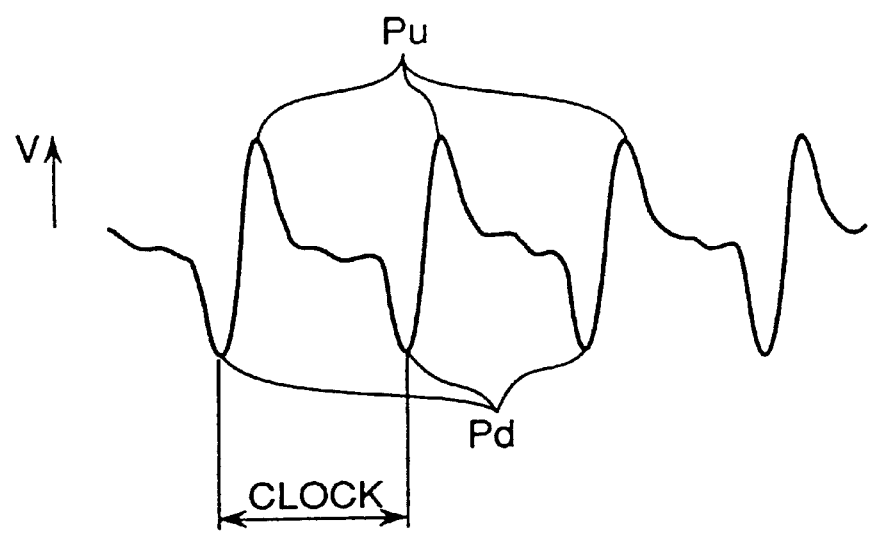
FIG. 48 is a waveform chart showing a data signal outputted from a read-out coil.
Figure 49:
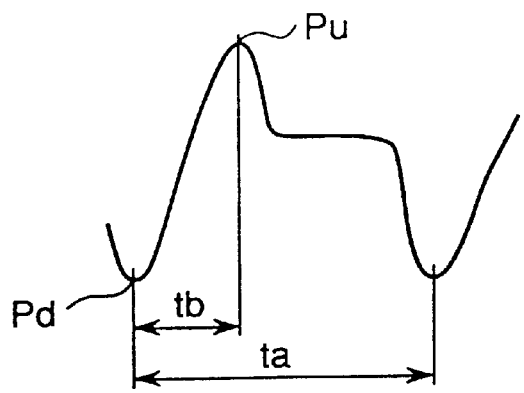
FIG. 49 is a waveform chart showing one cycle of the data signal outputted from the read-out coil.

First, with reference to FIGS. 48 and 49, the waveform of the data signal outputted from the read-out coil 230 is described below. The output waveform is as shown in FIG. 48. Paying attention to a local maximum point Pu and a local minimum point Pd of the amplitude of the waveform, the local minimum points Pd indicates a clock (one cycle) of data, while the local maximum point Pu indicates the content (1 or 0) of the data at the generation point thereof. That is, if the generation point of the local maximum point Pu is in the first half in one cycle of the clock, the content of the data is "0", while if the generation point thereof is in the second half in one cycle of the clock, the content of the data is "1". The generation point of the local maximum point Pu of one cycle of the clock is defined as a "location". Referring to FIG. 49, let it be supposed that one cycle of the local minimum point Pd is ta and the distance between the local minimum point Pd and the local maximum point Pu is tb. If tb/ta=¼, "location" is 25%.

Figure 50:
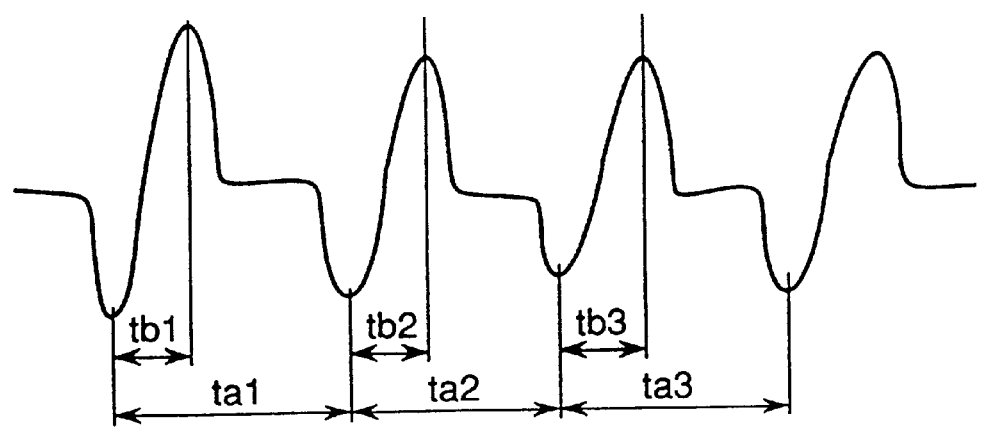
FIG. 50 is a waveform chart showing a continuous wave of the data signal outputted from the read-out coil and describing "location"

When the data are composed of "0" and "1" arranged in random, there is a possibility that when the magnetic signal is recorded at a high density the local minimum point Pd and the local maximum point Pu shift, which affects said "dislocation". For example, if data consists of "0", the ratio of the data to the clock, namely, $tb_n/ta_n$ is almost constant as shown in FIG. 50.

When data is a mixture pattern of "0" and "1", when data at two points is both "0" and data immediately before one point is "1" and data immediately before the other point is "0", tb/ta is unequal to tb'/ta' as shown in FIG. 51 showing an experimental result, which means "dislocation".

Figure 52A:
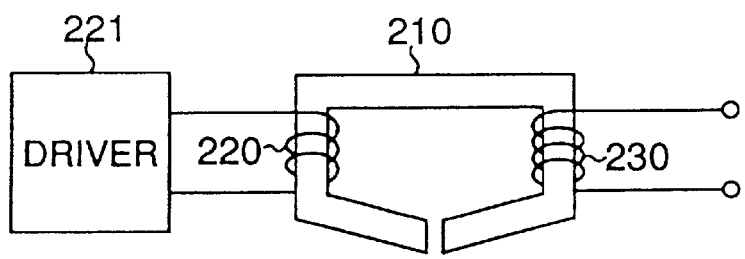
FIG. 52(a) is a circuit diagram showing a termination of a circuit at the time when the read-out coil is open and describing "dislocation"
Figure 52B:
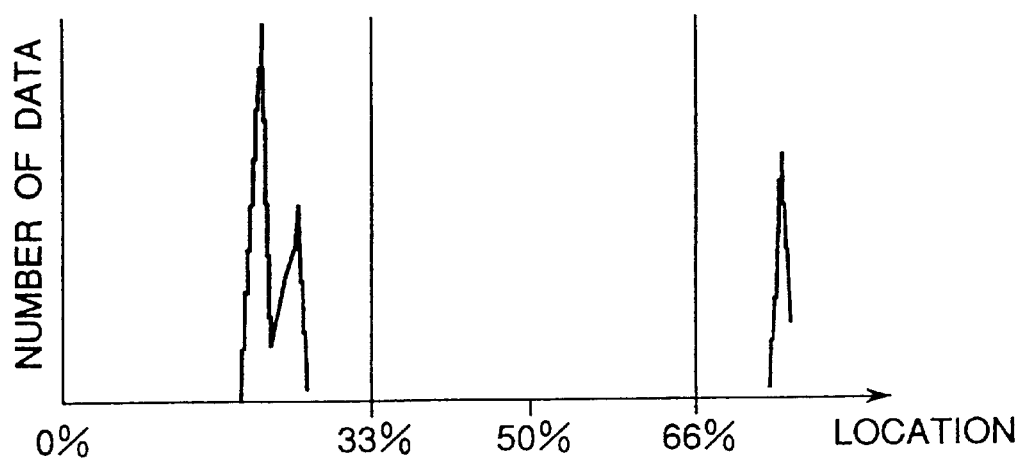
FIG. 52(b) is a view showing the difference between "locations" of output waveforms obtained by an experiment.
Figure 53A:
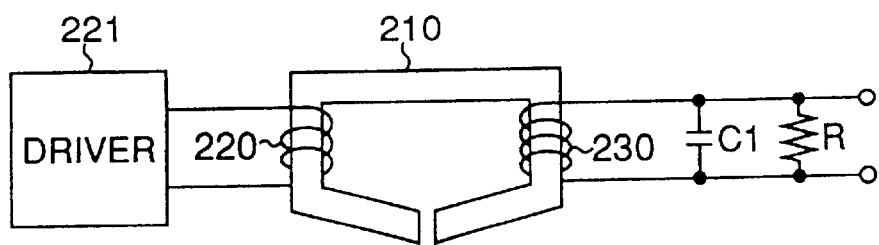
FIG. 53(a) is a circuit diagram showing a termination of a circuit, according to a second embodiment and describing "dislocation"

FIGS. 52(a), 52(b), 53(a), and 53(b) show termination circuits and the difference between locations of output waveforms obtained by experiments. In FIG. 52(a), the read-out coil 230 is open, while FIG. 53(a) shows the same termination circuit as that shown in FIG. 44.

Figure 53B:
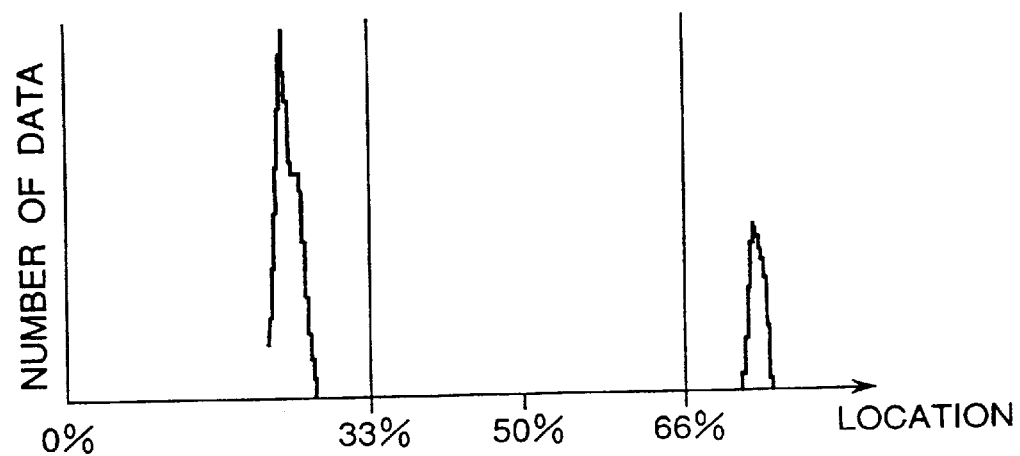
FIG. 53 (b) is a view showing the difference between "locations" of output waveforms obtained by an experiment.

In the graphs of FIGS. 52(b) and 53(b), data "0001" ("0" at 25% and "1" at 75%) is continuously written in the same condition. In FIG. 52(b), "location" of data composed of "0" shifts and consequently, to local maximum points are generated. Thus, "dislocation" occurs at 10%. In FIG. 53(b), "dislocation" of the data composed of "0" occurs at approximately 5%. The connection of the capacitor C1 and the equivalent resistance (R) with both ends of the read-out coil 230 leads to the improvement of the performance in writing data.

Figure 54:
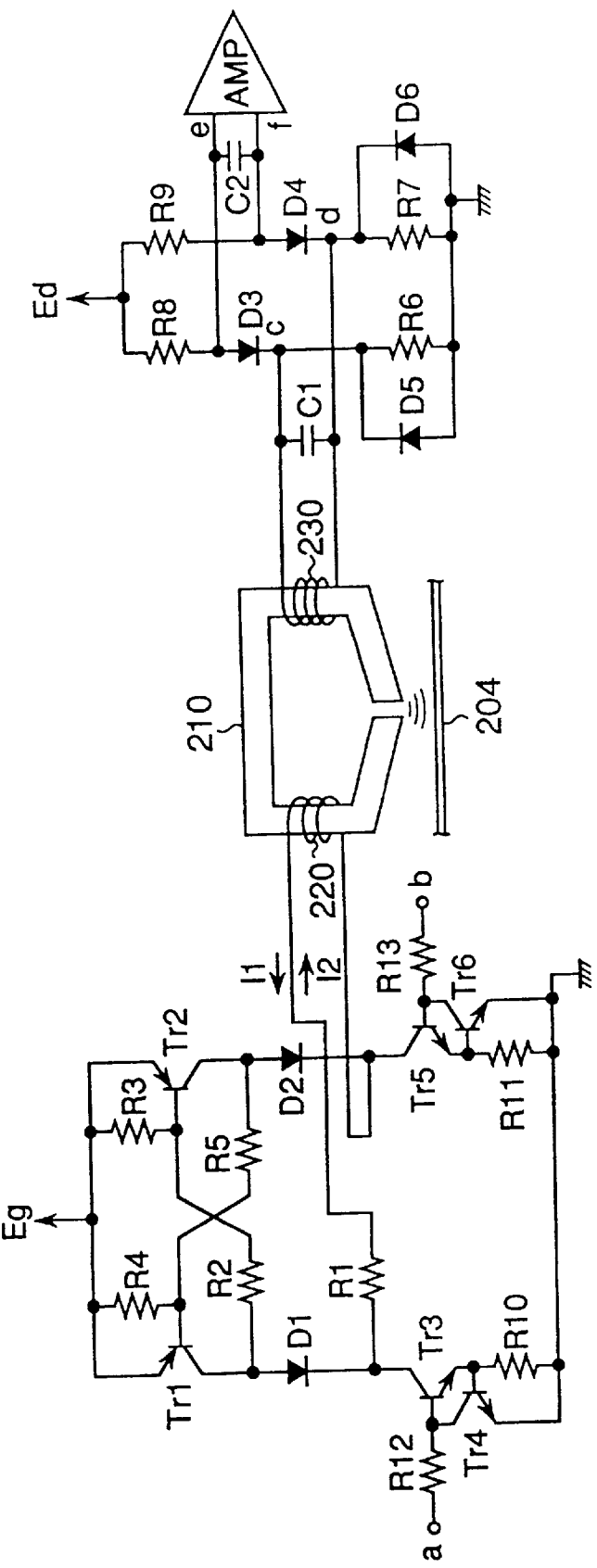
FIG. 54 is a circuit diagram showing writing and reproducing circuits provided in the periphery of a magnetic head according to a third embodiment of the magnetic recording/reproducing apparatus of the present invention.

FIG. 54 is a circuit diagram showing writing and reproducing circuits provided in the periphery of a magnetic head according to a third embodiment of the magnetic recording/reproducing apparatus.

In the third embodiment, the connection positions of the diodes D1 and D2 are different from those of the second embodiment, and a capacitor C2 is connected between the input terminals (e) and (f) of the amplifier AMP of the reproducing circuit 231. The diodes D1 and D2 have a function of preventing induced electric current from flowing through the series loop of the writing coil 220, the resistors R1, R2, R3, R4, and R5, although a voltage is induced at the writing coil 220 in the data-recording time. Thus, the diodes D1 and D2 provide the same effect regardless of whether they are located at the positions shown in FIG. 54 or at other appropriate positions so long as they are provided in the series loop.

The diodes D3 and D4 go into a cut-off state due to the addition of the capacitor C2 to the reproducing circuit 31 in the data-recording time. Thus, the capacitor C1 serves as a means for adjusting the voltage generated by the mutual induction action of the read-out coil 30. Because the diodes D3 and D4 become conductive in the data-reproducing time, the capacity of a capacitor to compose the low-pass filter is set at C1+C2. It is possible to remove the capacitor C1 from the electric circuit. The capacitors C1 and C2 may be set at an optimum capacity depending on desired effect.

Figure 55:
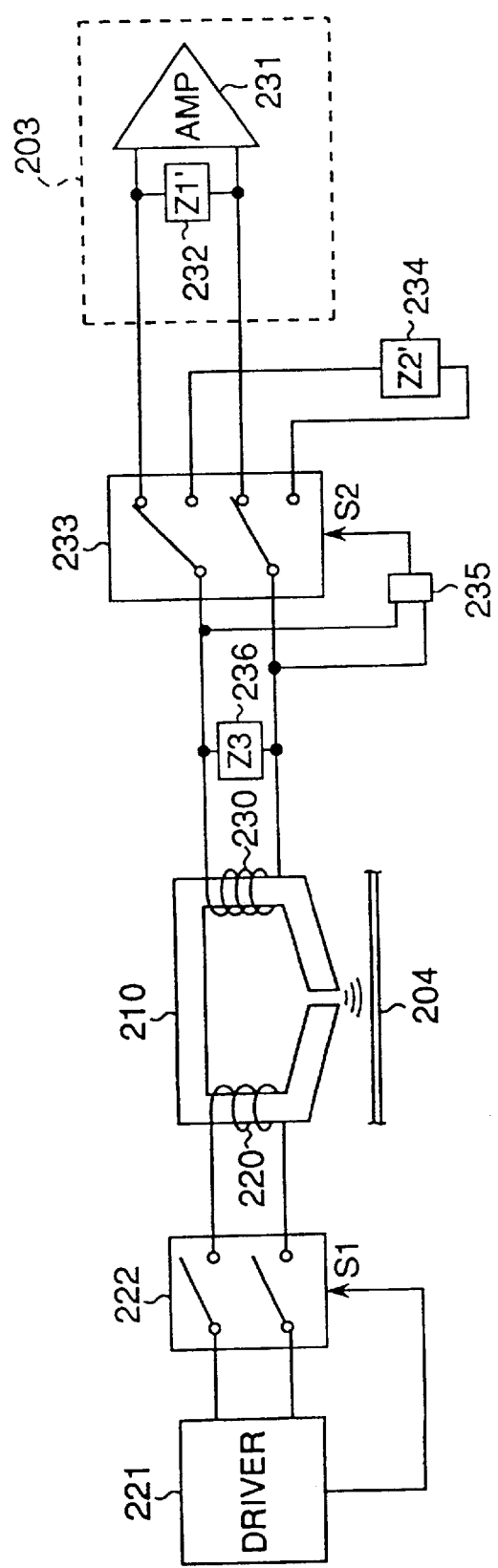
FIG. 55 is a circuit diagram showing writing and reproducing circuits provided in the periphery of a magnetic head according to a fourth embodiment of the magnetic recording/reproducing apparatus of the present invention.

FIG. 55 is a circuit diagram showing writing and reproducing circuits provided in the periphery of a magnetic head according to a fourth embodiment of the magnetic recording/reproducing apparatus.

In the fourth embodiment, unlike the above-described embodiments, an impedance circuit 236 is connected with the read-out coil 230 at both ends thereof. The impedance of the impedance circuit 236 has an element common to the impedance circuits 232 and 234. Thus, the common element can be removed from the impedance circuits 232 and 234, and hence the electric circuit can be manufactured at a low cost.

Figure 56:
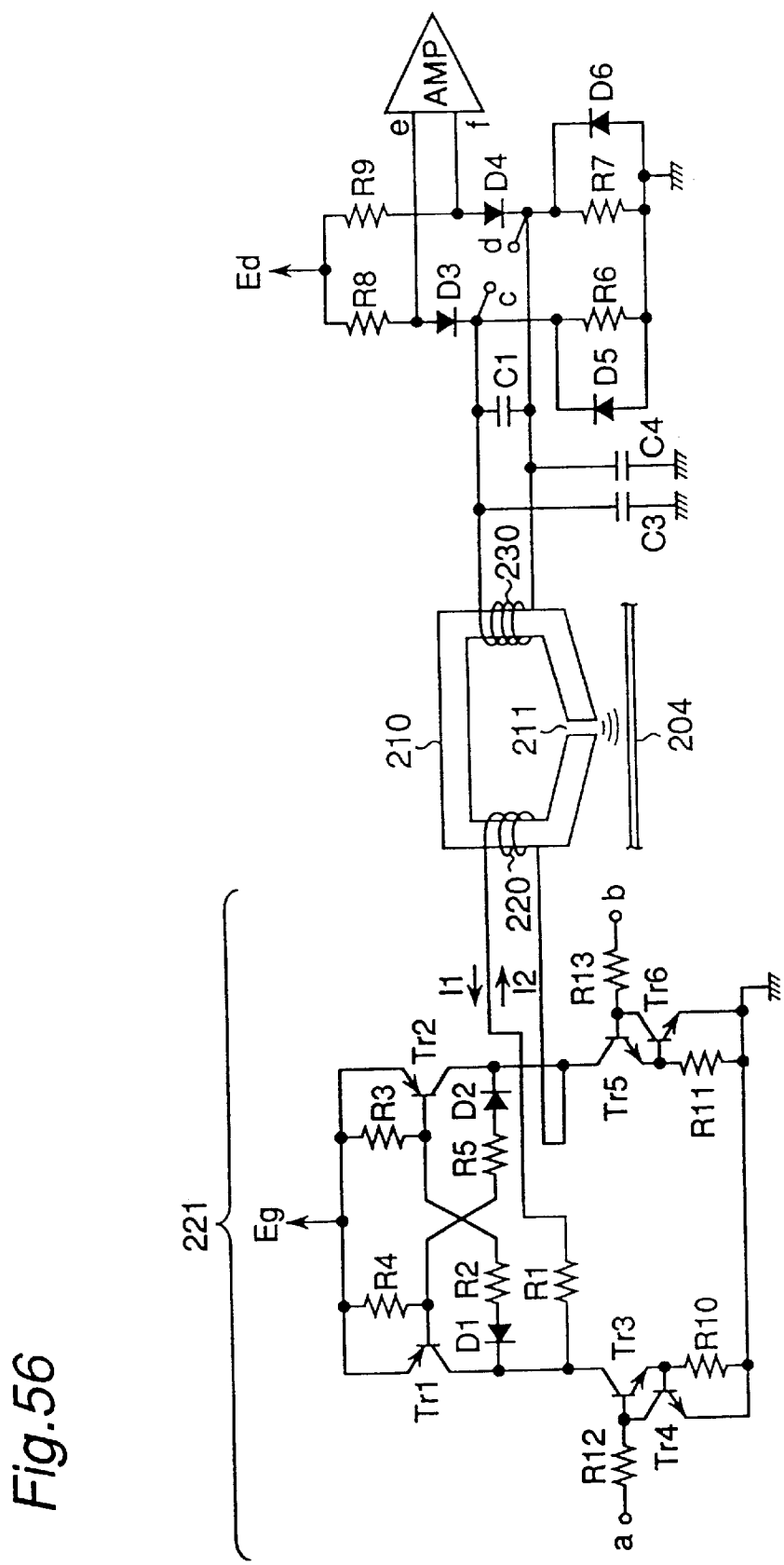
FIG. 56 is a circuit diagram showing writing and reproducing circuits provided in the periphery of a magnetic head according to a fifth embodiment of the magnetic recording/reproducing apparatus of the present invention.
Figure 57:
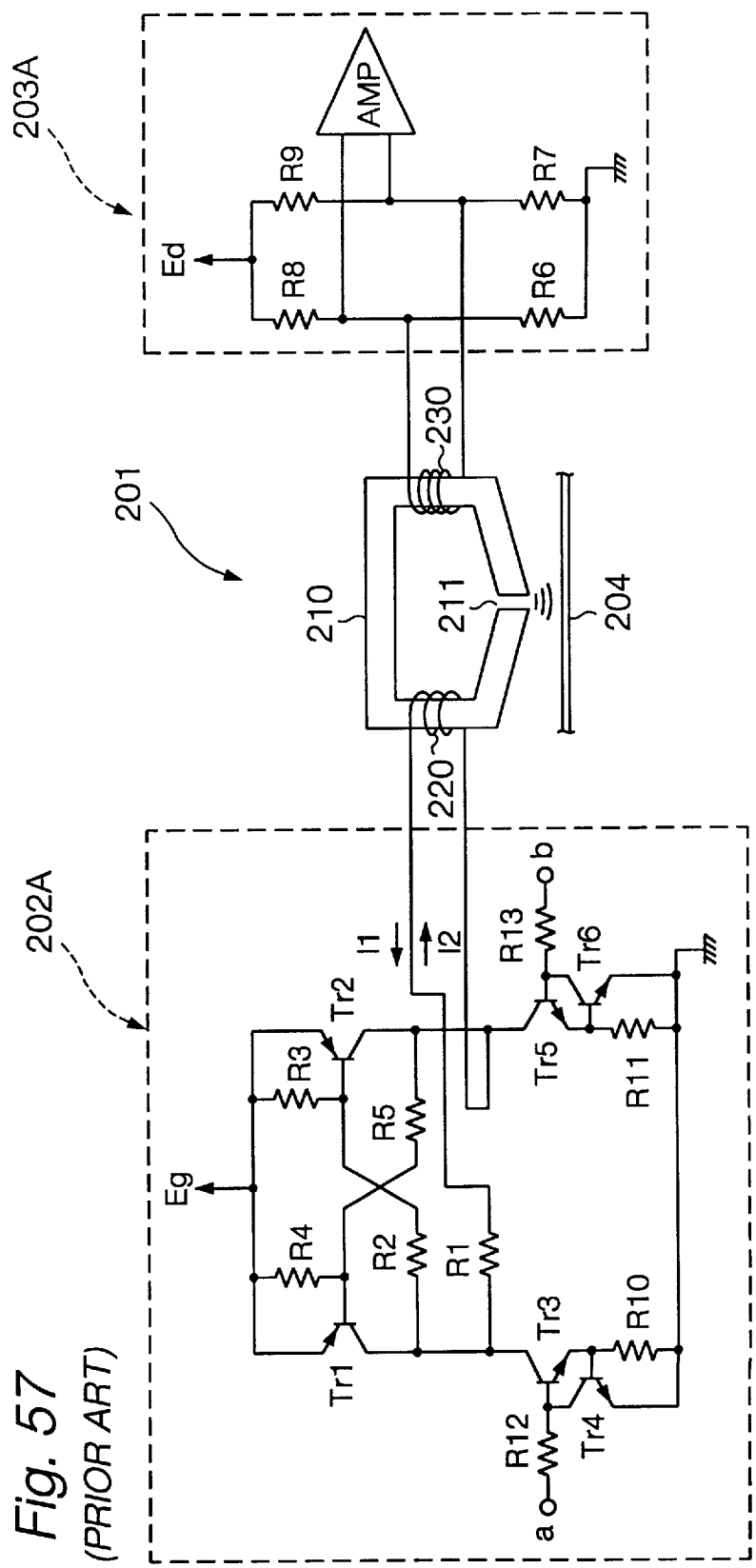
FIG. 57 is a circuit diagram showing writing and reproducing circuits provided in the periphery of a magnetic head of a conventional magnetic recording/reproducing apparatus.

FIG. 56 is a circuit diagram showing writing and reproducing circuits provided in the periphery of a magnetic head according to a fifth embodiment of a magnetic recording/reproducing apparatus of the present invention.

In the fifth embodiment, capacitors C3 and C4 shown in FIG. 44 are connected between both ends of the read-out coil 230 and the ground GND. The capacitors C3 and C4 attenuate common mode noise outputted from the read-out coil 230 in the data-reproducing time, thus preventing it from being inputted to the amplifier AMP. In this case, the capacitor constituting the low-pass filter is set at $\{C1+(C3\times C4)/(C3+C4)\}$.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A camera adapted to utilize a film having a magnetic information-recording region formed on the film, said camera comprising:
   an information-reading device for reading information recorded on the magnetic information-recording region of the film;
   a determiner for detecting a signal which is outputted from said information-reading device for a region other than the magnetic information-recording region of the film, before the information-reading device reads a magnetic signal on the magnetic information-recording region of the film, and for determining, based on the thus detected signal, before the information-reading device reads a magnetic signal on the magnetic information-recording region of the film, whether the information-reading device may be incapable of correctly reading any information recorded on the magnetic information-recording region of the film; and
   a controller for controlling an operation of the camera according to a determination made by the determiner.

2. The camera according to claim 1, wherein the determiner executes a determination by comparing a level of a noise contained in said signal, outputted from the information-reading device, with a predetermined level.

3. The camera according to claim 1, further comprising a film feeder for feeding the film when the information-reading device reads information recorded on the magnetic information-recording region of the film.

4. The camera according to claim 3, further comprising a detector for detecting an exposure state of the film, based on information read by the information-reading device.

5. The camera according to claim 3, wherein the controller operates so that the film feeder rewinds the film when the determiner determines that the information-reading device may be incapable of correctly reading any information recorded on the magnetic information-recording region of the film.

6. The camera according to claim 1, wherein the controller issues a warning to an operator when the determiner determines that information-reading device may be incapable of correctly reading any information recorded on the magnetic information-recording region of the film.

7. The camera according to claim 1,
   wherein, when the determiner determines that the information-reading device may be incapable of correctly reading any information recorded on the magnetic information-recording region of the film, the controller operates repeatedly until the determiner determines that the information-reading device is capable of correctly reading any information recorded on the magnetic information-recording region of the film.

8. An apparatus capable of reading magnetic information recorded on a magnetic-recording medium, comprising:
   an information-reading device for reading information recorded on the magnetic-recording medium;
   a processor for executing a predetermined operation, based on information read by the information-reading device;
   a detector for detecting a noise contained in an output of the information-reading device; and
   a controller for comparing a level of the detected noise with a predetermined reference level for determining whether the information-reading device may be incapable of correctly reading any information recorded on the magnetic-recording medium and for controlling an operation of the apparatus according to a result obtained by the comparison,
   wherein the detector operates and the controller compares the level of the detected noise with the predetermined reference level before the information-reading device reads magnetic information recorded on the magnetic-recording medium.

9. The apparatus according to claim 8, wherein the detector detects noise outputted from the information-reading device for other than the magnetic-recording medium.

10. The apparatus according to claim 8, wherein the controller does not execute a magnetic information-reading operation when the controller determines that the level of the detected noise is higher than the predetermined reference level.

11. The apparatus according to claim 10, wherein, when the controller determines that the level of the noise is higher than the predetermined reference level, the controller repeats the comparing until the controller determines that the level of the noise is lower than the predetermined reference level.

12. The apparatus according to claim 10, wherein, when the controller determines that the level of the noise is higher than the predetermined reference level, the controller issues a warning that information cannot be correctly read.

13. An apparatus capable of reading magnetic information recorded on a magnetic-recording medium, comprising:
   an information-reading device for reading information recorded on the magnetic-recording medium;
   a processor for executing a predetermined operation, based on information read by the information-reading device;
   a determiner for detecting a signal which is outputted from said information-reading device for other than the magnetic-recording medium and for determining, based on the thus detected signal, whether or not the information-reading device may be incapable of correctly reading any information recorded on the magnetic-recording medium before the information-reading device reads information recorded on the magnetic-recording medium in order to allow the processor to execute the predetermined operation; and a controller for controlling an operation of the apparatus according to a determination of the determiner.

14. The apparatus according to claim 13, wherein the controller issues a warning when the determiner determines that the information-reading device may be incapable of correctly reading magnetic information recorded on the magnetic-recording medium.

15. The apparatus according to claim 13, wherein, when the determiner determines that the information-reading device may be incapable of correctly reading any information recorded on the magnetic-recording medium, the controller repeats an operation of the apparatus until the determiner determines that the information-reading device is capable of correctly reading any information recorded on the magnetic-recording medium.

16. A process for utilizing a film in a camera wherein the film has a magnetic information-recording region formed on the film as well as a second region other than the magnetic information-recording region, and wherein said camera includes an information-reading device for reading information recorded on the magnetic information-recording region of the film, said method comprising the steps of:

detecting a signal which is outputted from said information-reading device for a region other than the magnetic information-recording region of the film;

determining, before the information-reading device reads information magnetically recorded on the magnetic information-recording region of the film, based on said signal, whether the information-reading device may be incapable of correctly reading any information recorded on the magnetic information-recording region of the film; and controlling an operation of the camera according to a result of said step of determining.

17. A process in accordance with claim 16, wherein the step of determining comprises comparing a level of noise contained in said signal with a predetermined level.

18. A process in accordance with claim 16, further comprising the step of rewinding the film when the step of determining determines that the information-reading device may be incapable of correctly reading any information recorded on the magnetic information-recording region of the film.

19. A process in accordance with claim 16, further comprising the step of issuing a warning to an operator when the step of determining determines that the information-reading device may be incapable of correctly reading any information recorded on the magnetic information-recording region of the film.

20. A process in accordance with claim 16, wherein, when the step of determining determines that the information-reading device may be incapable of correctly reading any information recorded on the magnetic information-recording region of the film, the step of controlling includes repeating the step of determining until the step of determining determines that the information-reading device is capable of correctly reading any information recorded on the magnetic information-recording region of the film.

21. A process for reading magnetic information recorded on a magnetic-recording medium, comprising the steps of:

utilizing an information-reading device for reading information recorded on the magnetic-recording medium;

executing a predetermined operation, based on information read by the information-reading device;

detecting a noise contained in an output of the information-reading device before the information-reading device reads magnetic information recorded on the magnetic-recording medium;

comparing a level of the detected noise with a predetermined reference level for determining whether the information reading device may be incapable of correctly reading any information recorded on the magnetic-recording medium before the information-reading device reads magnetic information recorded on the magnetic-recording medium; and controlling an operation of the apparatus according to a result obtained by the comparison.

22. A process in accordance with claim 21, wherein the step of detecting comprises detecting noise outputted from the information-reading device for other than the magnetic-recording medium.

23. A process in accordance with claim 21, wherein the step of controlling comprises avoiding an execution of a magnetic information-reading operation when the step of comparing determines that the level of the detected noise is higher than the predetermined reference level.

24. A process in accordance with claim 23, wherein the step of comparing determines that the level of the noise is higher than the predetermined reference level, the step of controlling comprises repeating the steps of detecting and comparing until the step of comparing determines that the level of the noise is lower than the predetermined reference level.

25. A process in accordance with claim 21, wherein, when the step of comparing determines that the level of the noise is higher than the predetermined reference level, the step of controlling comprises issuing a warning that information cannot be correctly read.

26. A process for reading magnetic information recorded on a magnetic-recording medium, comprising:

utilizing an information-reading device for reading information recorded on the magnetic-recording medium;

executing a predetermined operation, based on information read by the information-reading device;

detecting a signal which is outputted from said information-reading device for a region other than the magnetic-recording medium;

determining, before the information-reading device reads information magnetically recorded on the magnetic information-recording region of the film, based on the thus detected signal, whether or not the information-reading device may be incapable of correctly reading any information recorded on the magnetic-recording medium before the information-reading device reads information recorded on the magnetic-recording medium in order to allow the step of executing the predetermined operation; and controlling an operation according to a determination of the step of determining.

27. A process in accordance with claim 26, wherein the step of controlling comprises issuing a warning when the step of determining determines that the information-reading device may be incapable of correctly reading magnetic information recorded on the magnetic-recording medium.

28. A process in accordance with claim 26, wherein, when the step of determining determines that the information-reading device may be incapable of correctly reading any information recorded on the magnetic-recording medium, the step of controlling comprises repeating an operation until the step of determining determines that the information-reading device is capable of correctly reading any information recorded on the magnetic-recording medium.

* * * * *